United States Patent
Yang et al.

(10) Patent No.: US 11,881,920 B2
(45) Date of Patent: *Jan. 23, 2024

(54) MULTIPLEXING CODEBOOKS GENERATED FOR TRANSMISSIONS HAVING DIFFERENT SERVICE TYPES

(71) Applicant: QUALCOMM Incorporated, San Diego, CA (US)

(72) Inventors: Wei Yang, San Diego, CA (US); Seyedkianoush Hosseini, San Diego, CA (US); Seyed Ali Akbar Fakoorian, San Diego, CA (US); Wanshi Chen, San Diego, CA (US); Yi Huang, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/891,010

(22) Filed: Aug. 18, 2022

(65) Prior Publication Data

US 2023/0022440 A1   Jan. 26, 2023

Related U.S. Application Data

(63) Continuation of application No. 16/829,972, filed on Mar. 25, 2020, now Pat. No. 11,451,284.

(Continued)

(51) Int. Cl.
*H04B 7/06* (2006.01)
*H04B 7/0417* (2017.01)
(Continued)

(52) U.S. Cl.
CPC ......... *H04B 7/0639* (2013.01); *H04B 7/0417* (2013.01); *H04L 1/1812* (2013.01); *H04L 5/0055* (2013.01); *H04W 76/27* (2018.02)

(58) Field of Classification Search
CPC .. H04B 7/0639; H04B 7/0417; H04B 7/0617; H04L 1/1812; H04L 5/0055;
(Continued)

(56) References Cited

U.S. PATENT DOCUMENTS

2019/0036654 A1\* 1/2019 Kim ...................... H04L 1/1854
2020/0196343 A1\* 6/2020 Marinier ........... H04W 72/1289
(Continued)

FOREIGN PATENT DOCUMENTS

WO    WO2018129017 A2    7/2018
WO    WO2018231728 A1    12/2018
(Continued)

OTHER PUBLICATIONS

CATT: "UL Control Enhancements for URLLC", 3GPP Draft, 3GPP TSG RAN WG1 Meeting #96, R1-1902003, 3rd Generation Partnership Project (3GPP), Mobile Competence Centre, 650, Route Des Lucioles, F-06921, Sophia-Antipolis Cedex, France, vol. RAN WG1, No. Athens, Greece, Feb.25, 2019-Mar. 1, 2019, Feb. 16, 2019 (2019-02-16), XP051599698, 8 pages, Retrieved from the Internet: URL: http://www.3gpp.org/ftp/tsg%5Fran/WG1%5FRL1/TSGR1%5F96/Docs/R1%2D1902003%2Ezip [retrieved on Feb. 16, 2019] Secs 1, 2.2, Section 2.3.

(Continued)

*Primary Examiner* — Habte Mered
(74) *Attorney, Agent, or Firm* — Holland & Hart LLP/Qualcomm Incorporated

(57) ABSTRACT

Methods, systems, and devices for wireless communications are described. A user equipment (UE) may monitor for a first transmission of a first service type (e.g., enhanced mobile broadband (eMBB)) and a second transmission of a second service type (e.g., ultra-reliable low-latency communication (URLLC)). The UE may identify a feedback codebook size for the first service type. The UE may multiplex a first (Continued)

feedback codebook having the identified feedback codebook size and generated for the first transmission with a second feedback codebook generated for the second transmission. Multiplexing the first and second feedback codebooks may produce a multiplexed feedback codebook. In some cases, the UE may perform the multiplexing based on a feedback multiplexing condition being satisfied. The UE may transmit the multiplexed feedback codebook in a control channel (e.g., a physical uplink control channel (PUCCH)) or a shared data channel (e.g., a physical uplink shared channel (PUSCH)).

20 Claims, 26 Drawing Sheets

Related U.S. Application Data

(60) Provisional application No. 62/825,627, filed on Mar. 28, 2019.

(51) Int. Cl.
  *H04W 76/27* (2018.01)
  *H04L 5/00* (2006.01)
  *H04L 1/1812* (2023.01)

(58) Field of Classification Search
  CPC ... H04L 1/1664; H04L 1/1861; H04L 1/1896; H04L 5/0053; H04L 5/0044; H04L 1/1614; H04W 76/27
  See application file for complete search history.

(56) References Cited

U.S. PATENT DOCUMENTS

| | | | | |
|---|---|---|---|---|
| 2020/0228173 | A1* | 7/2020 | Ye | H04L 1/1819 |
| 2020/0313745 | A1 | 10/2020 | Yang et al. | |
| 2021/0176011 | A1* | 6/2021 | Lei | H04W 72/042 |
| 2021/0227537 | A1* | 7/2021 | Yamamoto | H04L 5/0053 |
| 2021/0321394 | A1* | 10/2021 | Li | H04W 72/0413 |
| 2021/0337538 | A1* | 10/2021 | Li | H04L 1/1664 |
| 2021/0409182 | A1* | 12/2021 | Lee | H04L 5/00 |

FOREIGN PATENT DOCUMENTS

| | | | | |
|---|---|---|---|---|
| WO | WO-2018237275 A1 | 12/2018 | | |
| WO | WO-2020167914 A1 * | 8/2020 | ........... | H04L 1/1854 |
| WO | WO2020167914 A1 | 8/2020 | | |

OTHER PUBLICATIONS

International Preliminary Report on Patentability—PCT/US2020/024949, The International Bureau of WIPO—Geneva, Switzerland, dated Oct. 7, 2021.
International Search Report and Written Opinion—PCT/US2020/024949—ISA/EPO—dated Aug. 4, 2020.
LG Electronics: "UCI Enhancements for NR URLLC", 3GPP Draft, 3GPP TSG RAN WG1 Meeting #96, R1-1902046 URLLC UCI, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 16, 2019 (Feb. 16, 2019), XP051599742, 6 pages, Retrieved from the Internet: URL:http://www.3gpp.org/ftp/tsg%5Fran/WG1%5FRL1/TSGR1%5F96/Docs/R1%2D1902046%2Ezip [retrieved on Feb. 16, 2019] Sect.s 1, 4.
Nokia., et al., "On UCI Enhancements for URLLC," 3GPP Draft, 3GPP TSG RAN WG1 Ah Hoc Meeting 1901, R1-1900928 EURLLC UCI ENH, 3rd Generation Partnership Project (3GPP), Mobile Competence Centre, 650, Route Des Lucioles, F-06921, Sophia-Antipolis Cedex, France, vol. RAN WG1, No. Taipei, Taiwan, Jan. 21, 2019-Jan. 25, 2019, Jan. 20, 2019 (Jan. 20, 2019), XP051593772, 13 Pages, Retrieved from the Internet: URL: https://www.3gpp.org/ftp/TSG_RAN/WG1_RL1/TSGR1_AH/NR_AH_1901/Docs/R1-1900928.zip, [retrieved on Jan. 20, 2019] paragraph [02.1], Section 4.
VIVO: "UCI Enhancements for URLLC," 3GPP Draft, 3GPP TSG RAN WG1 #96, R1-1901693, UCI Enhancements for URLLC, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 16, 2019 (Feb. 16, 2019), XP051599389, 9 pages, Retrieved from the Internet: URL: http://www.3gpp.org/ftp/tsg%5Fran/WG1%5FRL1/TSGR1%5F96/Docs/R1%2D1901693%2Ezip [retrieved on Feb. 16, 2019] Sect.s 1, 2.2, 2.3.

* cited by examiner

URLLC HARQ-ACK 305 eMBB HARQ-ACK 310 eMBB PUCCH Resource 405

URLLC PUCCH Resource 410

MULTIPLEXING CODEBOOKS GENERATED FOR TRANSMISSIONS HAVING DIFFERENT SERVICE TYPES

CROSS REFERENCE

The present Application for patent is a Continuation of U.S. patent application Ser. No. 16/829,972 by YANG et al., entitled "MULTIPLEXING CODEBOOKS GENERATED FOR TRANSMISSIONS HAVING DIFFERENT SERVICE TYPES" filed Mar. 25, 2020, which claims the benefit of U.S. Provisional Patent Application No. 62/825,627 by YANG et al., entitled "MULTIPLEXING CODEBOOKS GENERATED FOR TRANSMISSIONS HAVING DIFFERENT SERVICE TYPES," filed Mar. 28, 2019, assigned to the assignee hereof, and expressly incorporated by reference herein.

BACKGROUND

The following relates generally to wireless communications, and more specifically to multiplexing codebooks generated for transmissions having different service types.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a UE may receive one or more enhanced mobile broadband (eMBB) downlink grants and may transmit an eMBB codebook within a physical uplink control channel (PUCCH) including one or more acknowledgements (ACKs) and/or negative-acknowledgements (NACKs) corresponding to the one or more eMBB downlink grants. In other cases, a UE may receive an ultra-reliable low-latency communication (URLLC) grants and may transmit a URLLC codebook within a PUCCH including an ACK or NACK corresponding to the URLLC grant.

SUMMARY

The described techniques relate to improved methods, systems, devices, and apparatuses that support multiplexing codebooks generated for transmissions having different service types. Generally, the described techniques provide for a user equipment (UE) to monitor for a first transmission of a first service type (e.g., enhanced mobile broadband (eMBB)) and a second transmission of a second service type (e.g., ultra-reliable low-latency communication (URLLC)). The UE may identify a feedback codebook size for the first service type based on monitoring for the first transmission of the first service type. The UE may multiplex a first feedback codebook having the identified feedback codebook size and generated for the first transmission (e.g., an eMBB hybrid automatic repeat request (HARD) acknowledgement (ACK) codebook) with a second feedback codebook generated for the second transmission (e.g., a URLLC HARQ-ACK codebook). Multiplexing the first and second feedback codebooks may produce a multiplexed feedback codebook. In some cases, the UE may perform the multiplexing based on a feedback multiplexing condition being satisfied. The UE may transmit the multiplexed feedback codebook in a control channel (e.g., a physical uplink control channel (PUCCH)) or a shared data channel (e.g., a physical uplink shared channel (PUSCH)). The UE may transmit the multiplexed feedback codebook on the shared data channel based on an overlap or collision of resources, a time gap, an indication from downlink control information (DCI); or a combination thereof. In some cases, the second service type may have a lower latency specification and a higher reliability specification than the first service type.

The UE may determine that the feedback multiplexing condition is satisfied based on identifying a collision between a first resource configured for transmitting the first feedback codebook and a second resource configured for transmitting the second codebook; a time gap between a DCI scheduling the second resource and a beginning of the first resource; a DCI indicating that the UE is to multiplex the first codebook and the second codebook; or a combination thereof. In some cases, the UE may bundle feedback bits generated for the first transmission to generate the first feedback codebook.

A method of wireless communications by a UE is described. The method may include monitoring for a first transmission of a first service type and a second transmission of a second service type, the second service type having a lower latency specification and a higher reliability specification than the first service type, identifying a feedback codebook size for the first service type based on monitoring for the first transmission of the first service type, multiplexing, based on a feedback multiplexing condition being satisfied, a first feedback codebook having the feedback codebook size generated for the first transmission with a second feedback codebook generated for the second transmission to generate a multiplexed feedback codebook, and transmitting the multiplexed feedback codebook in a control channel or a shared data channel.

An apparatus for wireless communications by a UE is described. The apparatus may include a processor, memory coupled with the processor, and instructions stored in the memory. The instructions may be executable by the processor to cause the apparatus to monitor for a first transmission of a first service type and a second transmission of a second service type, the second service type having a lower latency specification and a higher reliability specification than the first service type, identify a feedback codebook size for the first service type based on monitoring for the first transmission of the first service type, multiplex, based on a feedback multiplexing condition being satisfied, a first feedback codebook having the feedback codebook size generated for the first transmission with a second feedback codebook generated for the second transmission to generate a multiplexed feedback codebook, and transmit the multiplexed feedback codebook in a control channel or a shared data channel.

Another apparatus for wireless communications by a UE is described. The apparatus may include means for monitoring for a first transmission of a first service type and a second transmission of a second service type, the second service type having a lower latency specification and a higher reliability specification than the first service type, identifying a feedback codebook size for the first service type based on monitoring for the first transmission of the first service type, multiplexing, based on a feedback multiplexing condition being satisfied, a first feedback codebook having the feedback codebook size generated for the first transmission with a second feedback codebook generated for the second transmission to generate a multiplexed feedback codebook, and transmitting the multiplexed feedback codebook in a control channel or a shared data channel.

A non-transitory computer-readable medium storing code for wireless communications by a UE is described. The code may include instructions executable by a processor to monitor for a first transmission of a first service type and a second transmission of a second service type, the second service type having a lower latency specification and a higher reliability specification than the first service type, identify a feedback codebook size for the first service type based on monitoring for the first transmission of the first service type, multiplex, based on a feedback multiplexing condition being satisfied, a first feedback codebook having the feedback codebook size generated for the first transmission with a second feedback codebook generated for the second transmission to generate a multiplexed feedback codebook, and transmit the multiplexed feedback codebook in a control channel or a shared data channel.

Some examples of the method, apparatuses, and non-transitory computer-readable medium described herein may further include operations, features, means, or instructions for transmitting the multiplexed feedback codebook on the control channel based on a resource of the control channel that may be configured to the UE for transmitting the first feedback codebook at least partially overlapping in time with a resource of the control channel that may be allocated to the UE for transmitting the second feedback codebook.

In some examples of the method, apparatuses, and non-transitory computer-readable medium described herein, transmitting the multiplexed feedback codebook may include operations, features, means, or instructions transmitting the multiplexed feedback codebook on the control channel, where the control channel is configured for transmitting the second feedback codebook.

Some examples of the method, apparatuses, and non-transitory computer-readable medium described herein may further include operations, features, means, or instructions for transmitting the multiplexed feedback codebook on the shared data channel based on a resource of the shared data channel that may be allocated to the UE at least partially overlapping with a resource of the control channel that may be configured for transmitting the first feedback codebook.

In some examples of the method, apparatuses, and non-transitory computer-readable medium described herein, transmitting the multiplexed feedback codebook may include operations, features, means, or instructions for transmitting the multiplexed feedback codebook on the shared data channel based on a time gap between a downlink control channel transmission scheduling a resource for the UE to transmit an uplink shared channel transmission and a beginning of a resource configured for transmitting the first feedback codebook satisfying a time threshold.

In some examples of the method, apparatuses, and non-transitory computer-readable medium described herein, transmitting the multiplexed feedback codebook may include operations, features, means, or instructions for transmitting the multiplexed feedback codebook on the shared data channel based on receiving downlink control information indicating that the UE may be to transmit the multiplexed feedback codebook on the shared data channel.

Some examples of the method, apparatuses, and non-transitory computer-readable medium described herein may further include operations, features, means, or instructions for determining that the feedback multiplexing condition may be satisfied based on identifying a potential collision between a first resource configured for transmitting the first feedback codebook and a second resource configured for transmitting the second feedback codebook.

Some examples of the method, apparatuses, and non-transitory computer-readable medium described herein may further include operations, features, means, or instructions for receiving control signaling indicating the first resource and the second resource.

Some examples of the method, apparatuses, and non-transitory computer-readable medium described herein may further include operations, features, means, or instructions for determining that the feedback multiplexing condition may be satisfied based on a time gap between a downlink control channel transmission that schedules a resource for transmitting the second feedback codebook and a beginning of a resource configured for transmitting the first feedback codebook satisfying a time threshold.

Some examples of the method, apparatuses, and non-transitory computer-readable medium described herein may further include operations, features, means, or instructions for determining that the feedback multiplexing condition may be satisfied based on receiving downlink control information indicating that the UE may be to multiplex the first feedback codebook with the second feedback codebook.

Some examples of the method, apparatuses, and non-transitory computer-readable medium described herein may further include operations, features, means, or instructions for bundling, based on the feedback codebook size, feedback bits generated for the first transmission to generate the first feedback codebook having the feedback codebook size.

In some examples of the method, apparatuses, and non-transitory computer-readable medium described herein, the feedback codebook size is a single bit.

Some examples of the method, apparatuses, and non-transitory computer-readable medium described herein may further include operations, features, means, or instructions for generating each feedback bit of a set of feedback bits for a respective downlink carrier of a set of downlink carriers of the first transmission, and generating the first feedback codebook having the feedback codebook size based on bundling the set of feedback bits on a downlink carrier by downlink carrier basis.

Some examples of the method, apparatuses, and non-transitory computer-readable medium described herein may further include operations, features, means, or instructions for receiving radio resource control (RRC) signaling that indicates the feedback codebook size.

In some examples of the method, apparatuses, and non-transitory computer-readable medium described herein, the control signaling includes radio resource control (RRC) signaling.

Some examples of the method, apparatuses, and non-transitory computer-readable medium described herein may further include operations, features, means, or instructions for generating a set of feedback bits based on monitoring for the first transmission, and dropping at least one feedback bit of the set of feedback bits based on a total number of the set of feedback bits exceeding the feedback codebook size.

In some examples of the method, apparatuses, and non-transitory computer-readable medium described herein, the at least one feedback bit may be dropped based on a slot index, a component carrier index, or both, corresponding to the first transmission.

Some examples of the method, apparatuses, and non-transitory computer-readable medium described herein may further include operations, features, means, or instructions for identifying that a size of a feedback codebook generated for the first transmission may be less than the feedback codebook size, and inserting a defined number of bits in the feedback codebook to generate the first feedback codebook having the feedback codebook size.

In some examples of the method, apparatuses, and non-transitory computer-readable medium described herein, the feedback codebook generated for the first transmission may include operations, features, means, or instructions for inserting the defined number of bits in the feedback codebook based on the feedback codebook generated for the first transmission including the zero feedback bits.

In some examples of the method, apparatuses, and non-transitory computer-readable medium described herein, each bit of the inserted defined number of bits may be a negative acknowledgement.

In some examples of the method, apparatuses, and non-transitory computer-readable medium described herein, identifying the feedback codebook size may include operations, features, means, or instructions for receiving control signaling that indicates a first size of the multiplexed feedback codebook and a second size of the second feedback codebook, and determining the feedback codebook size based on the first size and the second size.

Some examples of the method, apparatuses, and non-transitory computer-readable medium described herein may further include operations, features, means, or instructions for identifying that a size of a feedback codebook generated for the first transmission may be less than the feedback codebook size, and inserting a defined number of bits in the feedback codebook to generate the first feedback codebook having the feedback codebook size.

In some examples of the method, apparatuses, and non-transitory computer-readable medium described herein, each bit of the inserted defined number of bits may be a negative acknowledgement.

Some examples of the method, apparatuses, and non-transitory computer-readable medium described herein may further include operations, features, means, or instructions for bundling, based on a size of the first feedback codebook exceeding the feedback codebook size, feedback bits generated for the first transmission to generate the first feedback codebook having the feedback codebook size.

In some examples of the method, apparatuses, and non-transitory computer-readable medium described herein, the feedback codebook size is a single bit.

Some examples of the method, apparatuses, and non-transitory computer-readable medium described herein may further include operations, features, means, or instructions for generating each feedback bit of a set of feedback bits for a respective downlink carrier of a set of downlink carriers of the first transmission, and generating the first feedback codebook having the feedback codebook size based on bundling the set of feedback bits on a downlink carrier by downlink carrier basis.

Some examples of the method, apparatuses, and non-transitory computer-readable medium described herein may further include operations, features, means, or instructions for selecting a first resource set of a set of control channel resource sets for the control channel based on the second size of the second feedback codebook, each set of the set of control channel resources sets corresponding to a respective range for the second size for the second feedback codebook, where the feedback codebook size may be identified based on the range for the second size for the second feedback codebook corresponding to the first resource set.

In some examples of the method, apparatuses, and non-transitory computer-readable medium described herein, the feedback codebook size may be equal to a difference between a defined codebook size for the first resource set minus the second size of the second feedback codebook.

In some examples of the method, apparatuses, and non-transitory computer-readable medium described herein, identifying the feedback codebook size may include operations, features, means, or instructions for identifying the feedback codebook size based on a defined number of resource blocks (RBs) for a control channel resource, a defined coding rate for the control channel resource, a modulation order of the control channel resource, a number of OFDM symbols of the control channel resource, or any combination thereof.

Some examples of the method, apparatuses, and non-transitory computer-readable medium described herein may further include operations, features, means, or instructions for receiving control signaling indicating a first length for a multiplexing window that may be reduced compared to a second length for the multiplexing window, and generating the first feedback codebook using the multiplexing window having the first length based on the feedback multiplexing condition being satisfied.

In some examples of the method, apparatuses, and non-transitory computer-readable medium described herein, the multiplexing window having the second length may be applied based on determining that a first resource of the control channel that may be allocated to the UE for transmitting the first feedback codebook does not overlap in time with a second resource of the control channel that may be configured for transmitting the second feedback codebook.

In some examples of the method, apparatuses, and non-transitory computer-readable medium described herein, the multiplexing window having the first length may be positioned corresponding to a beginning or ending of a second multiplexing window having the second length.

Some examples of the method, apparatuses, and non-transitory computer-readable medium described herein may further include operations, features, means, or instructions for identifying a number of feedback bits for the first feedback codebook corresponding to the feedback codebook size, determining, based on the number of feedback bits, a first length for a multiplexing window that may be reduced compared to a second length for the multiplexing window, and generating the first feedback codebook using the multiplexing window having the first length based on the feedback multiplexing condition being satisfied.

In some examples of the method, apparatuses, and non-transitory computer-readable medium described herein, the multiplexing window having the second length may be applied based on determining that a first resource of the control channel that may be allocated to the UE for transmitting the first feedback codebook does not overlap in time with a second resource of the control channel that may be configured for transmitting the second feedback codebook.

In some examples of the method, apparatuses, and non-transitory computer-readable medium described herein, the multiplexing window having the first length may be positioned corresponding to a beginning or ending of a second multiplexing window having the second length.

Some examples of the method, apparatuses, and non-transitory computer-readable medium described herein may further include operations, features, means, or instructions for identifying a second feedback codebook size for the second feedback codebook, determining, based on the second feedback codebook size, a first length for a multiplexing window that may be reduced compared to a second length for the multiplexing window, and generating the second feedback codebook using the multiplexing window having the first length based on the feedback multiplexing condition being satisfied.

In some examples of the method, apparatuses, and non-transitory computer-readable medium described herein, identifying the feedback codebook size may include operations, features, means, or instructions for determining a number of resources configured for a control channel format, where the feedback codebook size may be identified based on the number of resources.

Some examples of the method, apparatuses, and non-transitory computer-readable medium described herein may further include operations, features, means, or instructions for receiving control signaling to configure the UE to use the control channel format for transmitting the second feedback codebook.

In some examples of the method, apparatuses, and non-transitory computer-readable medium described herein, identifying the feedback codebook size may include operations, features, means, or instructions for determining a defined number of information bits available to be conveyed over the number of resources configured for the control channel format, where the feedback codebook size may be identified based on the defined number of information bits.

In some examples of the method, apparatuses, and non-transitory computer-readable medium described herein, identifying the feedback codebook size may include operations, features, means, or instructions for selecting the feedback codebook size based on identifying a number of resources available in the shared data channel for transmitting the multiplexed feedback codebook that satisfies a ratio.

In some examples of the method, apparatuses, and non-transitory computer-readable medium described herein, the ratio may be an alpha ratio.

Some examples of the method, apparatuses, and non-transitory computer-readable medium described herein may further include operations, features, means, or instructions for receiving a third transmission of the first service type and a fourth transmission of the second service type, identifying that the feedback multiplexing condition may be not satisfied, and transmitting a feedback codebook generated for the third transmission in a first resource of the control channel and a feedback codebook generated for the fourth transmission in a second resource of the control channel that differs from the first resource.

In some examples of the method, apparatuses, and non-transitory computer-readable medium described herein, the feedback codebook size may be a number of feedback bits available for providing feedback for the first transmission of the first service type.

In some examples of the method, apparatuses, and non-transitory computer-readable medium described herein, the first service type may be an enhanced mobile broadband service and the second service type may be an ultra-reliable low latency service.

In some examples of the method, apparatuses, and non-transitory computer-readable medium described herein, the first transmission may be a first physical downlink shared channel transmission and the second transmission may be a second physical downlink shared channel transmission.

In some examples of the method, apparatuses, and non-transitory computer-readable medium described herein, the first feedback codebook includes first hybrid automatic repeat request acknowledgment (HARQ-ACK) feedback and the second feedback codebook includes a second HARQ-ACK feedback.

A method of wireless communications by a base station is described. The method may include transmitting a first transmission of a first service type and a second transmission of a second service type, the second service type having a lower latency specification and a higher reliability specification than the first service type, identifying a feedback codebook size for the first service type based on transmitting the first transmission of the first service type, and receiving, in a control channel or a shared data channel, a multiplexed feedback codebook generated based on a first feedback codebook having the feedback codebook size generated for the first transmission being multiplexed with a second feedback codebook generated for the second transmission.

An apparatus for wireless communications by a base station is described. The apparatus may include a processor, memory coupled with the processor, and instructions stored in the memory. The instructions may be executable by the processor to cause the apparatus to transmit a first transmission of a first service type and a second transmission of a second service type, the second service type having a lower latency specification and a higher reliability specification than the first service type, identify a feedback codebook size for the first service type based on transmitting the first transmission of the first service type, and receive, in a control channel or a shared data channel, a multiplexed feedback codebook generated based on a first feedback codebook having the feedback codebook size generated for the first transmission being multiplexed with a second feedback codebook generated for the second transmission.

Another apparatus for wireless communications by a base station is described. The apparatus may include means for transmitting a first transmission of a first service type and a second transmission of a second service type, the second service type having a lower latency specification and a higher reliability specification than the first service type, identifying a feedback codebook size for the first service type based on transmitting the first transmission of the first service type, and receiving, in a control channel or a shared data channel, a multiplexed feedback codebook generated based on a first feedback codebook having the feedback codebook size generated for the first transmission being multiplexed with a second feedback codebook generated for the second transmission.

A non-transitory computer-readable medium storing code for wireless communications by a base station is described. The code may include instructions executable by a processor to transmit a first transmission of a first service type and a second transmission of a second service type, the second service type having a lower latency specification and a higher reliability specification than the first service type, identify a feedback codebook size for the first service type based on transmitting the first transmission of the first service type, and receive, in a control channel or a shared data channel, a multiplexed feedback codebook generated based on a first feedback codebook having the feedback codebook size generated for the first transmission being multiplexed with a second feedback codebook generated for the second transmission.

In some examples of the method, apparatuses, and non-transitory computer-readable medium described herein, receiving the multiplexed feedback codebook may include operations, features, means, or instructions for receiving the multiplexed feedback codebook on the control channel based on a resource of the control channel that may be configured to a user equipment for transmitting the first feedback codebook at least partially overlapping in time with a resource of the control channel that may be allocated to the user equipment for transmitting the second feedback codebook.

In some examples of the method, apparatuses, and non-transitory computer-readable medium described herein, receiving the multiplexed feedback codebook may include operations, features, means, or instructions for receiving the multiplexed feedback codebook on the control channel, where the control channel is configured for receiving the second feedback codebook.

In some examples of the method, apparatuses, and non-transitory computer-readable medium described herein, receiving the multiplexed feedback codebook may include operations, features, means, or instructions for receiving the multiplexed feedback codebook on the shared data channel based on a resource of the shared data channel that may be allocated to a user equipment at least partially overlapping with a resource of the control channel that may be configured for transmitting the first feedback codebook.

In some examples of the method, apparatuses, and non-transitory computer-readable medium described herein, receiving the multiplexed feedback codebook may include operations, features, means, or instructions for receiving the multiplexed feedback codebook on the shared data channel based on a time gap between a downlink control channel transmission scheduling a resource for a user equipment to transmit an uplink shared channel transmission and a beginning of a resource configured for transmitting the first feedback codebook satisfying a time threshold.

In some examples of the method, apparatuses, and non-transitory computer-readable medium described herein, receiving the multiplexed feedback codebook may include operations, features, means, or instructions for receiving the multiplexed feedback codebook on the shared data channel based on transmitting downlink control information indicating that a user equipment may be to transmit the multiplexed feedback codebook on the shared data channel.

Some examples of the method, apparatuses, and non-transitory computer-readable medium described herein may further include operations, features, means, or instructions for determining that a feedback multiplexing condition may be satisfied based on identifying a potential collision between a first resource configured for transmitting the first feedback codebook and a second resource configured for transmitting the second feedback codebook, and monitoring the control channel or the shared data channel for the multiplexed feedback codebook based on the feedback multiplexing condition being satisfied.

Some examples of the method, apparatuses, and non-transitory computer-readable medium described herein may further include operations, features, means, or instructions for transmitting control signaling indicating the first resource and the second resource.

Some examples of the method, apparatuses, and non-transitory computer-readable medium described herein may further include operations, features, means, or instructions for determining that a feedback multiplexing condition may be satisfied based on a time gap between a downlink control channel transmission that schedules a resource for transmitting the second feedback codebook and a beginning of a resource configured for transmitting the first feedback codebook satisfying a time threshold, and monitoring the control channel or the shared data channel for the multiplexed feedback codebook based on the feedback multiplexing condition being satisfied.

Some examples of the method, apparatuses, and non-transitory computer-readable medium described herein may further include operations, features, means, or instructions for determining that a feedback multiplexing condition may be satisfied based on transmitting downlink control information indicating that a user equipment may be to multiplex the first feedback codebook with the second feedback codebook, and monitoring the control channel or the shared data channel for the multiplexed feedback codebook based on the feedback multiplexing condition being satisfied.

Some examples of the method, apparatuses, and non-transitory computer-readable medium described herein may further include operations, features, means, or instructions for transmitting control signaling that indicates the feedback codebook size.

In some examples of the method, apparatuses, and non-transitory computer-readable medium described herein, the control signaling includes RRC signaling.

In some examples of the method, apparatuses, and non-transitory computer-readable medium described herein, identifying the feedback codebook size may include operations, features, means, or instructions for transmitting control signaling that indicates a first size of the multiplexed feedback codebook and a second size of the second feedback codebook, and determining the feedback codebook size based on the first size and the second size.

Some examples of the method, apparatuses, and non-transitory computer-readable medium described herein may further include operations, features, means, or instructions for selecting a first resource set of a set of control channel resources sets for the control channel based on the second size of the second feedback codebook, each set of the set of control channel resources sets corresponding to a respective range for the second size for the second feedback codebook, where the feedback codebook size may be identified based on the range for the second size for the second feedback codebook corresponding to the first resource set.

In some examples of the method, apparatuses, and non-transitory computer-readable medium described herein, the feedback codebook size may be equal to a difference between a defined codebook size for the first resource set minus the second size of the second feedback codebook.

Some examples of the method, apparatuses, and non-transitory computer-readable medium described herein may further include operations, features, means, or instructions for identifying the feedback codebook size based on a defined number of resource blocks (RBs) for a control channel resource, a defined coding rate for the control channel resource, a modulation order of the control channel resource, a number of OFDM symbols of the control channel resource, or any combination thereof.

Some examples of the method, apparatuses, and non-transitory computer-readable medium described herein may further include operations, features, means, or instructions for transmitting control signaling indicating a first length for a multiplexing window that may be reduced compared to a second length for the multiplexing window.

In some examples of the method, apparatuses, and non-transitory computer-readable medium described herein, identifying the feedback codebook size may include operations, features, means, or instructions for determining a number of resources configured for a control channel format, where the feedback codebook size may be identified based on the number of resources.

Some examples of the method, apparatuses, and non-transitory computer-readable medium described herein may further include operations, features, means, or instructions for transmitting control signaling to configure a user equipment to use the control channel format for transmitting the second feedback codebook.

In some examples of the method, apparatuses, and non-transitory computer-readable medium described herein, identifying the feedback codebook size may include operations, features, means, or instructions for determining a defined number of information bits available to be conveyed over the number of resources configured for the control channel format, where the feedback codebook size may be identified based on the defined number of information bits.

In some examples of the method, apparatuses, and non-transitory computer-readable medium described herein, identifying the feedback codebook size may include operations, features, means, or instructions for selecting the feedback codebook size based on identifying a number of resources available in the shared data channel for transmitting the multiplexed feedback codebook that satisfies a ratio.

In some examples of the method, apparatuses, and non-transitory computer-readable medium described herein, the ratio may be an alpha ratio.

Some examples of the method, apparatuses, and non-transitory computer-readable medium described herein may further include operations, features, means, or instructions for transmitting a third transmission of the first service type and a fourth transmission of the second service type, identifying that a feedback multiplexing condition may be not satisfied, and receiving a feedback codebook generated for the third transmission in a first resource of the control channel and a feedback codebook generated for the fourth transmission in a second resource of the control channel that differs from the first resource.

In some examples of the method, apparatuses, and non-transitory computer-readable medium described herein, the feedback codebook size may be a number of feedback bits available for providing feedback on the first transmission of the first service type.

In some examples of the method, apparatuses, and non-transitory computer-readable medium described herein, the first service type may be an enhanced mobile broadband service and the second service type may be an ultra-reliable low latency service.)

DETAILED DESCRIPTION

Figure 1:
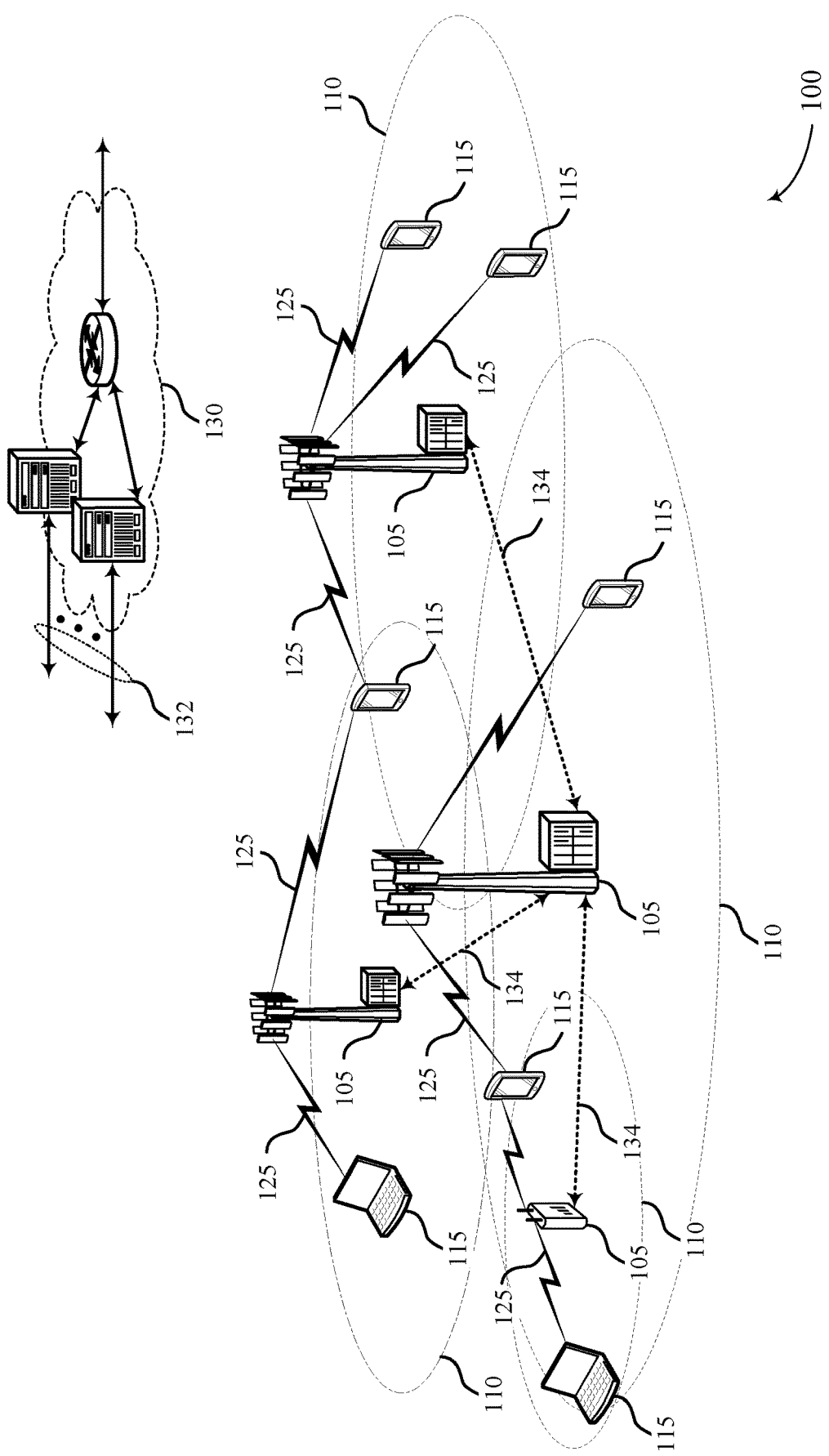
FIG. 1 illustrates an example of a system for wireless communications that supports multiplexing codebooks generated for transmissions having different service types in accordance with aspects of the present disclosure.

A base station may wirelessly communicate with a user equipment (UE). For instance, the base station may transmit a transport block (TB) to the UE over a downlink shared channel (e.g., a physical downlink shared channel (PDSCH)). The UE may receive and attempt to decode the TB. If the UE successfully decodes the TB, the UE may transmit an acknowledgement (ACK) to the base station. Elsewise, the UE may transmit a non-acknowledgement (NACK). In some cases, the UE may transmit multiple ACKs and/or NACKs together in a feedback codebook for multiple received TBs. The UE may transmit the feedback codebook in an uplink control channel (e.g., a physical uplink control channel (PUCCH)) or an uplink shared channel (e.g., a physical uplink shared channel (PUSCH)).

In some cases, the UE may receive downlink shared channel transmissions of different service types and/or priorities and may transmit a feedback codebook for each service type in corresponding resources. For instance, the UE may receive one or more ultra-reliable low-latency communication (URLLC) downlink shared channel transmissions and may transmit a URLLC feedback codebook in a URLLC PUCCH resource. Additionally or alternatively, the UE may receive one or more enhanced mobile broadband (eMBB) downlink shared channel transmissions and may transmit an eMBB feedback codebook.

In some cases, a resource for transmitting (e.g., reporting) a feedback codebook associated with one or more downlink shared channel transmissions of a first service type and/or priority may collide in time with resources for transmitting (e.g., reporting) a feedback codebook associated with downlink shared channel transmissions of a second service type and/or priority. For instance, a PUCCH resource for reporting an eMBB feedback codebook may at least partially overlap in time resources with a PUCCH resource for reporting a URLLC codebook. In such cases, the UE may drop the feedback codebook associated with a lower priority service type (e.g., eMBB may have a lower priority service type than URLLC). However, dropping the feedback codebook associated with the lower priority service type may degrade the performance associated with communicating according to the lower priority service type.

To mitigate such performance degradation, the UE may multiplex the feedback codebooks associated with the colliding reporting resources and may generate a multiplexed feedback codebook. The multiplexed feedback codebook may be transmitted on one of the colliding reporting resources (e.g., the higher priority reporting resource). In some cases, the UE may multiplex the feedback codebooks associated with the colliding resources if a feedback multiplexing condition is satisfied. For instance, the UE may multiplex two feedback codebooks if their corresponding reporting resources collide; if a time gap between receiving downlink control information (DCI) scheduling a reporting resource of one service type (e.g., URLLC) and the start of a reporting resource of the other service type (e.g., eMBB) is greater than a time threshold; if the UE receives an explicit or implicit indication to perform the multiplexing (e.g., via DCI); or a combination thereof.

The UE may, additionally or alternatively, multiplex two feedback codebooks if the reporting resources associated with each codebook overlap at least partially in time with an uplink shared channel resource (e.g., a PUSCH resource). The multiplexed feedback codebook may be transmitted in the uplink shared channel resource. In some cases, the UE may multiplex the two feedback codebooks and transmit them in the uplink shared channel resource if the reporting resources collide in time with the uplink shared channel resource; if a time gap between receiving DCI scheduling the uplink shared channel resource and a reporting resource of one service type (e.g., eMBB) is greater than a time threshold; if the UE receives an explicit or implicit indication to perform multiplexing (e.g., via DCI); or a combination thereof.

When the UE transmits the multiplexed feedback codebook, the base station may receive and decode the multiplexed feedback codebook if the UE and the base station agree on a size of the codebooks within the multiplexed feedback codebook. To enable such an agreement, the UE may reserve a fixed number of bits within the multiplexed feedback codebook for bits of a feedback codebook of one of the services types (e.g., for bits of the eMBB codebook). In some cases, the UE may reserve a number of bits for bits of a feedback codebook of one of the service types (e.g. for bits of the eMBB codebook) based on a total size of the multiplexed feedback codebook and a size of a feedback codebook of the other service type (e.g., for a URLLC codebook).

In some examples, the UE may restrict a number of bits that the multiplexed feedback codebook may have. For instance, the UE may restrict how many bits of a feedback codebook of one of the services types (e.g., the eMBB codebook) is included in the multiplexed feedback codebook. The UE may satisfy the restriction through bundling (e.g., attributing multiple ACKs or NACKs to a single ACK or NACK value) or by partially dropping a payload associated with one of the codebooks (e.g., the eMBB codebook). Additionally or alternatively, the UE may reduce a multiplexing window associated with multiplexing the two feedback codebooks and may drop or restrict a size of one of the codebooks (e.g., the eMBB codebook) when outside of the reduced multiplexing window.

Aspects of the disclosure are initially described in the context of a wireless communications system. Additional aspects of the disclosure are further described with reference to an additional wireless communications system, multiplexed feedback codebooks, a multiplexing scheme, a PUSCH multiplexing scheme, a feedback bit restriction scheme, and a process flow. Aspects of the disclosure are further illustrated by and described with reference to apparatus diagrams, system diagrams, and flowcharts that relate to multiplexing codebooks generated for transmissions having different service types.

FIG. 1 illustrates an example of a wireless communications system 100 that supports multiplexing codebooks generated for transmissions having different service types in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different service types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband service type that is associated with a predefined portion or range (e.g., set of subcarriers or RBs) within a carrier (e.g., "in-band" deployment of a narrowband service type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may construct two HARQ-ACK codebooks simultaneously and may use the HARQ-ACK codebooks for different services (e.g., one for eMBB services and one for URLLC services). For example, the UE 115 may transmit an eMBB HARQ-ACK codebook after receiving one or more eMBB downlink grants and may transmit a URLLC HARQ-ACK codebook after receiving one or more URLLC downlink grants. In some cases, the reporting of two HARQ-ACK codebooks may collide in time (e.g., an eMBB HARQ-ACK codebook and a URLLC HARQ-ACK codebook may have overlapping time resources). In such cases, a UE 115 may multiplex both HARQ codebooks and transmit them in a single PUCCH or PUSCH resource. Alternatively, the UE 115 may refrain from transmitting or may drop the eMBB HARQ-ACK codebook.

In general, an ability of a transmitting UE 115 to perform correct encoding and/or an ability of a receiving base station 105 to perform correct decoding of the payload may depend on whether the UE 115 knows an exact codebook size anticipated by the base station 105. However, a reliability of eMBB codebooks may depend on a reliability of an eMBB physical downlink control channel (PDCCH) (e.g., a PDCCH scheduling eMBB resources) which may be less reliable than that of a URLLC PDCCH (e.g., a PDCCH scheduling URLLC resources). If there is a misalignment of size of the eMBB codebook between the UE 115 and the base station 105, URLLC performance may suffer.

The following may relate to solution which enable codebook multiplexing without sacrificing URLLC reliability.

The described techniques relate to improved methods, systems, devices, and apparatuses that support multiplexing codebooks generated for transmissions having different service types. Generally, the described techniques provide for a UE 115 to monitor for a first transmission of a first service type (e.g., eMBB) and a second transmission of a second service type (e.g. URLLC). The UE 115 may identify a feedback codebook size for the first service type based on monitoring for the first transmission of the first service type. The feedback codebook size may refer to a number of bits of HARQ-ACK to send for the first service type (e.g., for eMBB). The UE 115 may multiplex a first feedback codebook having the identified feedback codebook size and generated for the first transmission (e.g., an eMBB HARQ-ACK codebook) with a second feedback codebook generated for the second transmission (e.g., a URLLC HARQ-ACK codebook). Multiplexing the first and second feedback codebooks may produce a multiplexed feedback codebook. In some cases, the UE 115 may perform the multiplexing based on a feedback multiplexing condition being satisfied. The UE 115 may transmit the multiplexed feedback codebook in a control channel (e.g., a PUCCH) or a shared data channel (e.g., a PUSCH). The UE 115 may transmit the multiplexed feedback codebook on the shared data channel or the control channel based on an overlap or collision of resources, a time gap, an indication from DCI; or a combination thereof. In some cases, the second service type may have a lower latency specification and a higher reliability specification than the first service type.

The UE 115 may determine that the feedback multiplexing condition is satisfied based on identifying a collision between a first resource configured for transmitting the first feedback codebook and a second resource configured for transmitting the second codebook; a time gap between a DCI scheduling the second resource and a beginning of the first resource; a DCI indicating that the UE 115 is to multiplex the first codebook and the second codebook; or a combination thereof. In some cases, the UE 115 may bundle feedback bits generated for the first transmission to generate the first feedback codebook.

Figure 2:
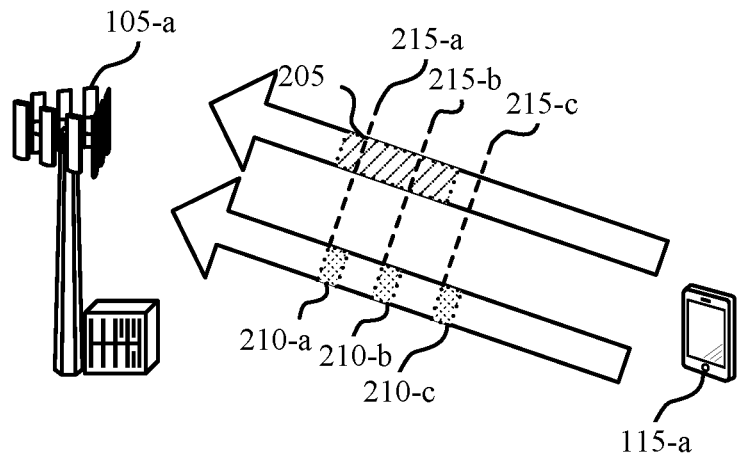
FIG. 2 illustrates an example of a wireless communications system that supports multiplexing codebooks generated for transmissions having different service types in accordance with aspects of the present disclosure.

FIG. 2 illustrates an example of a wireless communications system 200 that supports multiplexing codebooks generated for transmissions having different service types in accordance with aspects of the present disclosure. In some examples, wireless communications system 200 may implement aspects of wireless communications system 100. For instance, wireless communications system may include a UE 115-*a* and a base station 105-*a*, which may be an example of a UE 115 and a base station 105 as described with reference to FIG. 1.

UE 115-*a* may wirelessly communicate with base station 105-*a*. For instance, base station 105-*a* may transmit one or more TBs to UE 115-*a* over a PDSCH associated with a service type (e.g., URLLC or eMBB). UE 115-*a* may receive and attempt to decode the one or more TBs and may transmit corresponding ACKs and/or NACKs together in a feedback codebook for that service type, such as a HARQ-ACK codebook. In some cases, a PUCCH resource for reporting an eMBB feedback codebook may at least partially overlap in time resources or collide in time with a PUCCH resource for reporting a URLLC feedback codebook. In such cases, UE 115-*b* may multiplex the eMBB feedback codebook and the URLLC feedback codebook.

For instance, UE 115-*a* may conditionally multiplex a URLLC feedback codebook (e.g., a URLLC HARQ-ACK codebook) with a number of bits from an eMBB feedback codebook (e.g., an eMBB HARQ-ACK codebook). Performing the conditional multiplexing may generate a multiplexed feedback codebook (e.g., a multiplexed HARQ-ACK codebook) that may be transmitted in a URLLC PUCCH resource 210. In one example, UE 115-*a* may generate the multiplexed feedback codebook if a PUCCH resource for transmitting a URLLC HARQ-ACK may potentially collide with a PUCCH resource for eMBB HARQ-ACK transmission. For instance, UE 115-*a* may determine whether an eMBB PUCCH resource 205 and a URLLC PUCCH resource 210 may collide and may generate the multiplexed feedback codebook, regardless of whether those resources (e.g., eMBB PUCCH resource 205 or URLLC PUCCH resource 210) carry PUCCH transmissions. This may be in contrast to determining whether an eMBB PUCCH transmission on eMBB PUCCH resource 205 collides with a URLLC PUCCH transmission on URLLC PUCCH resource 210, which may be referred to as an active collision. Generating and/or transmitting the multiplexed feedback codebook based on potential collisions may enable a UE 115 to transmit a multiplexed codebook even when UE 115-*a* has not received a downlink grant scheduling a PUCCH on an eMBB PUCCH resource 205. UE 115-*a* may not multiplex a URLLC feedback codebook with an eMBB feedback codebook if the respective resources (e.g., an eMBB PUCCH resource 205 and a URLLC PUCCH resource 210) do not collide.

Either or both PUCCH resources may be semi-statically configured (e.g., configured via RRC). In general, for HARQ-ACK transmission on PUCCH, UE 115-*a* may be semi-statically configured with a number of PUCCH resources (e.g., for eMBB and for URLLC). In each transmission occasion (e.g., each slot), base station 105-*a* may send a dynamic indication (e.g., in a downlink grant) to UE 115-*a* which may indicate which configured PUCCH resource is used to transmit a HARQ-ACK in a given occasion. As such, in the discussion above, UE 115-*a* may receive an indication to transmit URLLC HARQ-ACK in a URLLC PUCCH resource 210. In this case, UE 115-*a* may receive an indication to transmit an eMBB HARQ-ACK, although there may be instances where UE 115-*a* does not receive such an indication. In either case, however, UE 115-*a* may determine whether or not there is a potential collision between the indicated URLLC PUCCH resource 210 (e.g., the URLLC PUCCH resource 210 which is to transmit URLLC HARQ-ACK) and a semi-statically configured eMBB PUCCH resource 205.

In one example, UE 115-*a* may be configured with an eMBB PUCCH resource 205 and URLLC PUCCH resources 210-*a*, 210-*b*, and 210-*c*. URLLC PUCCH resources 210-*a* and 210-*b* may overlap at least partially in time with eMBB PUCCH resource 205 (e.g., at 215-*a* and 215-*b*, respectively). URLLC PUCCH resource 210-*c* may not, however, overlap at least partially in time with eMBB PUCCH resource 205. As such, a feedback codebook associated with eMBB PUCCH resource 205 may be multiplexed with one or both of the feedback codebooks associated with URLLC PUCCH resources 210-*a* and 210-*b* and may be transmitted within one or both of URLLC PUCCH resources 210-*a* and 210-*b*. The feedback codebook associated with eMBB PUCCH resource 205 may not be multiplexed with a codebook associated with URLLC PUCCH resource 210-*c*.

In some cases, UE 115-*a* may, for a subset of configured eMBB PUCCH resources which may be used for transmitting an eMBB HARQ-ACK, determine whether the eMBB PUCCH resources collide with a URLLC PUCCH resource. In one example, UE 115-*a* may perform the determination for the subset of eMBB PUCCH resources following an indication from base station 105-*a* via semi-static signaling (e.g., RRC). Such cases, in which the decision of whether to multiplex the eMBB codebook to the URLLC codebook or not may be determined based on or via RRC signaling, may be referred to as semi-static multiplexing. In some examples, UE 115-*a* may determine whether or not to generate a multiplexed HARQ-ACK codebook based on a timing gap or a DCI indication (e.g., explicit or implicit) as discussed with reference to FIG. 4. Additional details with how the number of bits may be determined may be discussed with reference to FIG. 3.

In some cases, UE 115-*a* may multiplex a feedback codebook associated with a URLLC codebook reporting resource and a feedback codebook associated with an eMBB codebook reporting resource if the reporting resources associated with each codebook overlap at least partially in time with a PUSCH resource. For instance, UE 115-*a* may conditionally multiplex a URLLC feedback codebook with a number of bits from an eMBB feedback codebook; may generate a multiplexed feedback codebook; and may transmit a corresponding multiplexed feedback codebook in the PUSCH.

In one example, UE 115-*a* may schedule eMBB PUCCH resource 205 and URLLC PUCCH resource 210-*c*. In such an example UE 115-*a* may not schedule URLLC PUCCH resources 210-*a* and 210-*b*. eMBB PUCCH resource 205 and URLLC PUCCH resource 210-*c* may not overlap in time resources. However, eMBB PUCCH resource 205 and URLLC PUCCH resource 210-*c* may each at least partially overlap with a PUSCH. In such cases, a feedback codebook associated with the eMBB PUCCH resource 205 and feedback codebook associated with the URLLC PUCCH resource 210-*c* may be multiplexed and transmitted in the PUSCH.

In general, UE 115-*a* may generate the multiplexed feedback codebook if the PUSCH overlaps at least partially with an eMBB PUCCH resource; if a time gap between receiving a PDCCH scheduling the PUSCH and an eMBB PUCCH resource satisfies a time threshold; if UE 115-*a* receives an indication to generate the multiplexed feedback; or a combination thereof. Additional details about the conditional multiplexing and transmitting the multiplexed feedback codebook in a PUSCH may be discussed with reference to FIG. 5.

UE 115-*a* may reserve a fixed number of feedback bits for eMBB HARQ-ACK or may reserve a number of feedback bits relative to a size of URLLC HARQ-ACK and a total size of eMBB HARQ-ACK and URLLC HARQ-ACK. In either case, a UE 115 may insert dummy feedback bits to the eMBB codebook to guarantee a fixed size (e.g., for the eMBB and/or for the total payload) if a number of actual feedback bits associated with eMBB is smaller than the reserved number of feedback bits for the eMBB codebook. If the transmitted HARQ-ACK feedback bits for eMBB are greater than the actual eMBB codebook size in feedback bits, the reliability of the overall transmission may not be reduced. For instance, if dummy feedback bits are inserted and the dummy feedback bits are known at base station 105-*a*, base station 105-*a* may leverage side information, such as the dummy feedback bits, for decoding. As such, when dummy feedback bits are inserted, power control may be performed according to the actual size of the eMBB codebook in feedback bits, not the transmitted number of feedback bits.

In general, a larger payload size may demand more power and resources than a smaller payload size. As such, a larger payload size using the same power and resources as a smaller payload size may enable reduced reliability. Restricting a number of eMBB feedback bits to be multiplexed with URLLC feedback bits may reduce the payload size and may increase reliability for a given power. One method of restricting payload size may be bundling (e.g., using one bit to represent ACKs or NACKs for multiple resources). Another method may be reducing a HARQ-ACK multiplexing window in time. Another method may be partially dropping an eMBB HARQ-ACK in case the total payload exceeds a configured threshold number of feedback bits. The dropping order may depend on the slot index of the corresponding eMBB PDSCH and/or the component carrier (CC) index in case of carrier aggregation. Whether reducing the HARQ-ACK multiplexing window or partially dropping the eMBB HARQ-ACK, different numbers and/or window lengths may be configured by base station 105-*a* for HARQ-ACK transmission on PUSCH and on PUCCH.

Figure 3A:
FIGS. 3A and 3B illustrate examples of multiplexed feedback codebooks that support multiplexing codebooks generated for transmissions having different service types in accordance with aspects of the present disclosure.
Figure 3A:
Figure 3A:
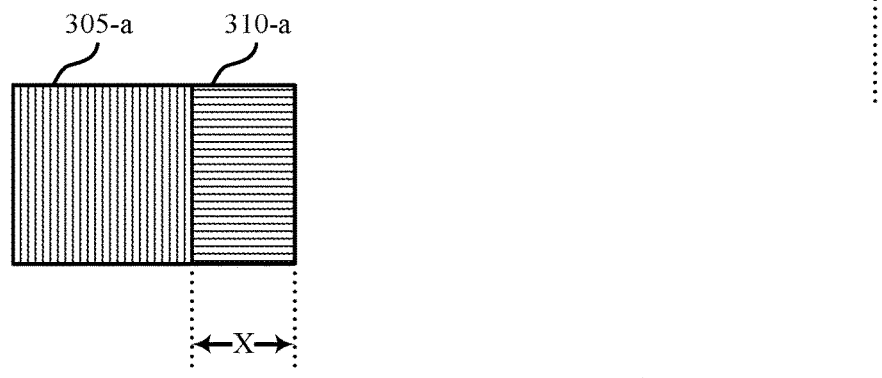

FIG. 3A illustrates an example of a multiplexed feedback codebook 300-*a* in accordance with aspects of the present disclosure. Multiplexed feedback codebook 300-*a* may include URLLC HARQ-ACK 305-*a* and eMBB HARQ-ACK 310-*a*. URLLC HARQ-ACK 305-*a* may include ACKs and/or NACKs associated with URLLC downlink shared transmissions received from a base station 105. eMBB HARQ-ACK 310-*a*, meanwhile, may include ACKs and/or NACKs associated with eMBB downlink shared transmissions received from a base station 105.

A UE 115 may conditionally multiplex a URLLC HARQ-ACK 305 with a fixed number of feedback bits from an eMBB codebook (e.g., X feedback bits) which make up eMBB HARQ-ACK 310. X may be semi-statically configured (e.g., RRC-configured). In some cases, different X values may be configured for when the multiplexed codebook is within a PUCCH (e.g., a URLLC PUCCH) versus a PUSCH (e.g., as described with reference to FIG. 5) The UE 115 may transmit X feedback bits regardless of an actual eMBB codebook size.

If the actual eMBB codebook size is less than a size eMBB HARQ-ACK 310 (e.g., less than X bits, such as if the actual eMBB codebook size is 0 feedback bits), the UE may insert NACKs for the eMBB codebook. For instance, if X=N feedback bits and the actual eMBB codebook size is M feedback bits, where M<N, than N−M feedback bits of the N feedback bits (e.g., the last N−M feedback bits) may have NACKs inserted by default (e.g., each of the N−M feedback bits may be configured to indicate a NACK). In one example, if the actual eMBB codebook size is 0 feedback bits (e.g., if the UE 115 does not receive any eMBB PDSCHs or eMBB HARQ-ACK scheduling), N dummy bits may be inserted for the reserved eMBB feedback bits when generating the multiplexed feedback codebook (e.g., if the multiplexing feedback condition, as described herein, is satisfied).

If the actual eMBB codebook size is greater than a size of eMBB HARQ-ACK 310 (e.g., greater than X bits), the UE 115 may reduce the number of HARQ-ACK feedback bits for eMBB (e.g., the HARQ-ACKs associated with the actual eMBB codebook) into X feedback bits. In one example, if X=1 and the actual size of the eMBB HARQ-ACK codebook is greater than 1, the UE 115 may bundle all HARQ-ACKs associated with the actual eMBB codebook into 1 bit. For instance, if each downlink transmission covered by the actual eMBB HARQ-ACK codebook was properly received and decoded by the UE 115, the 1 bit may indicate an ACK and may indicate a NACK elsewise. In another example, if X=P where P is a number of eMBB downlink carriers, the UE 115 may generate 1 bit for each eMBB carrier and may bundle together HARQ-ACKs associated with a same eMBB carrier. For instance, if X=2 and there are 2 eMBB carriers, a first bit may indicate an ACK if each transmission covered by the actual eMBB HARQ-ACK codebook that are associated with the first eMBB carrier (e.g., received on the first downlink carrier) were properly received and decoded and a second bit may indicate an ACK if each transmission covered by the HARQ-ACK codebook that are associated with the second eMBB carrier (e.g., received on the second downlink carrier) were properly received and correctly decoded. The first bit may indicate a NACK if a transmission on the first eMBB carrier failed to be correctly decoded and the second bit may indicate a NACK if not a transmission on the second eMBB carrier failed to be correctly decoded.

Figure 3B:
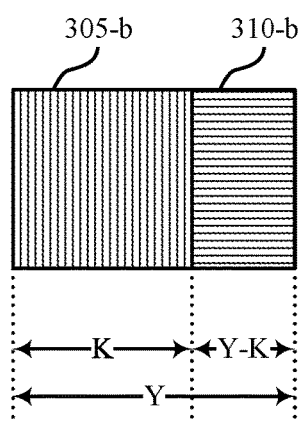
Figure 3B:
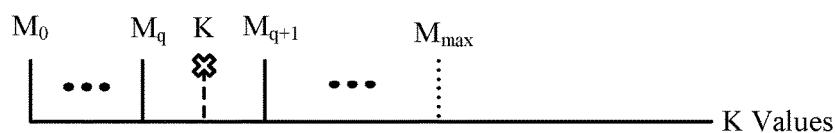

FIG. 3B illustrates an example of a multiplexed feedback codebook 300-b in accordance with aspects of the present disclosure. Multiplexed feedback codebook 300-b may include URLLC HARQ-ACK 305-b and eMBB HARQ-ACK 310-b. URLLC HARQ-ACK 305-b may include ACKs and/or NACKs associated with URLLC downlink shared transmissions received from a base station 105. eMBB HARQ-ACK 310-b, meanwhile, may include ACKs and/or NACKs associated with eMBB downlink shared transmissions received from a base station 105.

A UE 115 may transmit Y–K feedback bits for eMBB. Y may be a fixed, semi-statically determined and/or configured value (e.g., via RRC), and K may be a codebook size for URLLC. As long as a UE 115 and a corresponding base station 105 identify or determine a same value of K, codebook misalignment may be prevented. Different values of Y may be configured for when the multiplexed codebook is within a PUCCH (e.g., a URLLC PUCCH) versus a PUSCH. In some cases, K may be indicated by the corresponding base station 105 via control signaling (e.g., K may be RRC-configured or dynamically indicated in DCI).

If the actual eMBB codebook size is less than Y–K (e.g., 0 feedback bits), the UE may insert NACKs for the eMBB codebook. For instance, if Y–K=N feedback bits and the actual eMBB codebook size is M feedback bits, where M<N, than M–N feedback bits of the N feedback bits (e.g., the last M–N feedback bits) may have NACKs inserted by default (e.g., each of the M–N feedback bits may be configured to indicate a NACK).

If the actual eMBB codebook size is greater than Y–K, the UE 115 may reduce the HARQ-ACKs for eMBB into Y–K feedback bits. In one example, if Y–K=1 and the actual size of the eMBB HARQ-ACK codebook is greater than 1, the UE 115 may bundle each eMBB HARQ-ACK into 1 bit. For instance, if each resource covered by the eMBB HARQ-ACK codebook was properly received and decoded, the 1 bit may indicate an ACK and may indicate a NACK elsewise. In another example, if Y–K=P where P is a number of eMBB downlink carriers, the UE 115 may reserve 1 bit for each eMBB carrier and may bundle together HARQ-ACKs associated with each eMBB carrier. For instance, if Y–K=2 and there are 2 eMBB carriers, a first bit may indicate an ACK if each transmission covered by the HARQ-ACK codebook and that are associated with the first eMBB carrier (e.g., received on the first downlink carrier) was properly received and decoded and a second bit may indicate an ACK if each transmission covered by the HARQ-ACK codebook and that are associated with the second eMBB carrier (e.g., received on the second downlink carrier) was properly received and decoded.

In general, the value of Y may be explicitly or implicitly configured. For instance, a base station 105 may configure multiple sets of PUCCH resources, which may be referred to as PUCCH resource sets. Each set may correspond to uplink control information (UCI) transmission with payload size K in a range. The range may be RRC configured (e.g., configured via RRC signaling). A UE 115 may select the PUCCH resource set based on the range of the actual payload. In one example, K may be set between an $M_q$ value and a $M_{q+1}$ value (e.g., between $M_0$ and $M_1$, $M_1$ and $M_2$, $M_2$ and $M_3$), where $M_q<M_{q+1}$ (e.g., $M_0<M_1<M_2<M_3$). If K is set such that $M_q<K\leq M_{q+1}$, then Y may be set to $M_{q+1}$. Alternatively or additionally, K may be set directly to an $M_q$ value. In such cases, Y may be set to $M_q$ or $M_{q+1}$. In general, Y may be different for different values of K.

In some cases, the UE 115 may determine a defined number (e.g., maximum) of information bits that may be transmitted on a scheduled URLLC PUCCH resource, including the multiplexed codebook (e.g., the codebook including URLLC HARQ-ACK 305-b and eMBB HARQ-ACK 310-b, which may be a compressed version of the actual eMBB HARQ-ACK codebook). The defined number of bits may be equal to an upper value of the Ma range containing K. For instance, if $M_q<K\leq M_{q+1}$, then the defined number of information bits may be $M_{q+1}$. Alternatively or additionally, in a case where the UE 115 is configured with a defined number (e.g., maximum) of RBs N for a scheduled PUCCH resource, a defined (e.g., maximum) coding rate on the PUCCH resource R, a modulation order $Q_m$, and a number of OFDM symbols T, the defined information bits that may be transmitted on the resource may be given by $M_{max}=\text{Floor}(RQ_mNT)$. In such a case, Y may be set to equal $M_{max}$.

Additionally or alternatively, for HARQ-ACK transmission on URLLC PUCCH resources, the size of an eMBB HARQ-ACK payload (e.g., eMBB HARQ-ACK 310-b) may depend on a defined number (e.g., maximum) of resources configured for the PUCCH format. The UE 115 may determine the payload size of eMBB HARQ-ACK 310-b based on the defined information bits (e.g., the maximum information bits) that may be conveyed over the scheduled URLLC resources. That is, the UE 115 may be configured with a defined number (e.g., maximum) of RBs N or $Z_{max}$, a number of OFDM symbols T, a defined (e.g., maximum) coding rate R, a modulation order $Q_m$, or a combination thereof. In such cases, Y may be set to $K_{max}=\text{Floor}(R \cdot Q_m \cdot N \cdot T)$. Based on these parameters, the UE 115 may calculate the defined number of information bits that may be transmitted over the scheduled PUCCH resource, which may be done without changing to a new resource that is designed to convey a larger payload. The UE 115 may select the largest eMBB payload size such that the multiplexed payload size is equal to this defined number of bits. One benefit of determining the eMBB HARQ-ACK payload according to the defined number of resources configured for the PUCCH format is that the UE 115 may determine a PUCCH resource for transmitting the multiplexed payload based on a size of a URLLC HARQ-ACK codebook (e.g., the size of URLLC HARQ-ACK 305-b) alone.

Determining the eMBB HARQ-ACK payload this way may be in contrast to other methods which may involve a UE 115 determining a HARQ-ACK resource, checking if the HARQ-ACK resources overlaps with one or more other resources, multiplexing the control information with the overlapping resources, and determining a new resource based on the total payload size of the multiplexed control information. If the new resource overlaps with other resources, the UE 115 may perform multiplexing again. In general, the processing time associated with preparing transmissions according to the present disclosure may be shorter than the other methods, which may enable the UE 115 to transmit the multiplexed PUCCH faster (e.g., with lower latency). For instance, the multiplexed control information may be transmitted in at least one of the overlapping resources (e.g., a URLLC PUCCH) and, as such, the UE 115 may not take time to determine a new resource and check if the new resource overlaps with other resources. Additionally, determining the method in this fashion may not negatively affect (e.g., harm, sacrifice) the reliability of URLLC HARQ-ACK feedback. For instance, if a PUCCH resource to transmit URLLC HARQ-ACK 305-$b$ is chosen based on the URLLC HARQ-ACK payload size, the selected PUCCH resource may maintain the reliability of transmitting URLLC HARQ-ACK 305-$b$ (e.g., as compared to transmitting a URLLC HARQ-ACK 305 that has not been multiplexed).

In some cases, the number of RBs may be for transmitting uplink control information (UCI), such as HARQ-ACK, a scheduling request (SR), and/or a channel state information (CSI) report. As mentioned above, a UE 115 may be configured with a coding rate R, a modulation order Q, a defined number (e.g., maximum) of RBs $Z_{max}$ or N, and a number of OFDM symbols T. In some examples, a UE 115 may be scheduled to transmit K uncoded UCI bits and M CRC bits. In such examples, the UE 115 may determine an actual number of RBs $Z_{actual}$ if $Z_{actual}$ satisfies (K+M) $\leq RQZ_{actual}T$ and (K+M)>RQ($Z_{actual}$−1)T. A $Z_{actual}$ that satisfies both limitations may be interpreted as a minimum number of RBs such that the actual coding rate $$\left( e.g., \frac{K+M}{QZ_{actual}T} \right)$$

is smaller luau than R. If $$\frac{K+M}{QZ_{actual}T} > R, Z_{actual}$$

may equal $Z_{max}$. The UE 115 may make Z actual equal $Z_{max}$ in such a situation, as even using the defined number of RBs may maintain the coding rate above R.

In some cases, a UE 115 may piggyback UCI on a shared data channel. For instance, when a PUSCH and a PUCCH resource overlap, HARQ-ACK resources carried by a PUCCH may be carried by the PUSCH instead. When a UE performs UCI piggybacking, there may be an alpha-parameter (e.g., a) that determines the number of PUSCH resources for transmitting the UCI. The alpha factor may be used such that of the total PUSCH resources, an alpha portion may be used for UCI transmission. When the calculated resources for UCI exceed the alpha portion, the resources for UCI may be capped at this portion. For a HARQ-ACK transmission on PUSCH, the size of an eMBB payload may depend on the alpha factor that is RRC-configured. For instance, the eMBB payload size may be determined such that the number of resources in the PUSCH for a HARQ-ACK transmission does not exceed an alpha ratio of the total number of PUSCH resources. In one example, a PUSCH may contain M total resources and have a coding rate R and a modulation order $Q_m$. In this case, the maximum number of HARQ-ACK bits that may be transmitted on the PUSCH may be equal to $K_{max}$=Floor ($\alpha MRQ_m$). Y may be set to $K_{max}$ and the eMBB codebook size may be Y−K, where K may be the URLLC HARQ-ACK codebook size.

Figure 4:
FIG. 4 illustrates an example of a multiplexing scheme that supports multiplexing codebooks generated for transmissions having different service types in accordance with aspects of the present disclosure.
Figure 4:
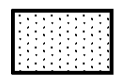
Figure 4:
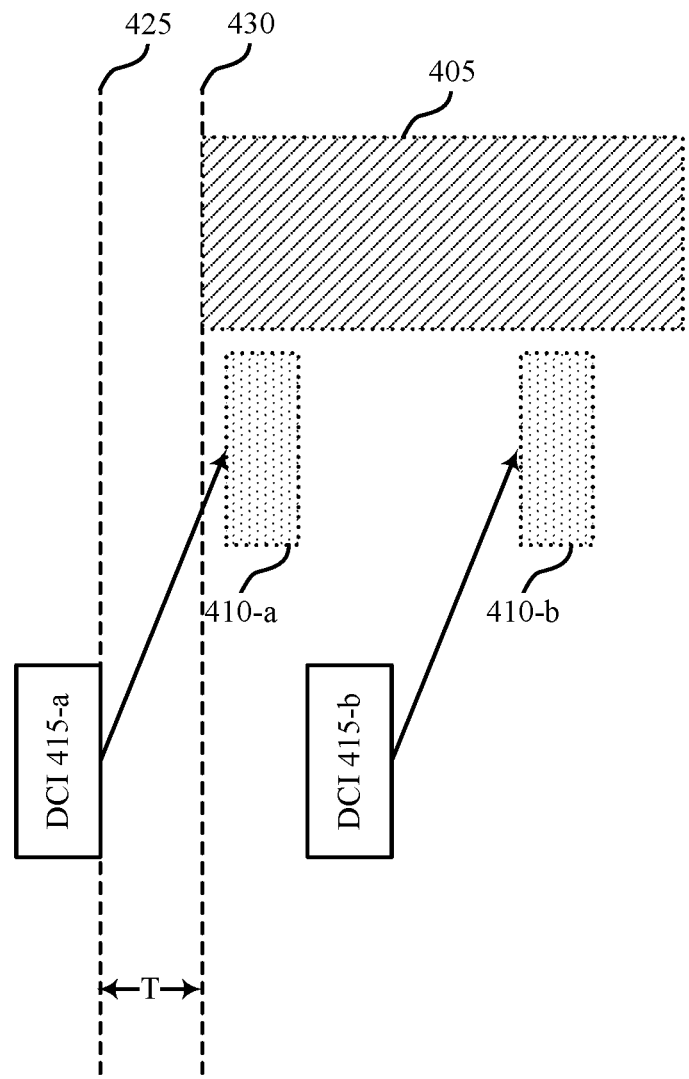

FIG. 4 illustrates an example of a multiplexing scheme 400 in accordance with aspects of the present disclosure. The multiplexing scheme 400 may implement one or more aspects of FIG. 2. For instance, multiplexing scheme 400 may include an eMBB PUCCH resource 405 and a URLLC PUCCH resource 410, which may be examples of an eMBB PUCCH resource 205 and a URLLC PUCCH resource 210 as described with reference to FIG. 2.

In some cases, multiplexing a URLLC HARQ-ACK with eMBB HARQ-ACKs may depend on a time gap between a DCI 415 scheduling a corresponding URLLC PUCCH resource 410 and a potentially colliding eMBB PUCCH resource 405. For instance, a UE 115 may reserve feedback bits for eMBB HARQ-ACK (e.g., X feedback bits as described with reference to FIG. 3A or Y−K feedback bits as described with reference to FIG. 3B) within a URLLC PUCCH resource 410 if a DCI 415 scheduling a URLLC PUCCH resource 410 for transmission of a URLLC-HARQ-ACK arrives earlier than T symbols before the start of an overlapping eMBB PUCCH resource 405. If such a PDCCH arrives within T symbols or during the eMBB PUCCH resource 405, no multiplexing may occur. The DCI may be received over a PDCCH.

In one example, a DCI 415-$a$ may schedule a URLLC PUCCH resource 410-$a$ and a DCI 415-$b$ may schedule a URLLC PUCCH resource 410-$b$. Both URLLC PUCCH resources 410-$a$ and 410-$b$ may overlap with eMBB PUCCH resource 405. However, a time between receiving DCI 415-$a$ (e.g., at time 425) and the start of eMBB PUCCH resource 405 (e.g., time 430) may be equal to or greater than T transmission time intervals (e.g., T symbols where T is an integer). As such, one or more URLLC HARQ-ACKs associated with URLLC PUCCH resource 410-$a$ may be multiplexed with eMBB HARQ-ACKs and transmitted within URLLC PUCCH resource 410-$a$. DCI 415-$b$ may start after eMBB PUCCH resource 405 begins. As such, the UE 115 may not perform multiplexing for the URLLC HARQ-ACKs associated with URLLC PUCCH resource 410-$b$.

In some cases, multiplexing may be indicated in the DCI 415 that schedules the URLLC HARQ-ACK. For instance, a base station 105 may use a DCI 415 to indicate whether the UE 115 is to multiplex the URLLC HARQ-ACK with the certain number of eMBB feedback bits (e.g., X feedback bits as described with reference to FIG. 3A or Y−K feedback bits as described with reference to FIG. 3B). The indication may be an explicit indication, such as a bit field in the DCI 415, or may be an implicit indication, such as a different interpretation of a combination existing DCI fields.

Figure 5:
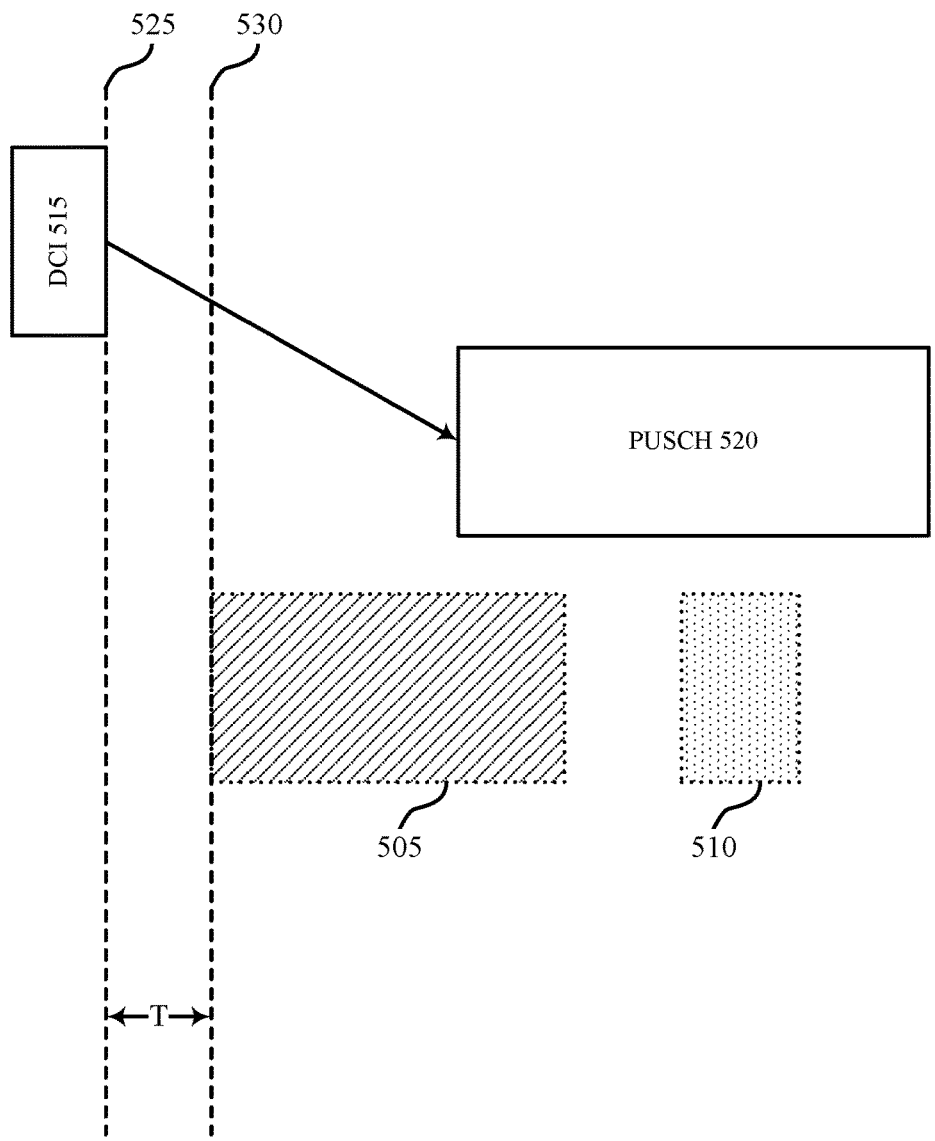
FIG. 5 illustrates an example of a physical uplink shared channel (PUSCH) multiplexing scheme that supports multiplexing codebooks generated for transmissions having different service types in accordance with aspects of the present disclosure.

FIG. 5 illustrates an example of a PUSCH multiplexing scheme 500 in accordance with aspects of the present disclosure. The PUSCH multiplexing scheme 500 may implement one or more aspects of FIG. 2. For instance, PUSCH multiplexing scheme 500 may include an eMBB PUCCH resource 505 and a URLLC PUCCH resource 510, which may be examples of an eMBB PUCCH resource 205 and a URLLC PUCCH resource 210 as described with reference to FIG. 2.

In some cases, URLLC and/or eMBB HARQ-ACK may be transmitted on a PUSCH 520, which may be referred to as piggybacking. In one example, if an eMBB PUCCH resource 505 collides in time or has overlapping time resources with the PUSCH 520, the PUSCH 520 may transmit corresponding eMBB HARQ-ACK associated with the eMBB PUCCH resource 505. In another example, if a URLLC PUCCH resource 510 collides in time or has overlapping time resources with the PUSCH 520, the PUSCH 520 may transmit corresponding URLLC HARQ-ACK associated with the URLLC PUCCH resource 510. If both an eMBB PUCCH resource 505 and a URLLC PUCCH resource 510 overlap at least partially with the PUSCH 520, the PUSCH 520 may transmit the URLLC HARQ-ACK with the eMBB HARQ-ACK multiplexed (e.g., as described with reference to FIG. 3A or 3B). In such cases, the eMBB HARQ-ACK may be associated with one or more feedback bits.

Additionally or alternatively, the UE 115 may transmit the URLLC HARQ-ACK with the eMBB HARQ-ACK multiplexed if both the eMBB PUCCH resource 505 and the URLLC PUCCH resource 510 at least partially overlap with the PUSCH 520 and if a DCI 515, which may be carried by a PDCCH, scheduling the PUSCH 520 is at least a number of transmission time intervals (e.g., T symbols) before the starting of the eMBB PUCCH resource 505 (e.g., between time 525 and time 530). Additionally or alternatively, the DCI scheduling the PUSCH may provide an indication that any eMBB PUCCH resource 505 and URLLC PUCCH resource 510 at least partially overlapping in time resources with the PUSCH 520 is to be multiplexed such that feedback bits are reserved for eMBB HARQ-ACK (e.g., X feedback bits as described with reference to FIG. 3A or Y−K feedback bits as described with reference to FIG. 3B). The indication may be an explicit indication, such as a bit field in the DCI 515, or may be an implicit indication, such as a different interpretation of a combination existing DCI fields.

Figure 6:
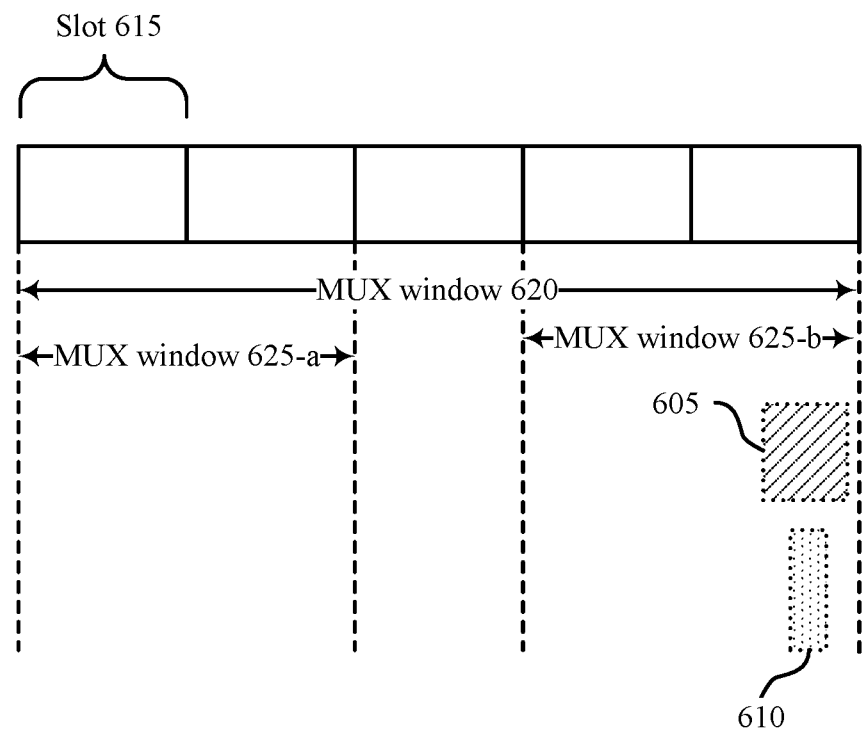
FIG. 6 illustrates an example of a feedback bit restriction scheme that supports multiplexing codebooks generated for transmissions having different service types in accordance with aspects of the present disclosure.

FIG. 6 illustrates an example of a feedback bit restriction scheme 600 in accordance with aspects of the present disclosure. The feedback bit restriction scheme 600 may implement one or more aspects of FIG. 2. For instance, feedback bit restriction scheme 600 may include eMBB PUCCH resources 605-a and 605-b, which may be examples of eMBB PUCCH resources 205 as described with reference to FIG. 2. Additionally, feedback bit restriction scheme 600 may include URLLC PUCCH resources 610-a and 610-b, which may be examples of URLLC PUCCH resources 210 as described with reference to FIG. 2.

In one example, a reduced length HARQ-ACK multiplexing window 625 in time may be used to determine the eMBB HARQ-ACK codebook for multiplexing URLLC HARQ-ACK with eMBB HARQ-ACK. The length of the reduced length HARQ-ACK multiplexing window 625 may be semi-statically configured (e.g., configured via RRC) or may be determined according to a number of feedback bits that may be transmitted for eMBB. In one example, UE 115-a may be configured with a reduced length HARQ-ACK multiplexing window 625 of length L and may determine a number of eMBB feedback bits (e.g., a size of X of multiplexed feedback codebook 300-a) based on L (e.g., X=L). In another example, UE 115-a may determine a number of eMBB feedback bits (e.g., a size of X of multiplexed feedback codebook 300-a or a size of Y−K of multiplexed feedback codebook 300-b) and may determine the length L of the reduced length HARQ-ACK multiplexing window 625 based on the codebook size (e.g., L=X if using multiplexed feedback codebook 300-a or L=Y−K if using multiplexed feedback codebook 300-b). The reduced length HARQ-ACK multiplexing window 625 may be at the start of the regular length HARQ-ACK multiplexing window 620 (e.g., reduced length HARQ-ACK multiplexing window 625-a), at the end of the regular length HARQ-ACK multiplexing window 620 (e.g., reduced length HARQ-ACK multiplexing window 625-b), anywhere in between, or a combination thereof.

In cases both the regular length HARQ-ACK multiplexing window 620 and a reduced length HARQ-ACK multiplexing window 625 are configured to the UE 115, the regular length HARQ-ACK multiplexing window 620 may be used to determine the eMBB HARQ-ACK codebook when there is no collision between eMBB and URLLC HARQ-ACK reporting resources (e.g., whenever there is no overlap between an eMBB PUCCH resource 605 and a URLLC PUCCH resource 610) and the reduced length HARQ-ACK multiplexing windows 625 may be used to determine the eMBB HARQ-ACK codebook when there is a collision.

In some cases, a reduced length HARQ-ACK multiplexing window may be used to restrict a size of a URLLC HARQ-ACK codebook. For instance, URLLC HARQ-ACK codebook may have a size of G feedback bits using the regular length HARQ-ACK multiplexing window 620. On the other hand, URLLC HARQ-ACK codebook may have a size of H feedback bits, where H may be less than G, using a reduced length HARQ-ACK multiplexing window 625. Such size reduction may be used when eMBB and URLLC are configured with a same RRC parameter indicating timing between a PDSCH transmission and a corresponding HARQ-ACK report (e.g., dl-DataToUL-ACK) and/or when a semi-static HARQ-ACK codebook is configured for URLLC. The RRC parameter may configure a list of integer numbers and may report the timing in terms of a number of slots.

Figure 7:
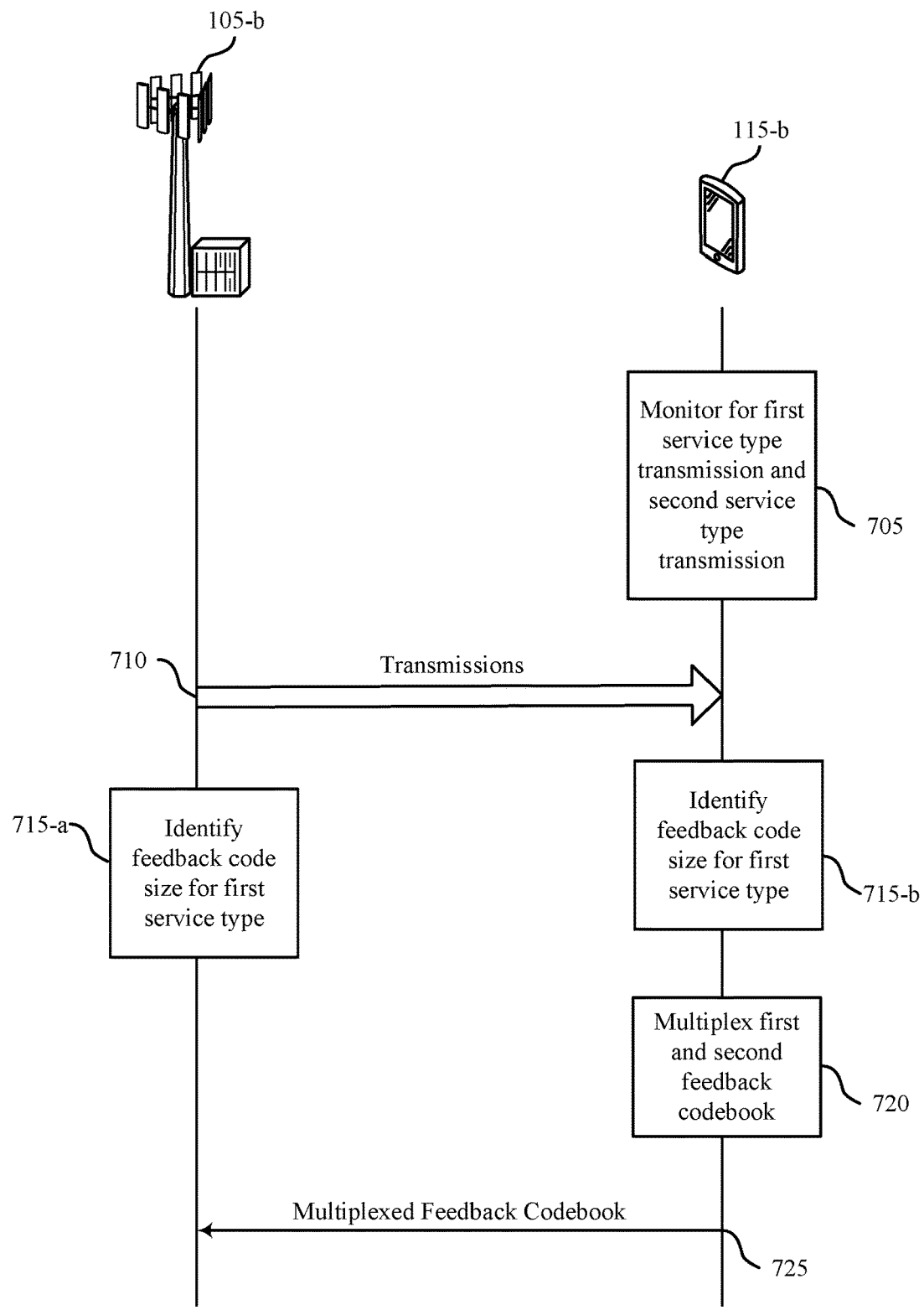
FIG. 7 illustrates an example of a process flow that supports multiplexing codebooks generated for transmissions having different service types in accordance with aspects of the present disclosure.

FIG. 7 illustrates an example of a process flow 700 that supports multiplexing codebooks generated for transmissions having different service types in accordance with aspects of the present disclosure. In some examples, process flow 700 may be implemented by aspects of wireless communications system 100. For instance, process flow 700 may include a UE 115-b and a base station 105-b, which may be examples of a UE 115 and a base station 105 as described with reference to FIG. 1.

At 705, UE 115-b may monitor for a first transmission of a first service type (e.g., eMBB) and a second transmission of a second service type (e.g., URLLC). In some cases, the second service type may have a lower latency specification than the first service type.

At 710, base station 105-b may transmit a first transmission of the first service type and a second transmission of the second service type. The first transmission may be transmitted before, in conjunction with, or after the second transmission. UE 115-b may receive the first and second transmissions.

At 715-a, base station 105-b may identify a feedback codebook size for the first service type. In some cases, base station 105-b may identify the feedback codebook size for the first service type based on transmitting the first transmission of the first service type. Additionally or alternatively, base station 105-b may determine the feedback codebook size for the first service type based on a number of monitored downlink shared channel (e.g., PDSCH) transmissions for one or both of eMBB and URLLC.

At 715-b, UE 115-b may identify the feedback codebook size for the first service type. UE 115-b may identify the feedback codebook size for the first service type based on monitoring for the first transmission of the first service type. Additionally or alternatively, UE 115-b may determine the feedback codebook size for the first service type based on a number of monitored downlink shared channel (e.g., PDSCH) transmissions for one or both of eMBB and URLLC.

At 720, UE 115-b may multiplex a first feedback codebook having the feedback codebook size and generated for the first transmission with a second feedback codebook generated for the second transmission. UE 115-b may multiplex the first feedback codebook with the second based on a feedback multiplexing condition (e.g., an explicit or implicit indication by a DCI or a time gap satisfying a time threshold) being satisfied. Multiplexing the first feedback codebook with the second may generate a multiplexed feedback codebook. In some cases, the first feedback codebook may be a URLLC HARQ-ACK codebook and the second feedback codebook may be an eMBB HARQ-ACK codebook.

At 725, UE 115-*b* may transmit the multiplexed feedback codebook in a control channel (e.g., PUCCH) or a shared channel (e.g., PUSCH).

Figure 8:
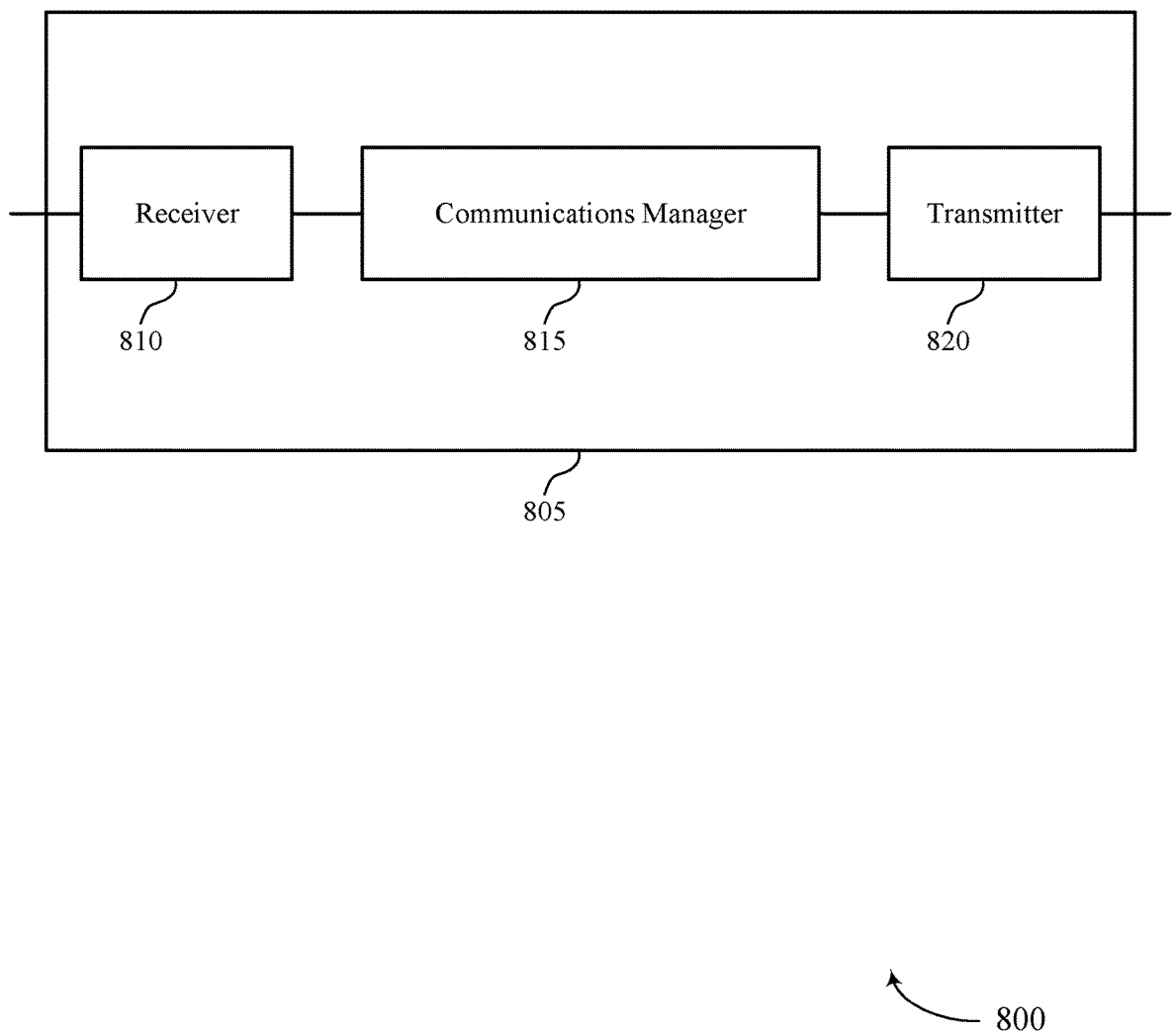
FIGS. 8 and 9 show block diagrams of devices that support multiplexing codebooks generated for transmissions having different service types in accordance with aspects of the present disclosure.

FIG. 8 shows a block diagram 800 of a device 805 that supports multiplexing codebooks generated for transmissions having different service types in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to multiplexing codebooks generated for transmissions having different service types, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may monitor for a first transmission of a first service type and a second transmission of a second service type, the second service type having a lower latency specification and a higher reliability specification than the first service type, identify a feedback codebook size for the first service type based on monitoring for the first transmission of the first service type, multiplex, based on a feedback multiplexing condition being satisfied, a first feedback codebook having the feedback codebook size generated for the first transmission with a second feedback codebook generated for the second transmission to generate a multiplexed feedback codebook, and transmit the multiplexed feedback codebook in a control channel or a shared data channel. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
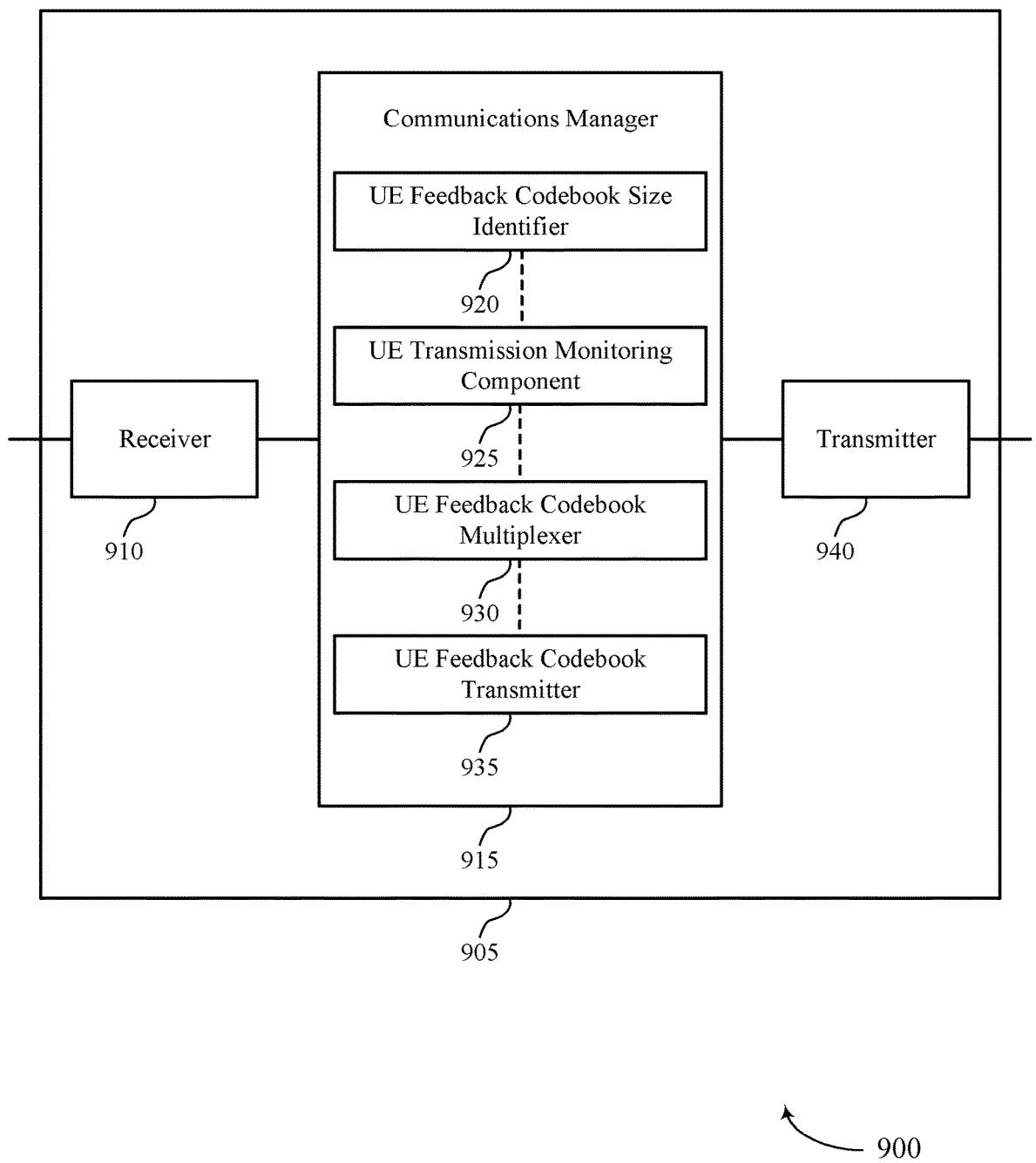

FIG. 9 shows a block diagram 900 of a device 905 that supports multiplexing codebooks generated for transmissions having different service types in accordance with aspects of the present disclosure. The device 905 may be an example of aspects of a device 805, or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to multiplexing codebooks generated for transmissions having different service types, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include an UE feedback codebook size identifier 920, an UE transmission monitoring component 925, an UE feedback codebook multiplexer 930, and an UE feedback codebook transmitter 935. The communications manager 915 may be an example of aspects of the communications manager 1110 described herein.

The UE feedback codebook size identifier 920 may identify a feedback codebook size for a first service type based on monitoring for the first transmission of the first service type.

The UE transmission monitoring component 925 may monitor for a first transmission of the first service type and a second transmission of a second service type, the second service type having a lower latency specification and a higher reliability specification than the first service type.

The UE feedback codebook multiplexer 930 may multiplex, based on a feedback multiplexing condition being satisfied, a first feedback codebook having the feedback codebook size generated for the first transmission with a second feedback codebook generated for the second transmission to generate a multiplexed feedback codebook.

The UE feedback codebook transmitter 935 may transmit the multiplexed feedback codebook in a control channel or a shared data channel.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
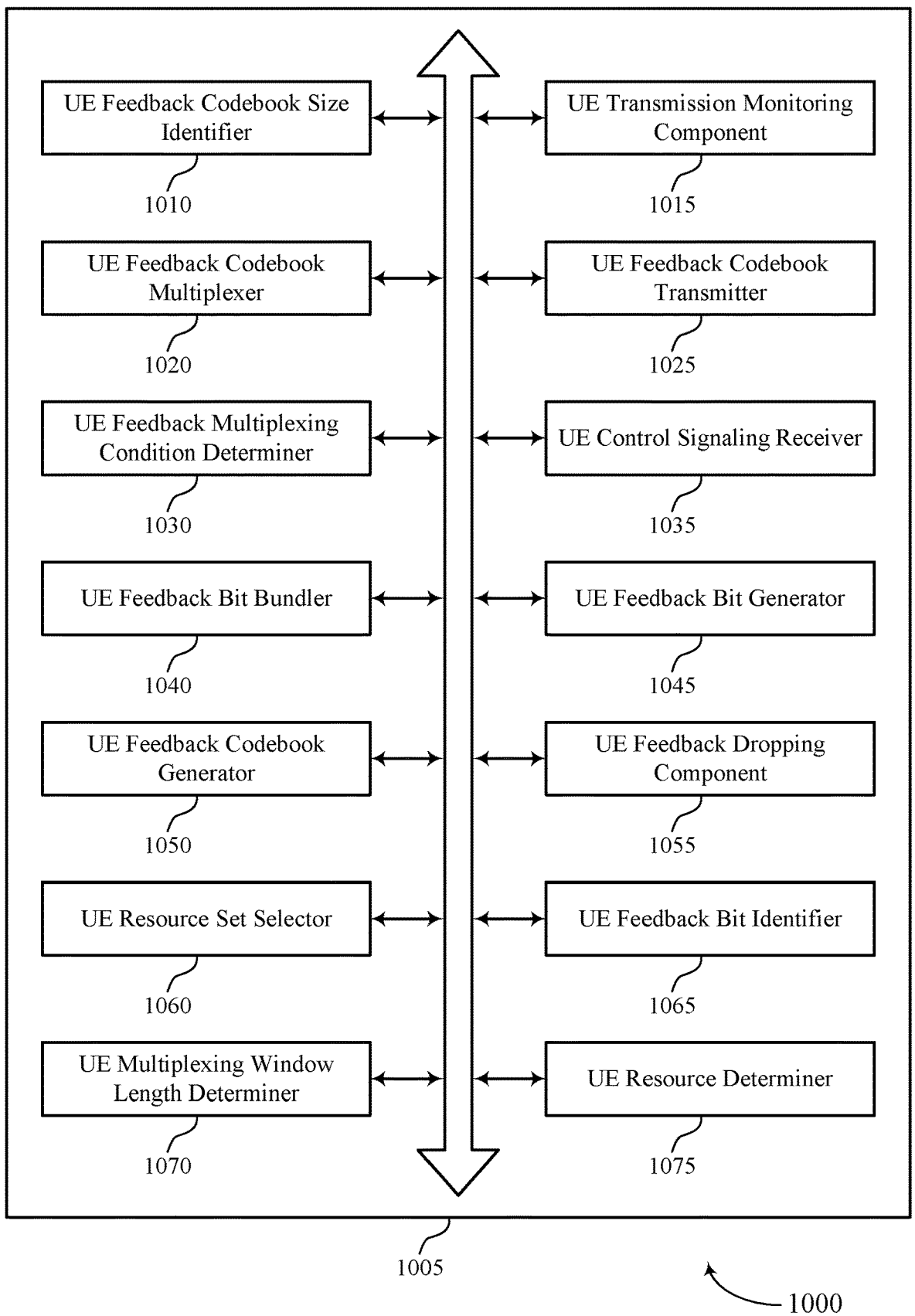
FIG. 10 shows a block diagram of a communications manager that supports multiplexing codebooks generated for transmissions having different service types in accordance with aspects of the present disclosure.

FIG. 10 shows a block diagram 1000 of a communications manager 1005 that supports multiplexing codebooks generated for transmissions having different service types in accordance with aspects of the present disclosure. The communications manager 1005 may be an example of aspects of a communications manager 815, a communications manager 915, or a communications manager 1110 described herein. The communications manager 1005 may include an UE feedback codebook size identifier 1010, an UE transmission monitoring component 1015, an UE feedback codebook multiplexer 1020, an UE feedback codebook transmitter 1025, an UE feedback multiplexing condition determiner 1030, an UE control signaling receiver 1035, an UE feedback bit bundler 1040, an UE feedback bit generator 1045, an UE feedback codebook generator 1050, an UE feedback dropping component 1055, an UE resource set selector 1060, an UE feedback bit identifier 1065, an UE multiplexing window length determiner 1070, and an UE resource determiner 1075. Each of these modules may communicate, directly or indirectly, with one another (e.g., via one or more buses).

The UE feedback codebook size identifier 1010 may identify a feedback codebook size for a first service type based on monitoring for the first transmission of the first service type. In some examples, the UE feedback codebook size identifier 1010 may identify that a size of a feedback codebook generated for the first transmission is less than the feedback codebook size. In some examples, the UE feedback codebook size identifier 1010 may insert a defined number of bits in the feedback codebook to generate the first feedback codebook having the feedback codebook size. In some examples, the feedback codebook generated for the first transmission includes zero feedback bits. In some examples, the UE feedback codebook size identifier 1010 may insert the defined number of bits in the feedback codebook based on the feedback codebook generated for the first transmission including zero feedback bits. In some examples, the UE feedback codebook size identifier 1010 may determine the feedback codebook size based on the first size and the second size. In some examples, the UE feedback codebook size identifier 1010 may identify the feedback codebook size based on a defined number (e.g., maximum) of resource blocks (RBs) for a control channel resource, a defined coding rate (e.g., maximum) for the control channel resource, a modulation order of the control channel resource, and a number of OFDM symbols of the control channel resource. In some examples, the UE feedback codebook size identifier 1010 may identify a second feedback codebook size for the second feedback codebook. In some cases, each bit of the inserted defined number of bits is a negative acknowledgement. In some cases, the feedback codebook size is a number of feedback bits available for providing feedback for the first transmission of the first service type.

The UE transmission monitoring component 1015 may monitor for a first transmission of the first service type and a second transmission of a second service type, the second service type having a lower latency specification and a higher reliability specification than the first service type. In some examples, the UE transmission monitoring component 1015 may receive a third transmission of the first service type and a fourth transmission of the second service type. In some cases, the first service type is an enhanced mobile broadband service and the second service type is an ultra-reliable low latency service. In some cases, the first transmission is a first physical downlink shared channel transmission and the second transmission is a second physical downlink shared channel transmission.

The UE feedback codebook multiplexer 1020 may multiplex, based on a feedback multiplexing condition being satisfied, a first feedback codebook having the feedback codebook size generated for the first transmission with a second feedback codebook generated for the second transmission to generate a multiplexed feedback codebook. In some cases, the first feedback codebook includes first hybrid automatic repeat request acknowledgment (HARQ-ACK) feedback and the second feedback codebook includes a second HARQ-ACK feedback.

The UE feedback codebook transmitter 1025 may transmit the multiplexed feedback codebook in a control channel or a shared data channel. In some examples, the UE feedback codebook transmitter 1025 may transmit the multiplexed feedback codebook on the control channel based on a resource of the control channel that is configured to the UE for transmitting the first feedback codebook at least partially overlapping in time with a resource of the control channel that is allocated to the UE for transmitting the second feedback codebook. In some examples, the UE feedback codebook transmitter 1025 may transmit the multiplexed feedback codebook on the control channel, where the control channel is configured for transmitting the second feedback codebook. In some examples, the UE feedback codebook transmitter 1025 may transmit the multiplexed feedback codebook on the shared data channel based on a resource of the shared data channel that is allocated to the UE at least partially overlapping with a resource of the control channel that is configured for transmitting the first feedback codebook. In some examples, the UE feedback codebook transmitter 1025 may transmit the multiplexed feedback codebook on the shared data channel based on a time gap between a downlink control channel transmission scheduling a resource for the UE to transmit an uplink shared channel transmission and a beginning of a resource configured for transmitting the first feedback codebook satisfying a time threshold. In some examples, the UE feedback codebook transmitter 1025 may transmit the multiplexed feedback codebook on the shared data channel based on receiving downlink control information indicating that the UE is to transmit the multiplexed feedback codebook on the shared data channel. In some examples, the UE feedback codebook transmitter 1025 may transmit a feedback codebook generated for the third transmission in a first resource of the control channel and a feedback codebook generated for the fourth transmission in a second resource of the control channel that differs from the first resource.

The UE feedback multiplexing condition determiner 1030 may determine that the feedback multiplexing condition is satisfied based on identifying a potential collision between a first resource configured for transmitting the first feedback codebook and a second resource configured for transmitting the second feedback codebook. In some examples, the UE feedback multiplexing condition determiner 1030 may determine that the feedback multiplexing condition is satisfied based on a time gap between a downlink control channel transmission that schedules a resource for transmitting the second feedback codebook and a beginning of a resource configured for transmitting the first feedback codebook satisfying a time threshold. In some examples, the UE feedback multiplexing condition determiner 1030 may determine that the feedback multiplexing condition is satisfied based on receiving downlink control information indicating that the UE is to multiplex the first feedback codebook with the second feedback codebook. In some examples, the UE feedback multiplexing condition determiner 1030 may identify that the feedback multiplexing condition is not satisfied.

The UE control signaling receiver 1035 may receive control signaling indicating the first resource and the second resource. In some examples, the UE control signaling receiver 1035 may receive control signaling that indicates the feedback codebook size. In some cases, the control signaling includes RRC signaling. In some examples, the UE control signaling receiver 1035 may receive control signaling that indicates a first size of the multiplexed feedback codebook and a second size of the second feedback codebook. In some examples, the UE control signaling receiver 1035 may receive control signaling indicating a first length for a multiplexing window that is reduced compared to a second length for the multiplexing window. In some examples, the UE control signaling receiver 1035 may receive control signaling to configure the UE to use the control channel format for transmitting the second feedback codebook. In some cases, the multiplexing window having the second length is applied based on determining that a first resource of the control channel that is allocated to the UE for transmitting the first feedback codebook does not overlap in time with a second resource of the control channel that is configured for transmitting the second feedback codebook. In some cases, the first resource is a dedicated resource. In some cases, the multiplexing window having the first length is positioned corresponding to a beginning or ending of a second multiplexing window having the second length.

The UE feedback bit bundler 1040 may bundle, based on the feedback codebook size, feedback bits generated for the first transmission to generate the first feedback codebook having the feedback codebook size. In some examples, the feedback codebook size is a single bit. In some examples, the UE feedback bit bundler 1040 may bundle, based on a size of the first feedback codebook exceeding the feedback codebook size, feedback bits generated for the first transmission to generate the first feedback codebook having the feedback codebook size. In some examples, the feedback codebook size is a single bit.

The UE feedback bit generator 1045 may generate each feedback bit of a set of feedback bits for a respective downlink carrier of a set of downlink carriers of the first transmission. In some examples, the UE feedback bit generator 1045 may generate a set of feedback bits based on monitoring for the first transmission.

The UE feedback codebook generator 1050 may generate the first feedback codebook having the feedback codebook size based on bundling the set of feedback bits on a downlink carrier by downlink carrier basis. In some examples, the UE feedback codebook generator 1050 may generate the first feedback codebook using the multiplexing window having the first length based on the feedback multiplexing condition being satisfied. In some examples, the UE feedback codebook generator 1050 may generate the second feedback codebook using the multiplexing window having the first length based on the feedback multiplexing condition being satisfied. In some cases, the multiplexing window having the second length is applied based on determining that a first resource of the control channel that is allocated to the UE for transmitting the first feedback codebook does not overlap in time with a second resource of the control channel that is configured for transmitting the second feedback codebook. In some cases, the multiplexing window having the first length is positioned corresponding to a beginning or ending of a second multiplexing window having the second length.

The UE feedback dropping component 1055 may drop at least one feedback bit of the set of feedback bits based on a total number of the set of feedback bits exceeding the feedback codebook size. In some cases, the at least one feedback bit is dropped based on a slot index, a component carrier index, or both, corresponding to the first transmission.

The UE resource set selector 1060 may select a first resource set of a set of control channel resource sets for the control channel based on the second size of the second feedback codebook, each set of the set of control channel resources sets corresponding to a respective range for the second size for the second feedback codebook, where the feedback codebook size is identified based on the range for the second size for the second feedback codebook corresponding to the first resource set. In some cases, the feedback codebook size is equal to a difference between a defined (e.g., maximum allowed) codebook size for the first resource set minus the second size of the second feedback codebook.

The UE feedback bit identifier 1065 may identify a number of feedback bits for the first feedback codebook corresponding to the feedback codebook size.

In some examples, the UE feedback bit identifier 1065 may select the feedback codebook size based on identifying a number of resources available in the shared data channel for transmitting the multiplexed feedback codebook that satisfies a ratio. In some cases, the ratio is an alpha ratio.

The UE multiplexing window length determiner 1070 may determine, based on the number of feedback bits, a first length for a multiplexing window that is reduced compared to a second length for the multiplexing window. In some examples, the UE multiplexing window length determiner 1070 may determine, based on the second feedback codebook size, a first length for a multiplexing window that is reduced compared to a second length for the multiplexing window.

The UE resource determiner 1075 may determine a number of resources configured for a control channel format, where the feedback codebook size is identified based on the number of resources. In some examples, the UE resource determiner 1075 may determine a defined number of information bits available to be conveyed over the number of resources configured for the control channel format, where the feedback codebook size is identified based on the defined number of information bits.

Figure 11:
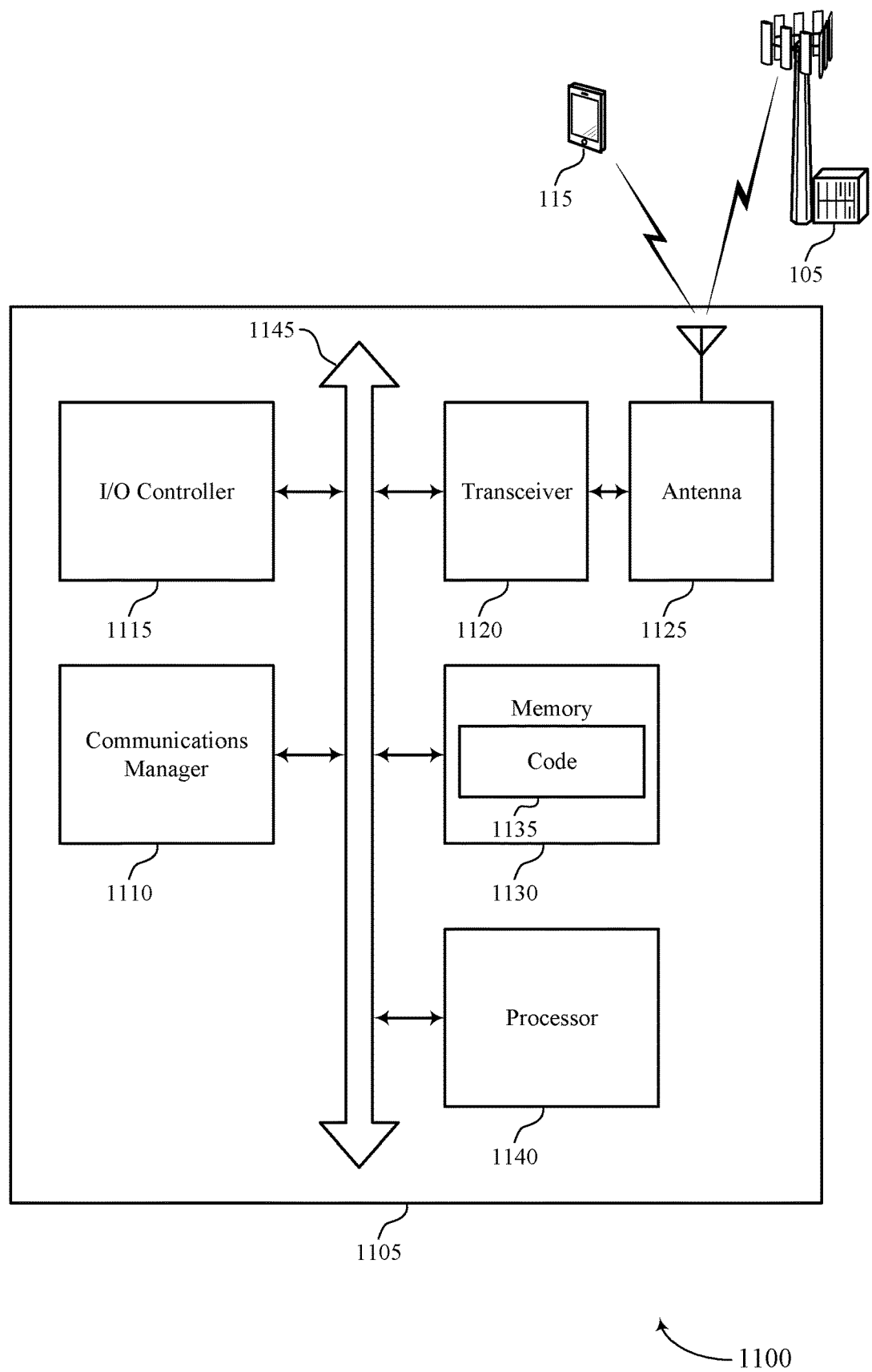
FIG. 11 shows a diagram of a system including a device that supports multiplexing codebooks generated for transmissions having different service types in accordance with aspects of the present disclosure.

FIG. 11 shows a diagram of a system 1100 including a device 1105 that supports multiplexing codebooks generated for transmissions having different service types in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may monitor for a first transmission of a first service type and a second transmission of a second service type, the second service type having a lower latency specification and a higher reliability specification than the first service type, identify a feedback codebook size for the first service type based on monitoring for the first transmission of the first service type, multiplex, based on a feedback multiplexing condition being satisfied, a first feedback codebook having the feedback codebook size generated for the first transmission with a second feedback codebook generated for the second transmission to generate a multiplexed feedback codebook, and transmit the multiplexed feedback codebook in a control channel or a shared data channel.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting multiplexing codebooks generated for transmissions having different service types).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
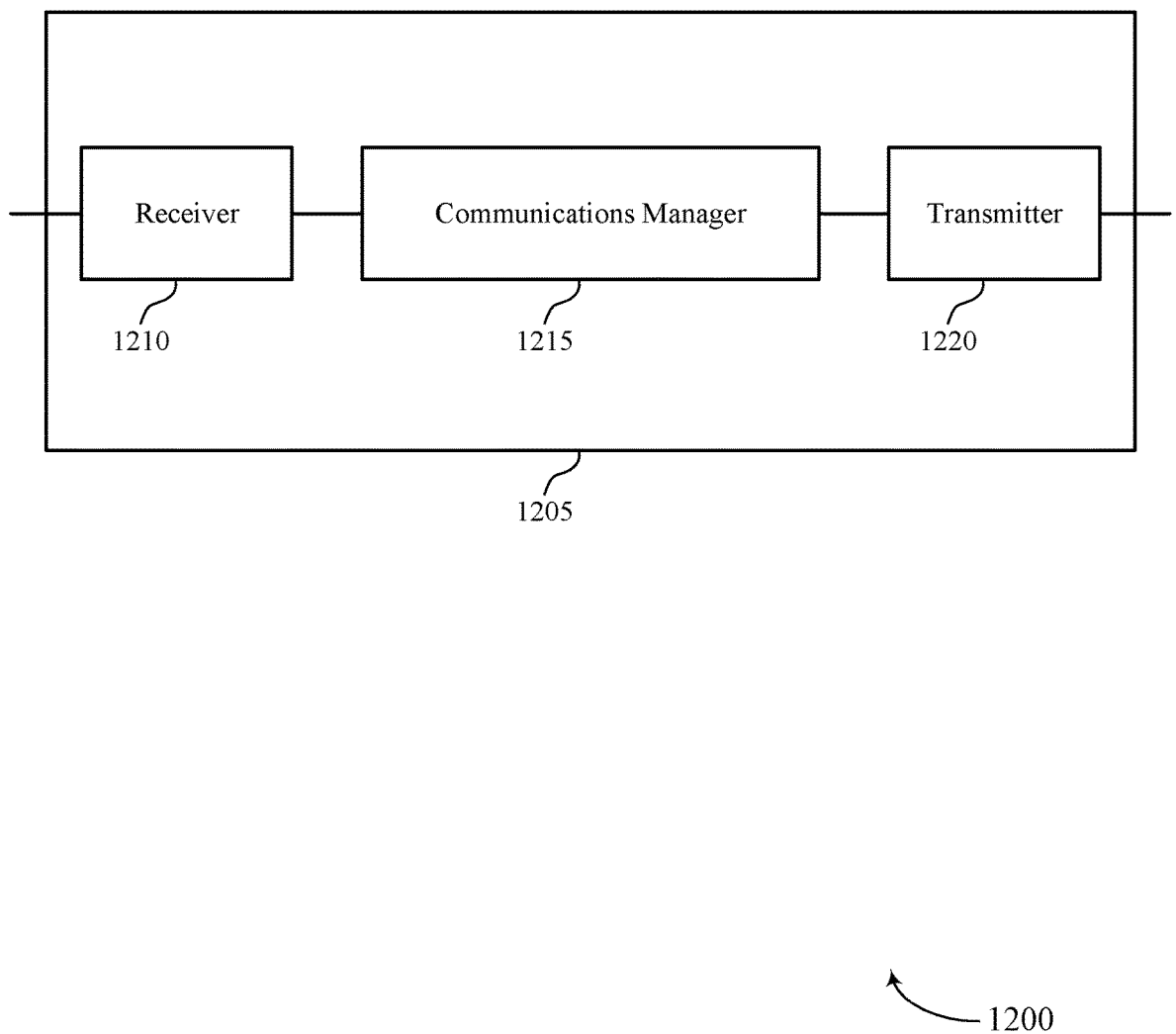
FIGS. 12 and 13 show block diagrams of devices that support multiplexing codebooks generated for transmissions having different service types in accordance with aspects of the present disclosure.

FIG. 12 shows a block diagram 1200 of a device 1205 that supports multiplexing codebooks generated for transmissions having different service types in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to multiplexing codebooks generated for transmissions having different service types, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit a first transmission of a first service type and a second transmission of a second service type, the second service type having a lower latency specification and a higher reliability specification than the first service type, identify a feedback codebook size for the first service type based on transmitting the first transmission of the first service type, and receive, in a control channel or a shared data channel, a multiplexed feedback codebook generated based on a first feedback codebook having the feedback codebook size generated for the first transmission being multiplexed with a second feedback codebook generated for the second transmission. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
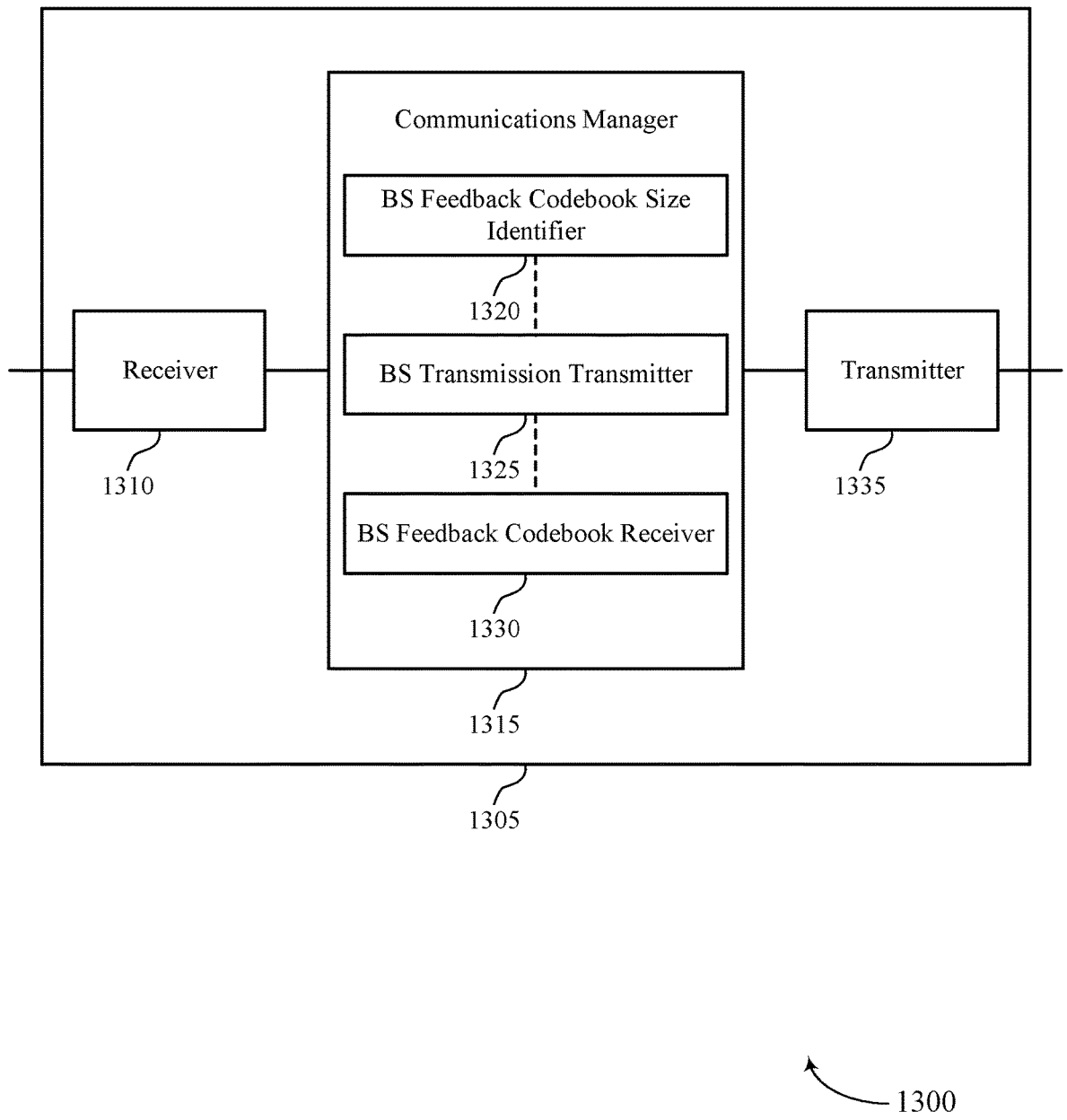

FIG. 13 shows a block diagram 1300 of a device 1305 that supports multiplexing codebooks generated for transmissions having different service types in accordance with aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to multiplexing codebooks generated for transmissions having different service types, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a BS feedback codebook size identifier 1320, a BS transmission transmitter 1325, and a BS feedback codebook receiver 1330. The communications manager 1315 may be an example of aspects of the communications manager 1510 described herein.

The BS feedback codebook size identifier 1320 may identify a feedback codebook size for a first service type based on transmitting the first transmission of the first service type.

The BS transmission transmitter 1325 may transmit a first transmission of the first service type and a second transmission of a second service type, the second service type having a lower latency specification and a higher reliability specification than the first service type.

The BS feedback codebook receiver 1330 may receive, in a control channel or a shared data channel, a multiplexed feedback codebook generated based on a first feedback codebook having the feedback codebook size generated for the first transmission being multiplexed with a second feedback codebook generated for the second transmission.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
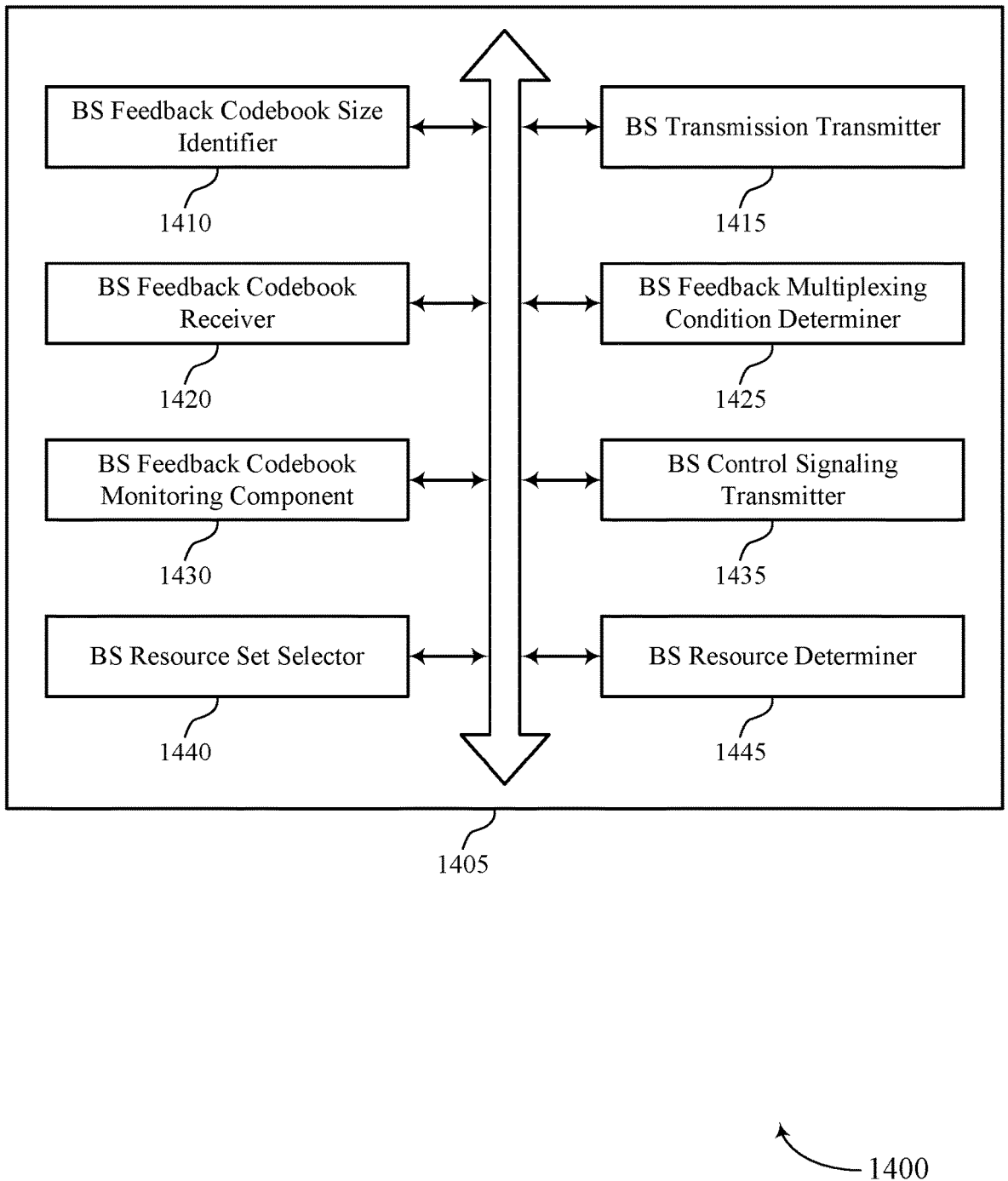
FIG. 14 shows a block diagram of a communications manager that supports multiplexing codebooks generated for transmissions having different service types in accordance with aspects of the present disclosure.

FIG. 14 shows a block diagram 1400 of a communications manager 1405 that supports multiplexing codebooks generated for transmissions having different service types in accordance with aspects of the present disclosure. The communications manager 1405 may be an example of aspects of a communications manager 1215, a communications manager 1315, or a communications manager 1510 described herein. The communications manager 1405 may include a BS feedback codebook size identifier 1410, a BS transmission transmitter 1415, a BS feedback codebook receiver 1420, a BS feedback multiplexing condition determiner 1425, a BS feedback codebook monitoring component 1430, a BS control signaling transmitter 1435, a BS resource set selector 1440, and a BS resource determiner 1445. Each of these modules may communicate, directly or indirectly, with one another (e.g., via one or more buses).

The BS feedback codebook size identifier 1410 may identify a feedback codebook size for a first service type based on transmitting the first transmission of the first service type. In some examples, the BS feedback codebook size identifier 1410 may determine the feedback codebook size based on the first size and the second size. In some examples, the BS feedback codebook size identifier 1410 may identify the feedback codebook size based on a defined number (e.g., maximum) of resource blocks (RBs) for a control channel resource, a defined coding rate (e.g., maximum) for the control channel resource, a modulation order of the control channel resource, and a number of OFDM symbols of the control channel resource. In some examples, the BS feedback codebook size identifier 1410 may select the feedback codebook size based on identifying a number of resources available in the shared data channel for transmitting the multiplexed feedback codebook that satisfies a ratio. In some cases, the ratio is an alpha ratio. In some cases, the feedback codebook size is a number of feedback bits available for providing feedback on the first transmission of the first service type.

The BS transmission transmitter 1415 may transmit a first transmission of the first service type and a second transmission of a second service type, the second service type having a lower latency specification and a higher reliability specification than the first service type. In some examples, the BS transmission transmitter 1415 may transmit a third transmission of the first service type and a fourth transmission of the second service type. In some cases, the first service type is an enhanced mobile broadband service and the second service type is an ultra-reliable low latency service.

The BS feedback codebook receiver 1420 may receive, in a control channel or a shared data channel, a multiplexed feedback codebook generated based on a first feedback codebook having the feedback codebook size generated for the first transmission being multiplexed with a second feedback codebook generated for the second transmission. In some examples, the BS feedback codebook receiver 1420 may receive the multiplexed feedback codebook on the control channel based on a resource of the control channel that is configured to a user equipment for transmitting the first feedback codebook at least partially overlapping in time with a resource of the control channel that is allocated to the user equipment for transmitting the second feedback codebook. In some examples, BS feedback codebook receiver 1420 may receive the multiplexed feedback codebook on the control channel, where the control channel is configured for receiving the second feedback codebook. In some examples, the BS feedback codebook receiver 1420 may receive the multiplexed feedback codebook on the shared data channel based on a resource of the shared data channel that is allocated to a user equipment at least partially overlapping with a resource of the control channel that is configured for transmitting the first feedback codebook. In some examples, the BS feedback codebook receiver 1420 may receive the multiplexed feedback codebook on the shared data channel based on a time gap between a downlink control channel transmission scheduling a resource for a user equipment to transmit an uplink shared channel transmission and a beginning of a resource configured for transmitting the first feedback codebook satisfying a time threshold. In some examples, the BS feedback codebook receiver 1420 may receive the multiplexed feedback codebook on the shared data channel based on transmitting downlink control information indicating that a user equipment is to transmit the multiplexed feedback codebook on the shared data channel. In some examples, the BS feedback codebook receiver 1420 may transmit control signaling that indicates a first size of the multiplexed feedback codebook and a second size of the second feedback codebook. In some examples, the BS feedback codebook receiver 1420 may receive a feedback codebook generated for the third transmission in a first resource of the control channel and a feedback codebook generated for the fourth transmission in a second resource of the control channel that differs from the first resource.

The BS feedback multiplexing condition determiner 1425 may determine that a feedback multiplexing condition is satisfied based on identifying a potential collision between a first resource configured for transmitting the first feedback codebook and a second resource configured for transmitting the second feedback codebook. In some examples, the BS feedback multiplexing condition determiner 1425 may determine that a feedback multiplexing condition is satisfied based on a time gap between a downlink control channel transmission that schedules a resource for transmitting the second feedback codebook and a beginning of a resource configured for transmitting the first feedback codebook satisfying a time threshold. In some examples, the BS feedback multiplexing condition determiner 1425 may determine that a feedback multiplexing condition is satisfied based on transmitting downlink control information indicating that a user equipment is to multiplex the first feedback codebook with the second feedback codebook. In some examples, the BS feedback multiplexing condition determiner 1425 may identify that a feedback multiplexing condition is not satisfied.

The BS feedback codebook monitoring component 1430 may monitor the control channel or the shared data channel for the multiplexed feedback codebook based on the feedback multiplexing condition being satisfied.

The BS control signaling transmitter 1435 may transmit control signaling indicating the first resource and the second resource. In some examples, the BS control signaling transmitter 1435 may transmit control signaling that indicates the feedback codebook size. In some cases, the control signaling includes RRC signaling. In some examples, the BS control signaling transmitter 1435 may transmit control signaling indicating a first length for a multiplexing window that is reduced compared to a second length for the multiplexing window. In some examples, the BS control signaling transmitter 1435 may transmit control signaling to configure a user equipment to use the control channel format for transmitting the second feedback codebook.

The BS resource set selector 1440 may select a first resource set of a set of control channel resources sets for the control channel based on the second size of the second feedback codebook, each set of the set of control channel resources sets corresponding to a respective range for the second size for the second feedback codebook, where the feedback codebook size is identified based on the range for the second size for the second feedback codebook corresponding to the first resource set. In some cases, the feedback codebook size is equal to a difference between a defined (e.g., maximum allowed) codebook size for the first resource set minus the second size of the second feedback codebook.

The BS resource determiner 1445 may determine a number of resources configured for a control channel format, where the feedback codebook size is identified based on the number of resources. In some examples, the BS resource determiner 1445 may determine a defined number of information bits available to be conveyed over the number of resources configured for the control channel format, where the feedback codebook size is identified based on the defined number of information bits.

Figure 15:
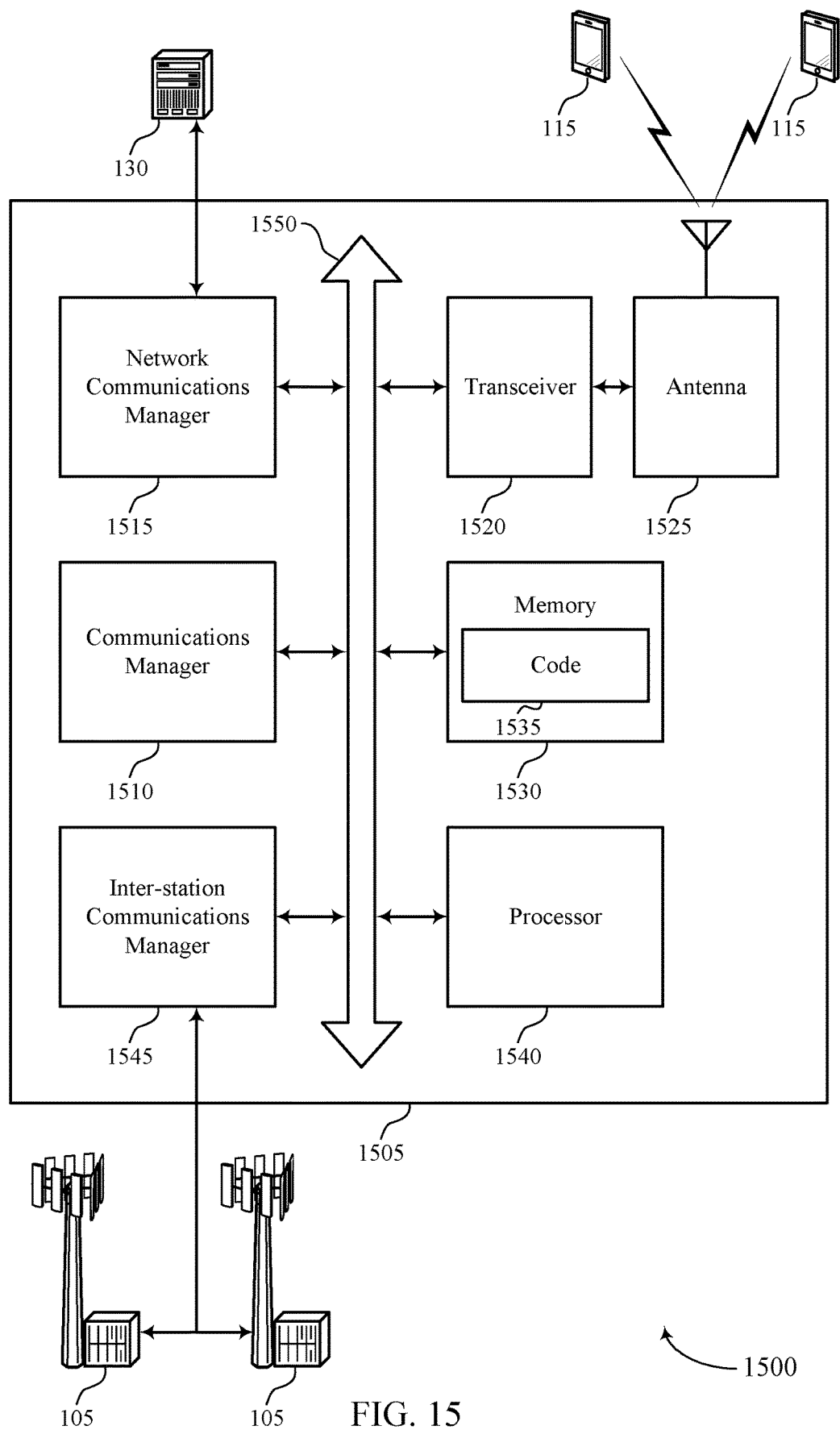
FIG. 15 shows a diagram of a system including a device that supports multiplexing codebooks generated for transmissions having different service types in accordance with aspects of the present disclosure.

FIG. 15 shows a diagram of a system 1500 including a device 1505 that supports multiplexing codebooks generated for transmissions having different service types in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit a first transmission of a first service type and a second transmission of a second service type, the second service type having a lower latency specification and a higher reliability specification than the first service type, identify a feedback codebook size for the first service type based on transmitting the first transmission of the first service type, and receive, in a control channel or a shared data channel, a multiplexed feedback codebook generated based on a first feedback codebook having the feedback codebook size generated for the first transmission being multiplexed with a second feedback codebook generated for the second transmission.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor

1540. The processor 1540 may be configured to execute computer-readable instructions stored in a memory (e.g., the memory 1530) to cause the device 1505 to perform various functions (e.g., functions or tasks supporting multiplexing codebooks generated for transmissions having different service types).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
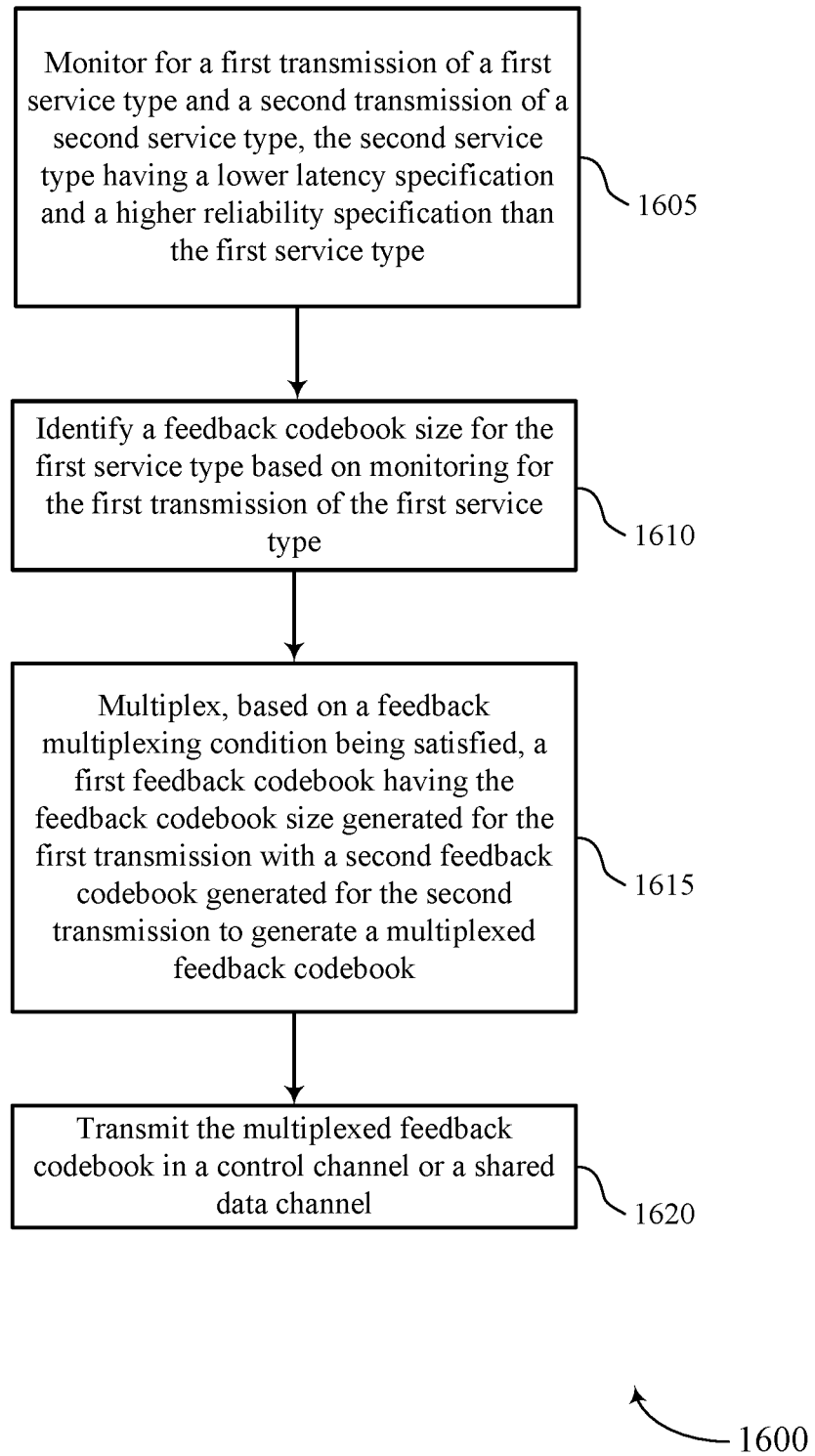
FIGS. 16 through 26 show flowcharts illustrating methods that support multiplexing codebooks generated for transmissions having different service types in accordance with aspects of the present disclosure.

FIG. 16 shows a flowchart illustrating a method 1600 that supports multiplexing codebooks generated for transmissions having different service types in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may monitor for a first transmission of a first service type and a second transmission of a second service type, the second service type having a lower latency specification and a higher reliability specification than the first service type. The operations of 1605 may be performed according to the methods described herein. In some examples, aspects of the operations of 1605 may be performed by an UE transmission monitoring component as described with reference to FIGS. 8 through 11.

At 1610, the UE may identify a feedback codebook size for the first service type based on monitoring for the first transmission of the first service type. The operations of 1610 may be performed according to the methods described herein. In some examples, aspects of the operations of 1610 may be performed by an UE feedback codebook size identifier as described with reference to FIGS. 8 through 11.

At 1615, the UE may multiplex, based on a feedback multiplexing condition being satisfied, a first feedback codebook having the feedback codebook size generated for the first transmission with a second feedback codebook generated for the second transmission to generate a multiplexed feedback codebook. The operations of 1615 may be performed according to the methods described herein. In some examples, aspects of the operations of 1615 may be performed by an UE feedback codebook multiplexer as described with reference to FIGS. 8 through 11.

At 1620, the UE may transmit the multiplexed feedback codebook in a control channel or a shared data channel. The operations of 1620 may be performed according to the methods described herein. In some examples, aspects of the operations of 1620 may be performed by an UE feedback codebook transmitter as described with reference to FIGS. 8 through 11.

Figure 17:
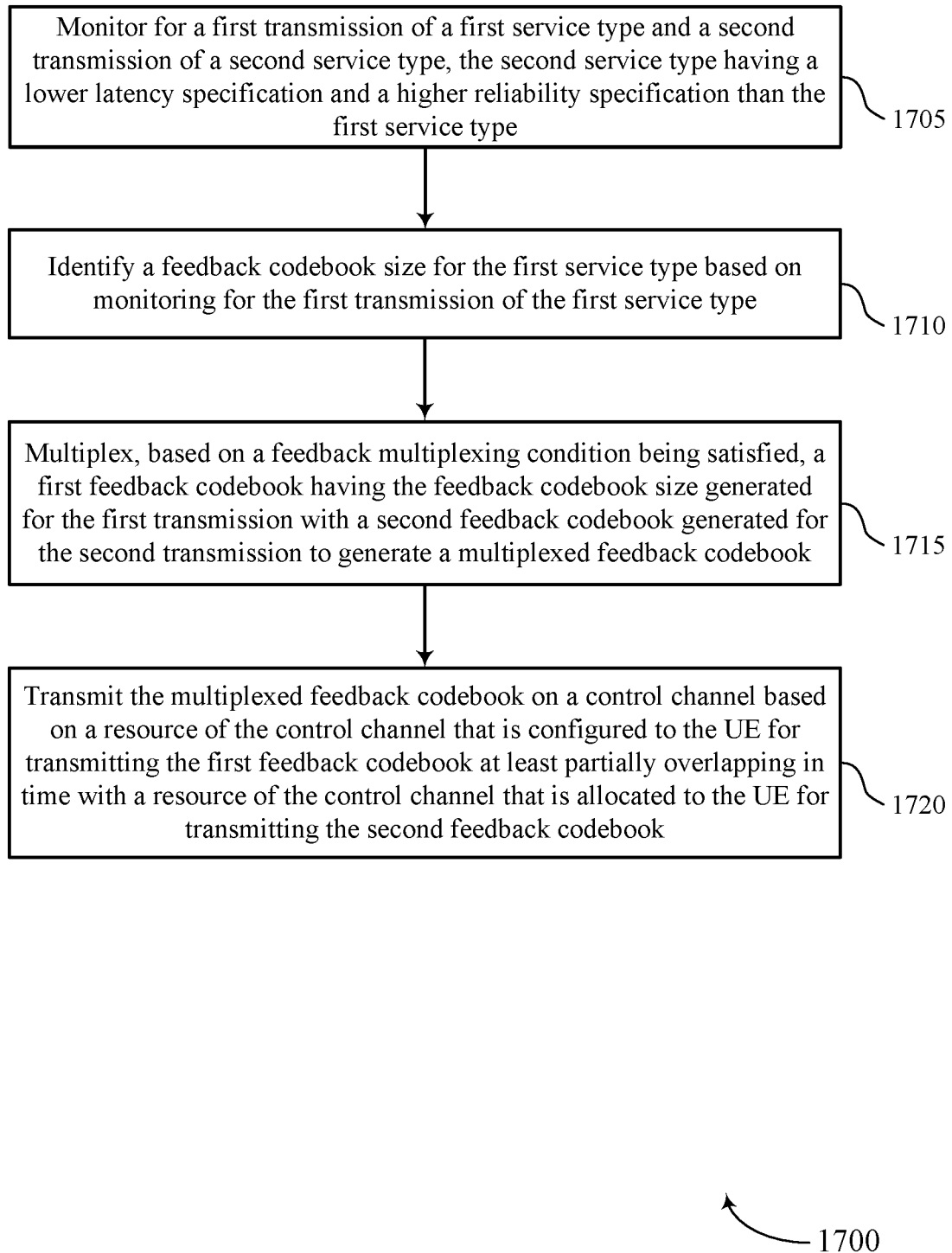

FIG. 17 shows a flowchart illustrating a method 1700 that supports multiplexing codebooks generated for transmissions having different service types in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may monitor for a first transmission of a first service type and a second transmission of a second service type, the second service type having a lower latency specification and a higher reliability specification than the first service type. The operations of 1705 may be performed according to the methods described herein. In some examples, aspects of the operations of 1705 may be performed by an UE transmission monitoring component as described with reference to FIGS. 8 through 11.

At 1710, the UE may identify a feedback codebook size for the first service type based on monitoring for the first transmission of the first service type. The operations of 1710 may be performed according to the methods described herein. In some examples, aspects of the operations of 1710 may be performed by an UE feedback codebook size identifier as described with reference to FIGS. 8 through 11.

At 1715, the UE may multiplex, based on a feedback multiplexing condition being satisfied, a first feedback codebook having the feedback codebook size generated for the first transmission with a second feedback codebook generated for the second transmission to generate a multiplexed feedback codebook. The operations of 1715 may be performed according to the methods described herein. In some examples, aspects of the operations of 1715 may be performed by an UE feedback codebook multiplexer as described with reference to FIGS. 8 through 11.

At 1720, the UE may transmit the multiplexed feedback codebook on a control channel based on a resource of the control channel that is allocated to the UE for transmitting the first feedback codebook at least partially overlapping in time with a resource of the control channel that is configured to the UE for transmitting the second feedback codebook. The operations of 1720 may be performed according to the methods described herein. In some examples, aspects of the operations of 1720 may be performed by an UE feedback codebook transmitter as described with reference to FIGS. 8 through 11.

Figure 18:
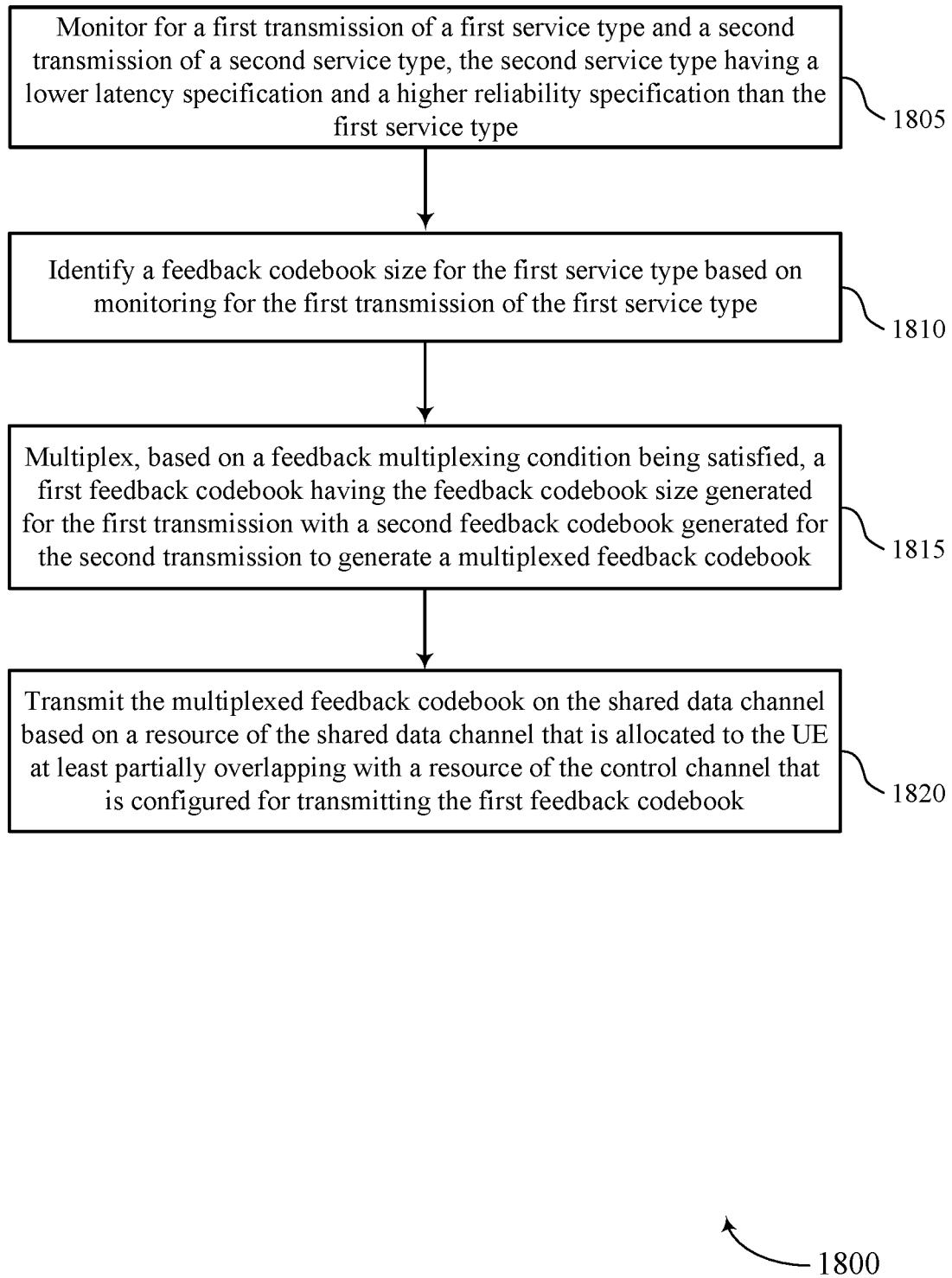

FIG. 18 shows a flowchart illustrating a method 1800 that supports multiplexing codebooks generated for transmissions having different service types in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may monitor for a first transmission of a first service type and a second transmission of a second service type, the second service type having a lower latency specification and a higher reliability specification than the first service type. The operations of 1805 may be performed according to the methods described herein. In some examples, aspects of the operations of 1805 may be performed by an UE transmission monitoring component as described with reference to FIGS. 8 through 11.

At 1810, the UE may identify a feedback codebook size for the first service type based on monitoring for the first transmission of the first service type. The operations of 1810 may be performed according to the methods described herein. In some examples, aspects of the operations of 1810 may be performed by an UE feedback codebook size identifier as described with reference to FIGS. 8 through 11.

At 1815, the UE may multiplex, based on a feedback multiplexing condition being satisfied, a first feedback codebook having the feedback codebook size generated for the first transmission with a second feedback codebook generated for the second transmission to generate a multiplexed feedback codebook. The operations of 1815 may be performed according to the methods described herein. In some examples, aspects of the operations of 1815 may be performed by an UE feedback codebook multiplexer as described with reference to FIGS. 8 through 11.

At 1820, the UE may transmit the multiplexed feedback codebook on a shared data channel based on a resource of the shared data channel that is allocated to the UE at least partially overlapping with a resource of the control channel that is configured for transmitting the first feedback codebook. The operations of 1820 may be performed according to the methods described herein. In some examples, aspects of the operations of 1820 may be performed by an UE feedback codebook transmitter as described with reference to FIGS. 8 through 11.

Figure 19:
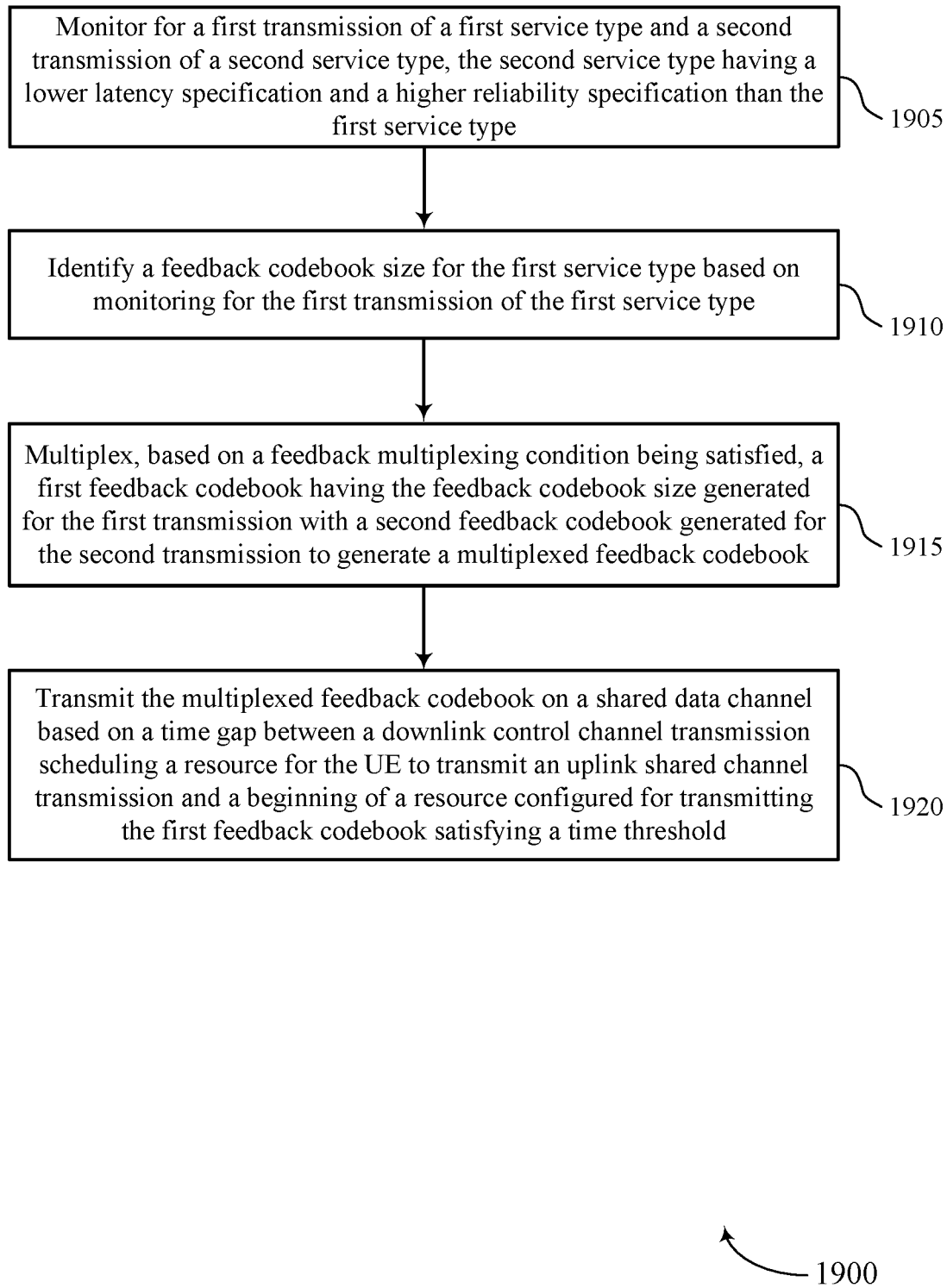

FIG. 19 shows a flowchart illustrating a method 1900 that supports multiplexing codebooks generated for transmissions having different service types in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1905, the UE may monitor for a first transmission of a first service type and a second transmission of a second service type, the second service type having a lower latency specification and a higher reliability specification than the first service type. The operations of 1905 may be performed according to the methods described herein. In some examples, aspects of the operations of 1905 may be performed by an UE transmission monitoring component as described with reference to FIGS. 8 through 11.

At 1910, the UE may identify a feedback codebook size for the first service type based on monitoring for the first transmission of the first service type. The operations of 1910 may be performed according to the methods described herein. In some examples, aspects of the operations of 1910 may be performed by an UE feedback codebook size identifier as described with reference to FIGS. 8 through 11.

At 1915, the UE may multiplex, based on a feedback multiplexing condition being satisfied, a first feedback codebook having the feedback codebook size generated for the first transmission with a second feedback codebook generated for the second transmission to generate a multiplexed feedback codebook. The operations of 1915 may be performed according to the methods described herein. In some examples, aspects of the operations of 1915 may be performed by an UE feedback codebook multiplexer as described with reference to FIGS. 8 through 11.

At 1920, the UE may transmit the multiplexed feedback codebook on a shared data channel based on a time gap between a downlink control channel transmission scheduling a resource for the UE to transmit an uplink shared channel transmission and a beginning of a resource configured for transmitting the first feedback codebook satisfying a time threshold. The operations of 1920 may be performed according to the methods described herein. In some examples, aspects of the operations of 1920 may be performed by an UE feedback codebook transmitter as described with reference to FIGS. 8 through 11.

Figure 20:
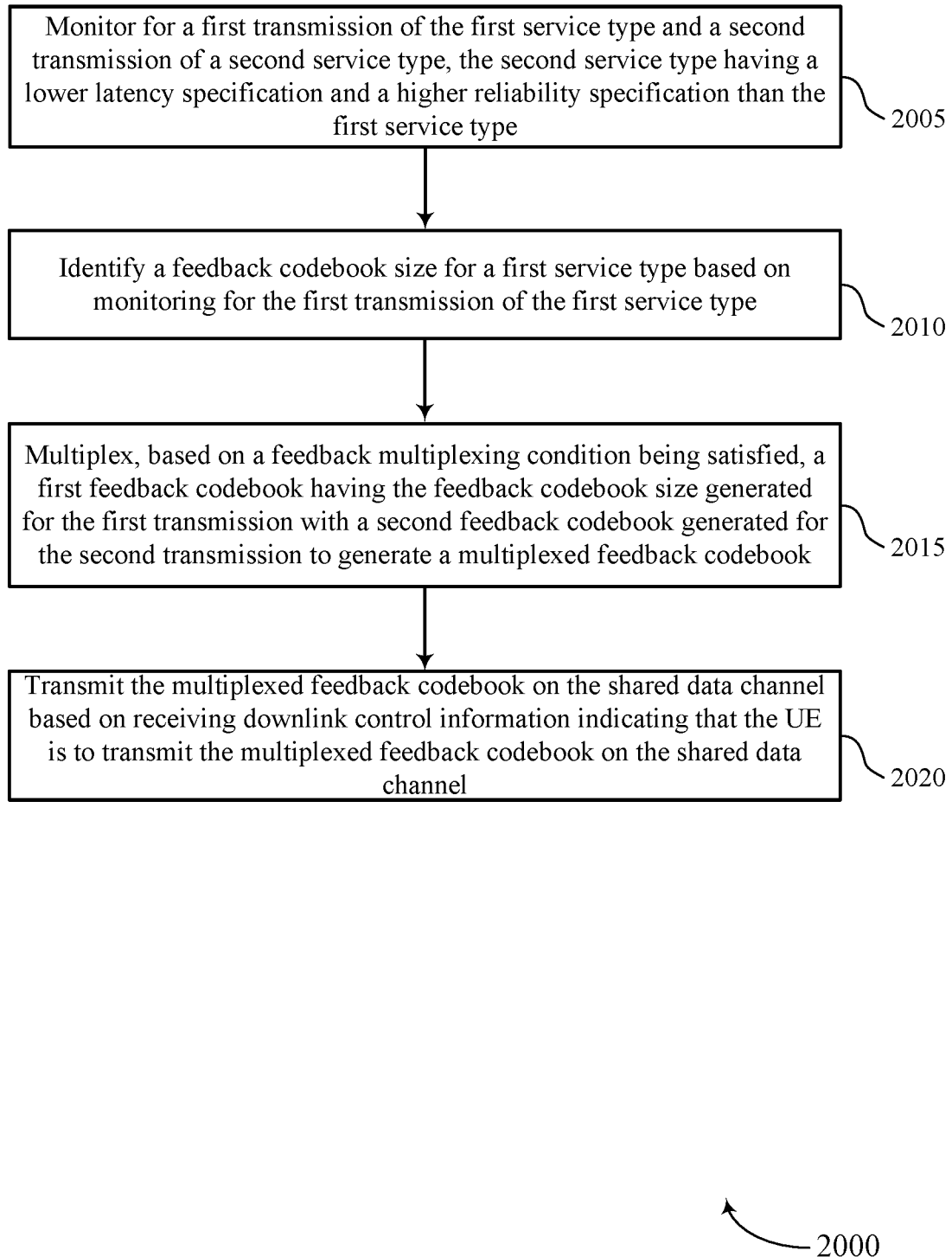

FIG. 20 shows a flowchart illustrating a method 2000 that supports multiplexing codebooks generated for transmissions having different service types in accordance with aspects of the present disclosure. The operations of method 2000 may be implemented by a UE 115 or its components as described herein. For example, the operations of method 2000 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2005, the UE may monitor for a first transmission of a first service type and a second transmission of a second service type, the second service type having a lower latency specification and a higher reliability specification than the first service type. The operations of 2005 may be performed according to the methods described herein. In some examples, aspects of the operations of 2005 may be performed by an UE transmission monitoring component as described with reference to FIGS. 8 through 11.

At 2010, the UE may identify a feedback codebook size for the first service type based on monitoring for the first transmission of the first service type. The operations of 2010 may be performed according to the methods described herein. In some examples, aspects of the operations of 2010 may be performed by an UE feedback codebook size identifier as described with reference to FIGS. 8 through 11.

At 2015, the UE may multiplex, based on a feedback multiplexing condition being satisfied, a first feedback codebook having the feedback codebook size generated for the first transmission with a second feedback codebook generated for the second transmission to generate a multiplexed feedback codebook. The operations of 2015 may be performed according to the methods described herein. In some examples, aspects of the operations of 2015 may be performed by an UE feedback codebook multiplexer as described with reference to FIGS. 8 through 11.

At 2020, the UE may transmit the multiplexed feedback codebook on the shared data channel based on receiving downlink control information indicating that the UE is to transmit the multiplexed feedback codebook on the shared data channel. The operations of 2020 may be performed according to the methods described herein. In some examples, aspects of the operations of 2020 may be performed by an UE feedback codebook transmitter as described with reference to FIGS. 8 through 11.

Figure 21:
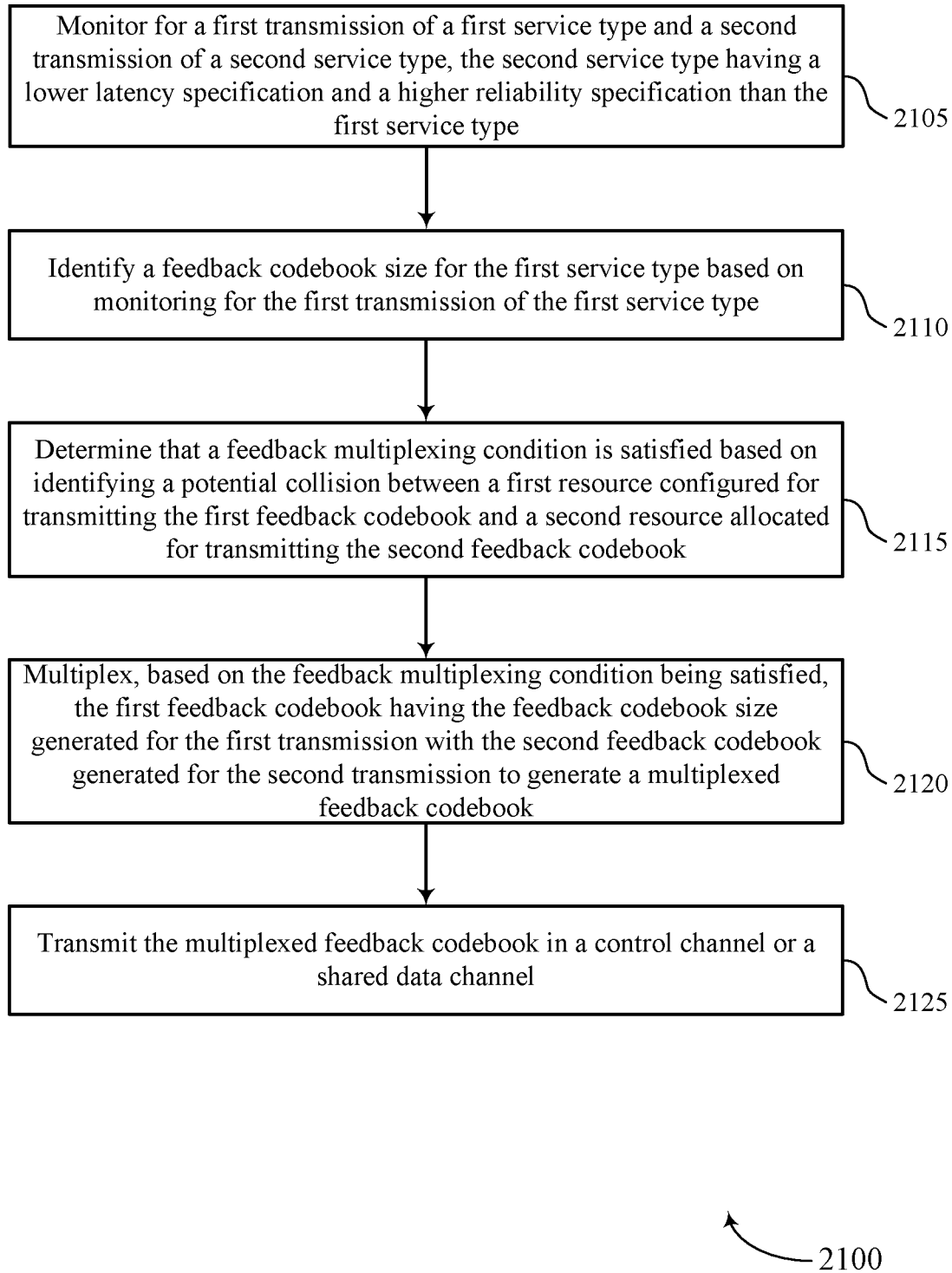

FIG. 21 shows a flowchart illustrating a method 2100 that supports multiplexing codebooks generated for transmissions having different service types in accordance with aspects of the present disclosure. The operations of method 2100 may be implemented by a UE 115 or its components as described herein. For example, the operations of method 2100 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2105, the UE may monitor for a first transmission of a first service type and a second transmission of a second service type, the second service type having a lower latency specification and a higher reliability specification than the first service type. The operations of 2105 may be performed according to the methods described herein. In some examples, aspects of the operations of 2105 may be performed by an UE transmission monitoring component as described with reference to FIGS. 8 through 11.

At 2110, the UE may identify a feedback codebook size for the first service type based on monitoring for the first transmission of the first service type. The operations of 2110 may be performed according to the methods described herein. In some examples, aspects of the operations of 2110 may be performed by an UE feedback codebook size identifier as described with reference to FIGS. 8 through 11.

At 2115, the UE may determine that a feedback multiplexing condition is satisfied based on identifying a potential collision between a first resource configured for transmitting a first feedback codebook and a second resource configured for transmitting a second feedback codebook. The operations of 2115 may be performed according to the methods described herein. In some examples, aspects of the operations of 2115 may be performed by an UE feedback multiplexing condition determiner as described with reference to FIGS. 8 through 11.

At 2120, the UE may multiplex, based on the feedback multiplexing condition being satisfied, the first feedback codebook having the feedback codebook size generated for the first transmission with the second feedback codebook generated for the second transmission to generate a multiplexed feedback codebook. The operations of 2120 may be performed according to the methods described herein. In some examples, aspects of the operations of 2120 may be performed by an UE feedback codebook multiplexer as described with reference to FIGS. 8 through 11.

At 2125, the UE may transmit the multiplexed feedback codebook in a control channel or a shared data channel. The operations of 2125 may be performed according to the methods described herein. In some examples, aspects of the operations of 2125 may be performed by an UE feedback codebook transmitter as described with reference to FIGS. 8 through 11.

Figure 22:
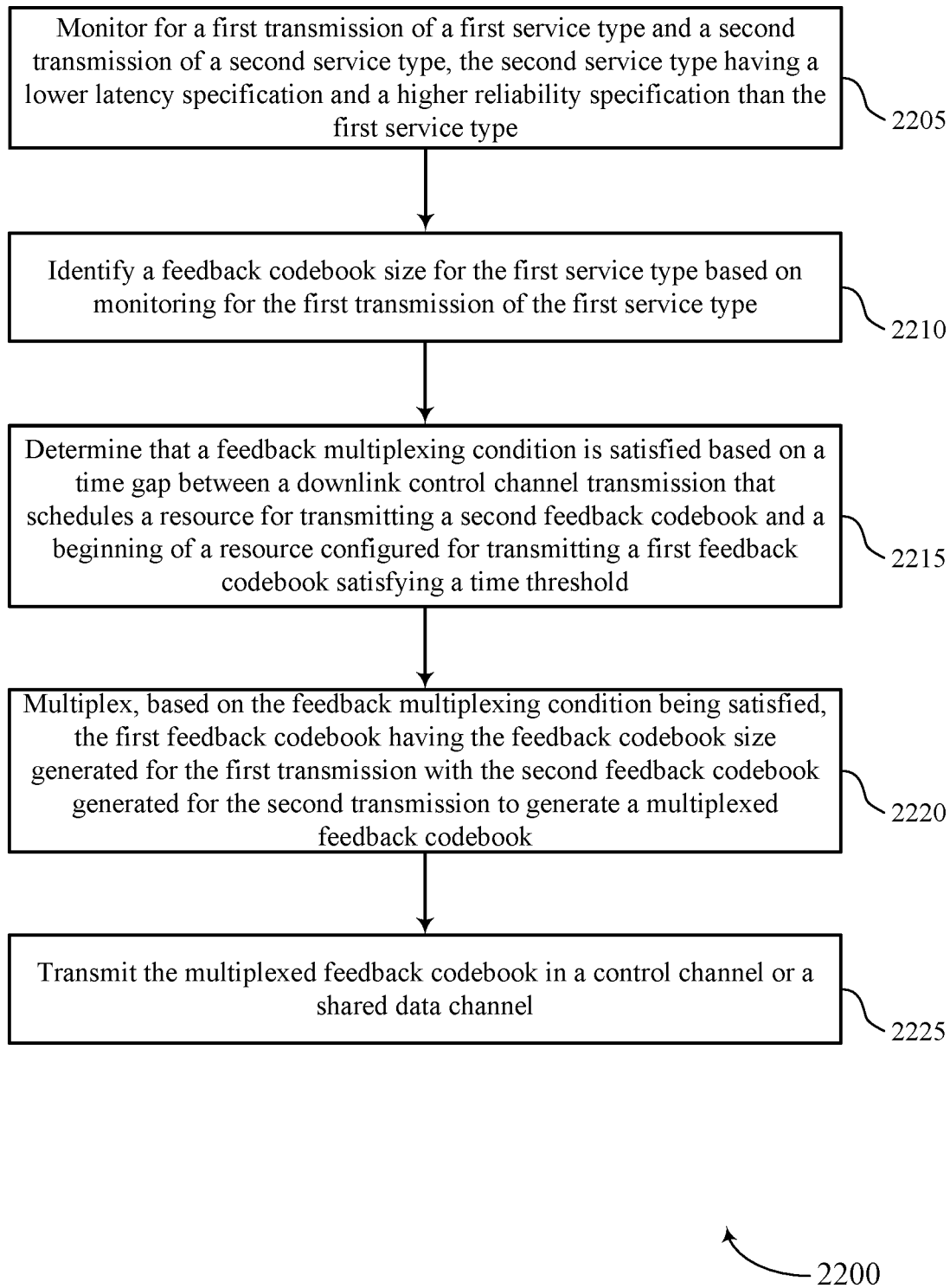

FIG. 22 shows a flowchart illustrating a method 2200 that supports multiplexing codebooks generated for transmissions having different service types in accordance with aspects of the present disclosure. The operations of method 2200 may be implemented by a UE 115 or its components as described herein. For example, the operations of method 2200 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2205, the UE may monitor for a first transmission of a first service type and a second transmission of a second service type, the second service type having a lower latency specification and a higher reliability specification than the first service type. The operations of 2205 may be performed according to the methods described herein. In some examples, aspects of the operations of 2205 may be performed by an UE transmission monitoring component as described with reference to FIGS. 8 through 11.

At 2210, the UE may identify a feedback codebook size for the first service type based on monitoring for the first transmission of the first service type. The operations of 2210 may be performed according to the methods described herein. In some examples, aspects of the operations of 2210 may be performed by an UE feedback codebook size identifier as described with reference to FIGS. 8 through 11.

At 2215, the UE may determine that a feedback multiplexing condition is satisfied based on a time gap between a downlink control channel transmission that schedules a resource for transmitting a second feedback codebook and a beginning of a resource configured for transmitting a first feedback codebook satisfying a time threshold. The operations of 2215 may be performed according to the methods described herein. In some examples, aspects of the operations of 2215 may be performed by an UE feedback multiplexing condition determiner as described with reference to FIGS. 8 through 11.

At 2220, the UE may multiplex, based on the feedback multiplexing condition being satisfied, the first feedback codebook having the feedback codebook size generated for the first transmission with the second feedback codebook generated for the second transmission to generate a multiplexed feedback codebook. The operations of 2220 may be performed according to the methods described herein. In some examples, aspects of the operations of 2220 may be performed by an UE feedback codebook multiplexer as described with reference to FIGS. 8 through 11.

At 2225, the UE may transmit the multiplexed feedback codebook in a control channel or a shared data channel. The operations of 2225 may be performed according to the methods described herein. In some examples, aspects of the operations of 2225 may be performed by an UE feedback codebook transmitter as described with reference to FIGS. 8 through 11.

Figure 23:
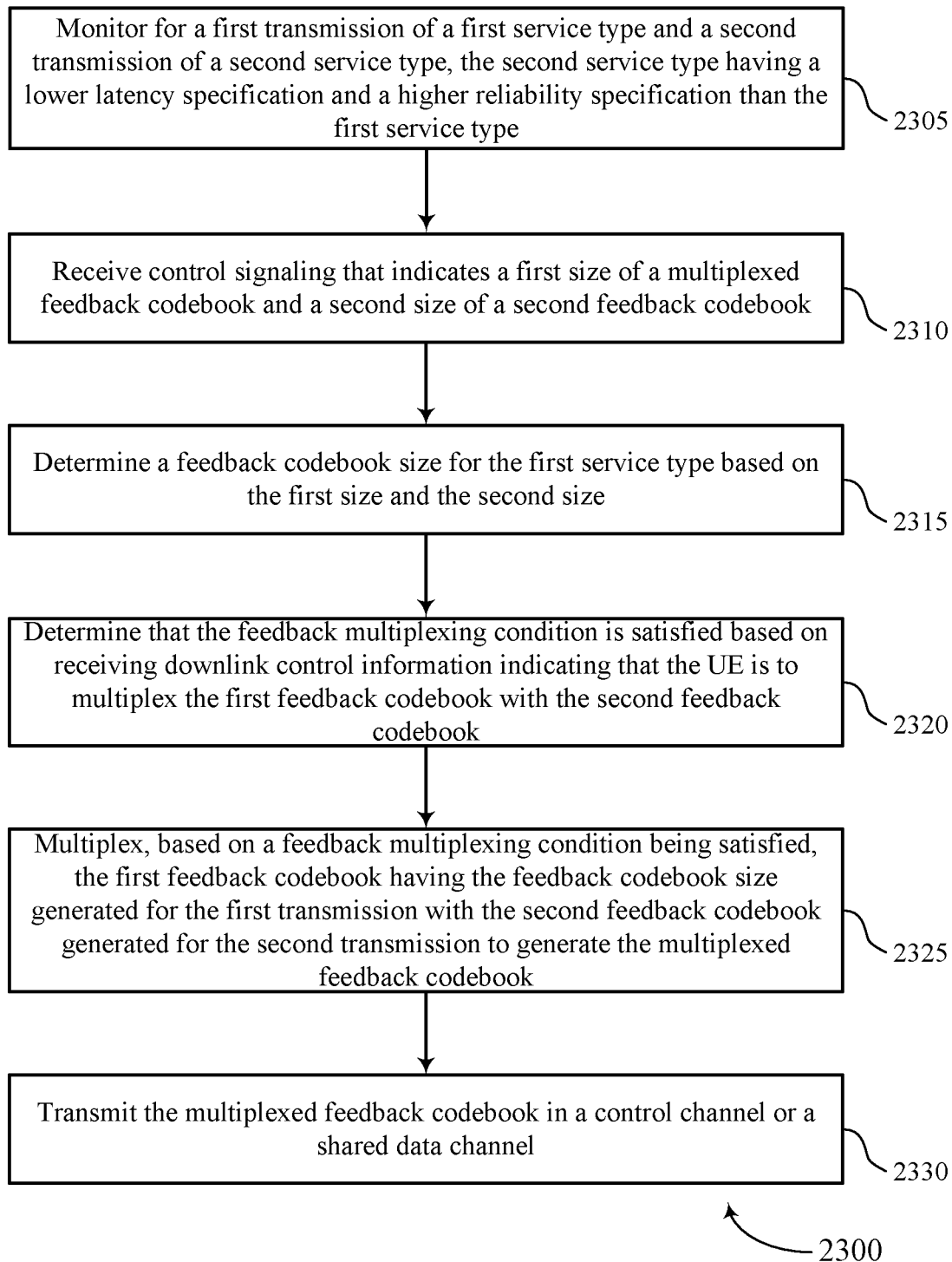

FIG. 23 shows a flowchart illustrating a method 2300 that supports multiplexing codebooks generated for transmissions having different service types in accordance with aspects of the present disclosure. The operations of method 2300 may be implemented by a UE 115 or its components as described herein. For example, the operations of method 2300 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2305, the UE may monitor for a first transmission of a first service type and a second transmission of a second service type, the second service type having a lower latency specification and a higher reliability specification than the first service type. The operations of 2305 may be performed according to the methods described herein. In some examples, aspects of the operations of 2305 may be performed by an UE transmission monitoring component as described with reference to FIGS. 8 through 11.

At 2310, the UE may receive control signaling that indicates a first size of a multiplexed feedback codebook and a second size of a second feedback codebook. The operations of 2310 may be performed according to the methods described herein. In some examples, aspects of the operations of 2310 may be performed by an UE control signaling receiver as described with reference to FIGS. 8 through 11.

At 2315, the UE may determine a feedback codebook size for the first service type based on the first size and the second size. The operations of 2315 may be performed according to the methods described herein. In some examples, aspects of the operations of 2315 may be performed by an UE feedback codebook size identifier as described with reference to FIGS. 8 through 11.

At 2320, the UE may determine that the feedback multiplexing condition is satisfied based on receiving downlink control information indicating that the UE is to multiplex the first feedback codebook with the second feedback codebook. The operations of 2320 may be performed according to the methods described herein. In some examples, aspects of the operations of 2320 may be performed by an UE feedback multiplexing condition determiner as described with reference to FIGS. 8 through 11.

At 2325, the UE may multiplex, based on a feedback multiplexing condition being satisfied, the first feedback codebook having the feedback codebook size generated for the first transmission with the second feedback codebook generated for the second transmission to generate the multiplexed feedback codebook. The operations of 2325 may be performed according to the methods described herein. In some examples, aspects of the operations of 2325 may be performed by an UE feedback codebook multiplexer as described with reference to FIGS. 8 through 11.

At 2330, the UE may transmit the multiplexed feedback codebook in a control channel or a shared data channel. The operations of 2330 may be performed according to the methods described herein. In some examples, aspects of the operations of 2330 may be performed by an UE feedback codebook transmitter as described with reference to FIGS. 8 through 11.

Figure 24:
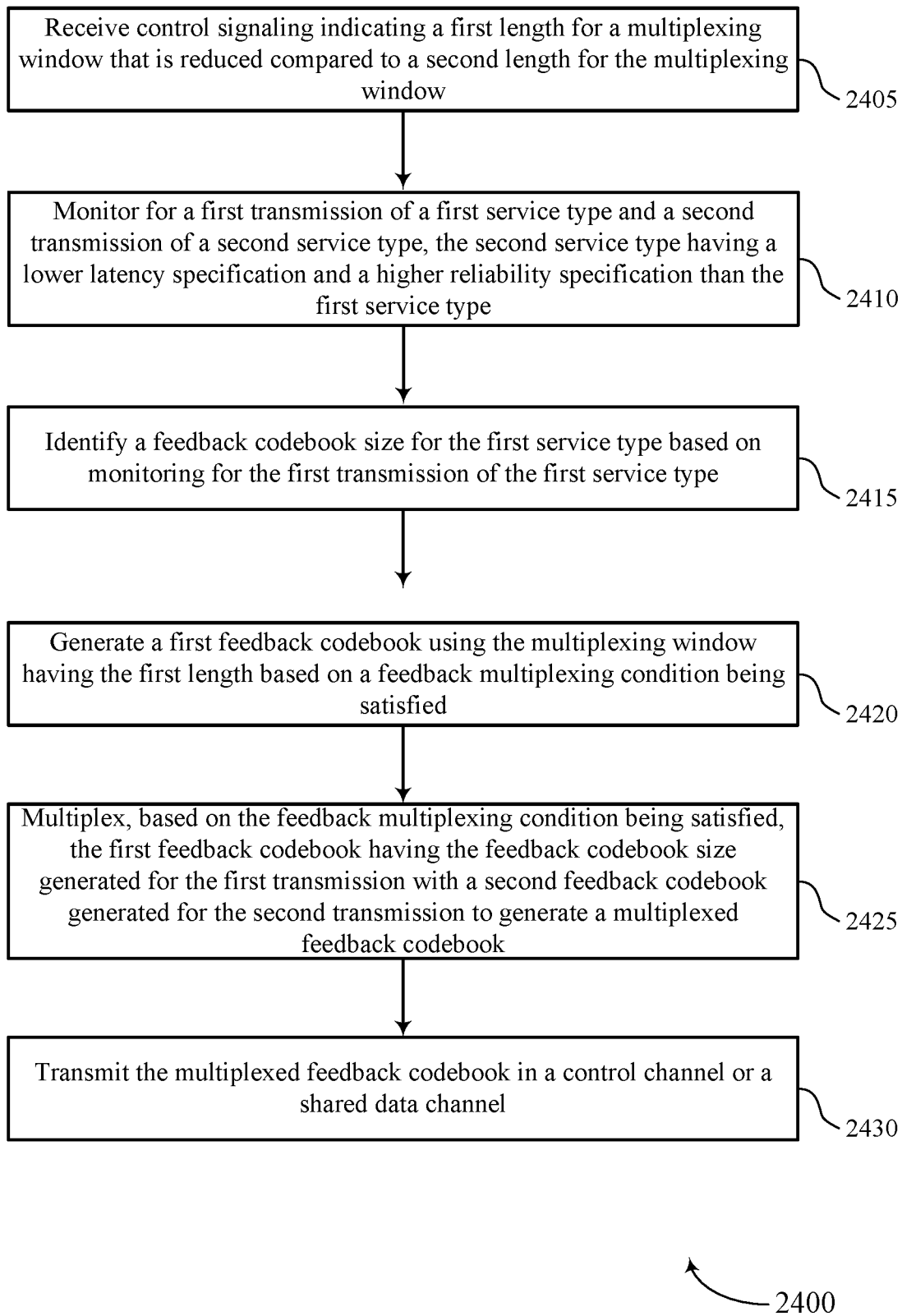

FIG. 24 shows a flowchart illustrating a method 2400 that supports multiplexing codebooks generated for transmissions having different service types in accordance with aspects of the present disclosure. The operations of method 2400 may be implemented by a UE 115 or its components as described herein. For example, the operations of method 2400 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2405, the UE may receive control signaling indicating a first length for a multiplexing window that is reduced compared to a second length for the multiplexing window. The operations of 2405 may be performed according to the methods described herein. In some examples, aspects of the operations of 2405 may be performed by an UE control signaling receiver as described with reference to FIGS. 8 through 11.

At 2410, the UE may monitor for a first transmission of a first service type and a second transmission of a second service type, the second service type having a lower latency specification and a higher reliability specification than the first service type. The operations of 2410 may be performed according to the methods described herein. In some examples, aspects of the operations of 2410 may be performed by an UE transmission monitoring component as described with reference to FIGS. 8 through 11.

At 2415, the UE may identify a feedback codebook size for the first service type based on monitoring for the first transmission of the first service type. The operations of 2415 may be performed according to the methods described herein. In some examples, aspects of the operations of 2415 may be performed by an UE feedback codebook size identifier as described with reference to FIGS. 8 through 11.

At 2420, the UE may generate a first feedback codebook using the multiplexing window having the first length based on a feedback multiplexing condition being satisfied. The operations of 2420 may be performed according to the methods described herein. In some examples, aspects of the operations of 2420 may be performed by an UE feedback codebook generator as described with reference to FIGS. 8 through 11.

At 2425, the UE may multiplex, based on the feedback multiplexing condition being satisfied, the first feedback codebook having the feedback codebook size generated for the first transmission with a second feedback codebook generated for the second transmission to generate a multiplexed feedback codebook. The operations of 2425 may be performed according to the methods described herein. In some examples, aspects of the operations of 2425 may be performed by an UE feedback codebook multiplexer as described with reference to FIGS. 8 through 11.

At 2430, the UE may transmit the multiplexed feedback codebook in a control channel or a shared data channel. The operations of 2430 may be performed according to the methods described herein. In some examples, aspects of the operations of 2430 may be performed by an UE feedback codebook transmitter as described with reference to FIGS. 8 through 11.

Figure 25:
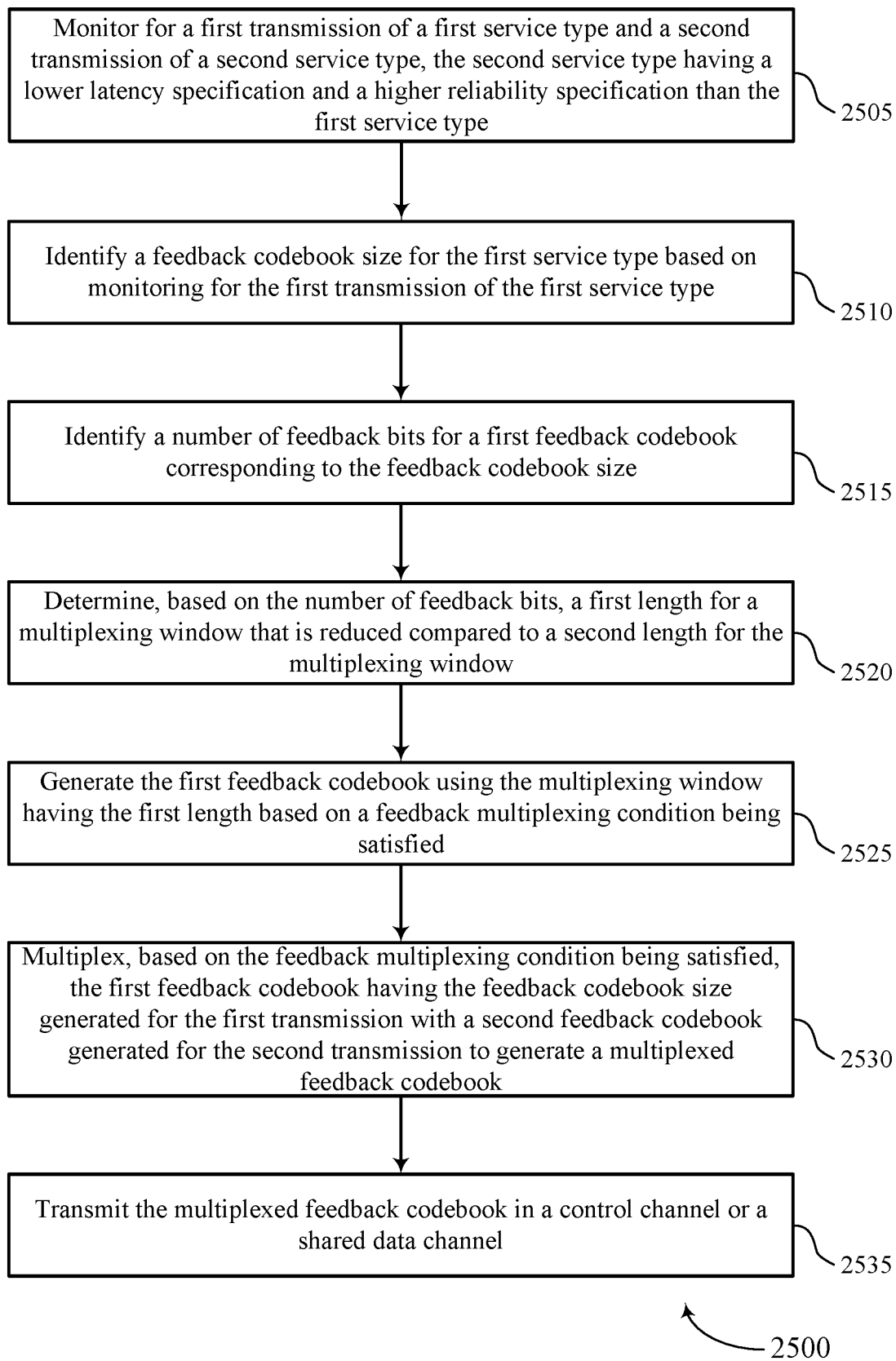

FIG. 25 shows a flowchart illustrating a method 2500 that supports multiplexing codebooks generated for transmissions having different service types in accordance with aspects of the present disclosure. The operations of method 2500 may be implemented by a UE 115 or its components as described herein. For example, the operations of method 2500 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2505, the UE may monitor for a first transmission of the first service type and a second transmission of a second service type, the second service type having a lower latency specification and a higher reliability specification than the first service type. The operations of 2505 may be performed according to the methods described herein. In some examples, aspects of the operations of 2505 may be performed by an UE transmission monitoring component as described with reference to FIGS. 8 through 11.

At 2510, the UE may identify a feedback codebook size for a first service type based on monitoring for the first transmission of the first service type. The operations of 2510 may be performed according to the methods described herein. In some examples, aspects of the operations of 2510 may be performed by an UE feedback codebook size identifier as described with reference to FIGS. 8 through 11.

At 2515, the UE may identify a number of feedback bits for a first feedback codebook corresponding to the feedback codebook size. The operations of 2515 may be performed according to the methods described herein. In some examples, aspects of the operations of 2515 may be performed by an UE feedback bit identifier as described with reference to FIGS. 8 through 11.

At 2520, the UE may determine, based on the number of feedback bits, a first length for a multiplexing window that is reduced compared to a second length for the multiplexing window. The operations of 2520 may be performed according to the methods described herein. In some examples, aspects of the operations of 2520 may be performed by an UE multiplexing window length determiner as described with reference to FIGS. 8 through 11.

At 2525, the UE may generate the first feedback codebook using the multiplexing window having the first length based on a feedback multiplexing condition being satisfied. The operations of 2525 may be performed according to the methods described herein. In some examples, aspects of the operations of 2525 may be performed by an UE feedback codebook generator as described with reference to FIGS. 8 through 11.

At 2530, the UE may multiplex, based on the feedback multiplexing condition being satisfied, the first feedback codebook having the feedback codebook size generated for the first transmission with a second feedback codebook generated for the second transmission to generate a multiplexed feedback codebook. The operations of 2530 may be performed according to the methods described herein. In some examples, aspects of the operations of 2530 may be performed by an UE feedback codebook multiplexer as described with reference to FIGS. 8 through 11.

At 2535, the UE may transmit the multiplexed feedback codebook in a control channel or a shared data channel. The operations of 2535 may be performed according to the methods described herein. In some examples, aspects of the operations of 2535 may be performed by an UE feedback codebook transmitter as described with reference to FIGS. 8 through 11.

Figure 26:
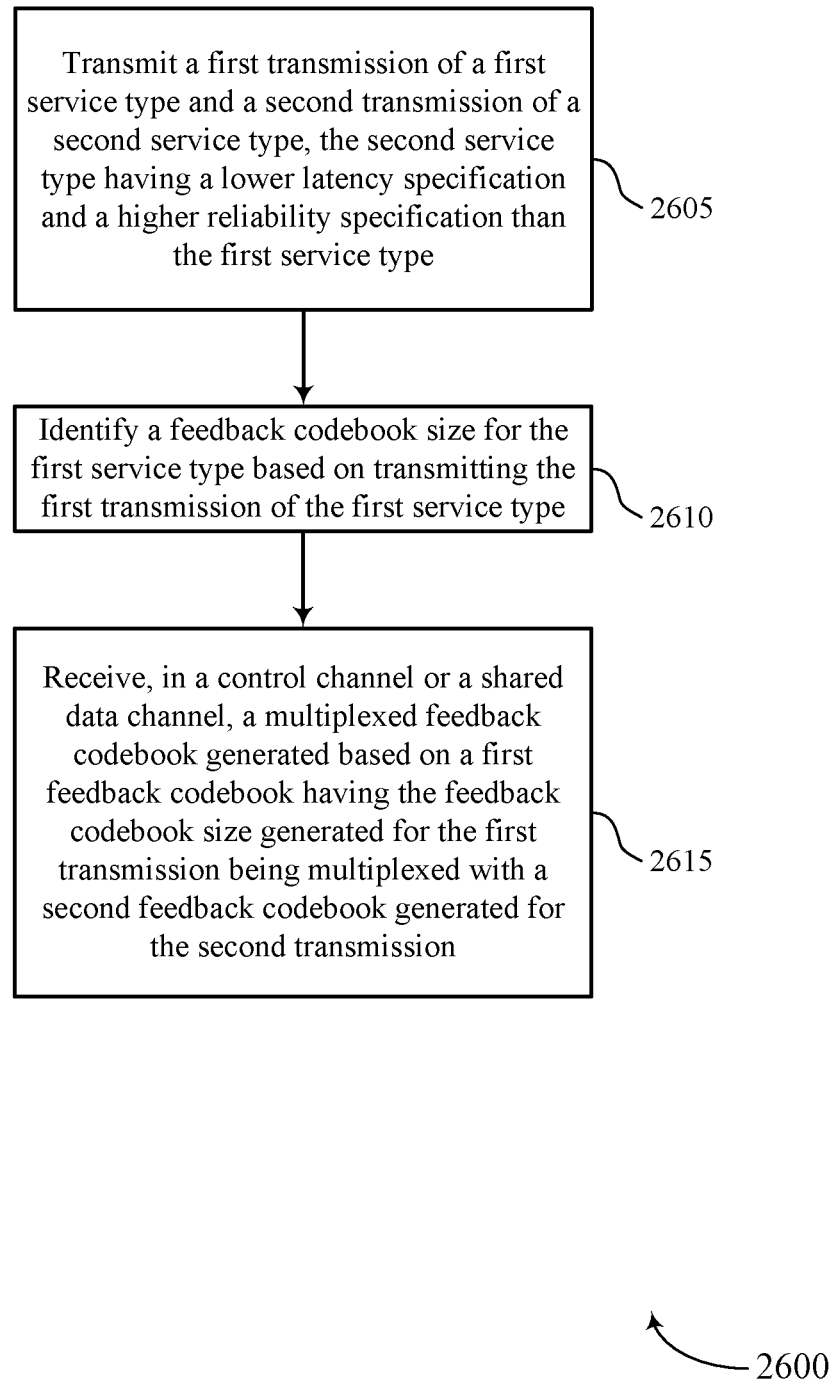

FIG. 26 shows a flowchart illustrating a method 2600 that supports multiplexing codebooks generated for transmissions having different service types in accordance with aspects of the present disclosure. The operations of method 2600 may be implemented by a base station 105 or its components as described herein. For example, the operations of method 2600 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2605, the base station may transmit a first transmission of a first service type and a second transmission of a second service type, the second service type having a lower latency specification and a higher reliability specification than the first service type. The operations of 2605 may be performed according to the methods described herein. In some examples, aspects of the operations of 2605 may be performed by a BS transmission transmitter as described with reference to FIGS. 12 through 15.

At 2610, the base station may identify a feedback codebook size for the first service type based on transmitting the first transmission of the first service type. The operations of 2610 may be performed according to the methods described herein. In some examples, aspects of the operations of 2610 may be performed by a BS feedback codebook size identifier as described with reference to FIGS. 12 through 15.

At 2615, the base station may receive, in a control channel or a shared data channel, a multiplexed feedback codebook generated based on a first feedback codebook having the feedback codebook size generated for the first transmission being multiplexed with a second feedback codebook generated for the second transmission. The operations of 2615 may be performed according to the methods described herein. In some examples, aspects of the operations of 2615 may be performed by a BS feedback codebook receiver as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous examples or aspects described herein.

Example 1: A method for wireless communications by a UE, comprising: monitoring for a first transmission of a first service type and a second transmission of a second service type, the second service type having a lower latency specification and a higher reliability specification than the first service type; identifying a feedback codebook size for the first service type based at least in part on monitoring for the first transmission of the first service type; multiplexing, based at least in part on a feedback multiplexing condition being satisfied, a first feedback codebook having the feedback codebook size generated for the first transmission with a second feedback codebook generated for the second transmission to generate a multiplexed feedback codebook; and transmitting the multiplexed feedback codebook in a control channel or a shared data channel.

Example 2: The method of example 1, further comprising: transmitting the multiplexed feedback codebook on the control channel based at least in part on a resource of the control channel that is configured to the UE for transmitting the first feedback codebook at least partially overlapping in time with a resource of the control channel that is allocated to the UE for transmitting the second feedback codebook.

Example 3: The method of any of examples 1 or 2, wherein transmitting the multiplexed feedback codebook comprises: transmitting the multiplexed feedback codebook on the control channel, wherein the control channel is configured for transmitting the second feedback codebook.

Example 4: The method of any of examples 1 to 3, further comprising: transmitting the multiplexed feedback codebook on the shared data channel based at least in part on a resource of the shared data channel that is allocated to the UE at least partially overlapping with a resource of the control channel that is configured for transmitting the first feedback codebook.

Example 5: The method of any of examples 1 to 4, wherein transmitting the multiplexed feedback codebook comprises: transmitting the multiplexed feedback codebook on the shared data channel based at least in part on a time gap between a downlink control channel transmission scheduling a resource for the UE to transmit an uplink shared channel transmission and a beginning of a resource configured for transmitting the first feedback codebook satisfying a time threshold.

Example 6: The method of any of examples 1 to 5, wherein transmitting the multiplexed feedback codebook comprises: transmitting the multiplexed feedback codebook on the shared data channel based at least in part on receiving downlink control information indicating that the UE is to transmit the multiplexed feedback codebook on the shared data channel.

Example 7: The method of any of examples 1 to 6, further comprising: determining that the feedback multiplexing condition is satisfied based at least in part on identifying a potential collision between a first resource configured for transmitting the first feedback codebook and a second resource configured for transmitting the second feedback codebook.

Example 8: The method of any of examples 1 to 7, further comprising: receiving control signaling indicating the first resource and the second resource.

Example 9: The method of any of examples 1 to 8, further comprising: determining that the feedback multiplexing condition is satisfied based at least in part on a time gap between a downlink control channel transmission that schedules a resource for transmitting the second feedback codebook and a beginning of a resource configured for transmitting the first feedback codebook satisfying a time threshold.

Example 10: The method of any of examples 1 to 9, further comprising: determining that the feedback multiplexing condition is satisfied based at least in part on receiving downlink control information indicating that the UE is to multiplex the first feedback codebook with the second feedback codebook.

Example 11: The method of any of examples 1 to 10, further comprising: bundling, based at least in part on the feedback codebook size, feedback bits generated for the first transmission to generate the first feedback codebook having the feedback codebook size.

Example 12: The method of any of examples 1 to 11, wherein the feedback codebook size is a single bit.

Example 13: The method of any of examples 1 to 12, further comprising: generating each feedback bit of a plurality of feedback bits for a respective downlink carrier of a plurality of downlink carriers of the first transmission; and generating the first feedback codebook having the feedback codebook size based at least in part on bundling the plurality of feedback bits on a downlink carrier by downlink carrier basis.

Example 14: The method of any of examples 1 to 13, further comprising: receiving control signaling that indicates the feedback codebook size.

Example 15: The method of any of examples 1 to 14, wherein the control signaling comprises RRC signaling.

Example 16: The method of any of examples 1 to 15, further comprising: generating a plurality of feedback bits based at least in part on monitoring for the first transmission; and dropping at least one feedback bit of the plurality of feedback bits exceeding the feedback codebook size.

Example 17: The method of any of examples 1 to 16, wherein the at least one feedback bit is dropped based at least in part on a slot index, a component carrier index, or both, corresponding to the first transmission.

Example 18: The method of any of examples 1 to 17, further comprising: identifying that a size of a feedback codebook generated for the first transmission is less than the feedback codebook size; and inserting a defined number of bits in the feedback codebook to generate the first feedback codebook having the feedback codebook size.

Example 19: The method of any of examples 1 to 18, wherein the feedback codebook generated for the first transmission comprises zero bits, and further comprising: inserting the defined number of bits in the feedback codebook based at least in part on the feedback codebook generated for the first transmission comprising the zero feedback bits.

Example 20: The method of any of examples 1 to 19, wherein each bit of the inserted defined number of bits is a negative acknowledgement.

Example 21: The method of any of examples 1 to 20, wherein identifying the feedback codebook size comprises: receiving control signaling that indicates a first size of the multiplexed feedback codebook and a second size of the second feedback codebook; and determining the feedback codebook size based at least in part on the first size and the second size.

Example 22: The method of any of examples 1 to 21, further comprising: identifying that a size of a feedback codebook generated for the first transmission is less than the feedback codebook size; and inserting a defined number of bits in the feedback codebook to generate the first feedback codebook having the feedback codebook size.

Example 23: The method of any of examples 1 to 22, wherein each bit of the inserted defined number of bits is a negative acknowledgement.

Example 24: The method of any of examples 1 to 23, further comprising: bundling, based at least in part on a size of the first feedback codebook exceeding the feedback codebook size, feedback bits generated for the first transmission to generate the first feedback codebook having the feedback codebook size.

Example 25: The method of any of examples 1 to 24, wherein the feedback codebook size is a single bit.

Example 26: The method of any of examples 1 to 25, further comprising: generating each feedback bit of a plurality of feedback bits for a respective downlink carrier of a plurality of downlink carriers of the first transmission; and generating the first feedback codebook having the feedback codebook size based at least in part on bundling the plurality of feedback bits on a downlink carrier by downlink carrier basis.

Example 27: The method of any of examples 1 to 26, further comprising: selecting a first resource set of a plurality of control channel resource sets for the control channel based at least in part on the second size of the second feedback codebook, each set of the plurality of control channel resources sets corresponding to a respective range for the second size for the second feedback codebook, wherein the feedback codebook size is identified based at least in part on the range for the second size for the second feedback codebook corresponding to the first resource set.

Example 28: The method of any of examples 1 to 27, wherein the feedback codebook size is equal to a difference between a defined codebook size for the first resource set minus the second size of the second feedback codebook.

Example 29: The method of any of examples 1 to 28, wherein identifying the feedback codebook size comprises: identifying the feedback codebook size based at least in part on a defined number of resource blocks (RBs) for a control channel resource, a defined coding rate for the control channel resource, a modulation order of the control channel resource, a number of OFDM symbols of the control channel resource, or any combination thereof.

Example 30: The method of any of examples 1 to 29, further comprising: receiving control signaling indicating a first length for a multiplexing window that is reduced compared to a second length for the multiplexing window;

and generating the first feedback codebook using the multiplexing window having the first length based at least in part on the feedback multiplexing condition being satisfied.

Example 31: The method of any of examples 1 to 30, wherein the multiplexing window having the second length is applied based at least in part on determining that a first resource of the control channel that is allocated to the UE for transmitting the first feedback codebook does not overlap in time with a second resource of the control channel that is configured for transmitting the second feedback codebook.

Example 32: The method of any of examples 1 to 31, wherein the multiplexing window having the first length is positioned corresponding to a beginning or ending of a second multiplexing window having the second length.

Example 33: The method of any of examples 1 to 32, further comprising: identifying a number of feedback bits for the first feedback codebook corresponding to the feedback codebook size; determining, based at least in part on the number of feedback bits, a first length for a multiplexing window that is reduced compared to a second length for the multiplexing window; and generating the first feedback codebook using the multiplexing window having the first length based at least in part on the feedback multiplexing condition being satisfied.

Example 34: The method of any of examples 1 to 33, further comprising: identifying a second feedback codebook size for the second feedback codebook; determining, based at least in part on the second feedback codebook size, a first length for a multiplexing window that is reduced compared to a second length for the multiplexing window; and generating the second feedback codebook using the multiplexing window having the first length based at least in part on the feedback multiplexing condition being satisfied.

Example 35: The method of any of examples 1 to 34, wherein the multiplexing window having the second length is applied based at least in part on determining that a first resource of the control channel that is allocated to the UE for transmitting the first feedback codebook does not overlap in time with a second resource of the control channel that is configured for transmitting the second feedback codebook.

Example 36: The method of any of examples 1 to 35, wherein the multiplexing window having the first length is positioned corresponding to a beginning or ending of a second multiplexing window having the second length.

Example 37: The method of any of examples 1 to 36, wherein identifying the feedback codebook size comprises: determining a number of resources configured for a control channel format, wherein the feedback codebook size is identified based at least in part on the number of resources.

Example 38: The method of any of examples 1 to 37, further comprising: receiving control signaling to configure the UE to use the control channel format for transmitting the second feedback codebook.

Example 39: The method of any of examples 1 to 38, wherein identifying the feedback codebook size comprises: determining a defined number of information bits available to be conveyed over the number of resource configured for the control channel format, wherein the feedback codebook size is identified based at least in part on the defined number of information bits.

Example 40: The method of any of examples 1 to 39, wherein identifying the feedback codebook size comprises: selecting the feedback codebook size based at least in part on identifying a number of resources available in the shared data channel for transmitting the multiplexed feedback codebook that satisfies a ratio.

Example 41: The method of any of examples 1 to 40, wherein the ratio is an alpha ratio.

Example 42: The method of any of examples 1 to 41, further comprising: receiving a third transmission of the first service type and a fourth transmission of the second service type; identifying that the feedback multiplexing condition is not satisfied; and transmitting a feedback codebook generated for the third transmission in a first resource of the control channel and a feedback codebook generated for the fourth transmission in a second resource of the control channel that differs from the first resource.

Example 43: The method of any of examples 1 to 42, wherein the feedback codebook size is a number of feedback bits available for providing feedback for the first transmission of the first service type.

Example 44: The method of any of examples 1 to 43, wherein the first service type is an enhanced mobile broadband service and the second service type is an ultra-reliable low latency service.

Example 45: The method of any of examples 1 to 44, wherein the first transmission is a first physical downlink shared channel transmission and the second transmission is a second physical downlink shared channel transmission.

Example 46: The method of any of examples 1 to 45, wherein the first feedback codebook comprises first hybrid automatic repeat request acknowledgment (HARQ-ACK) feedback and the second feedback codebook comprises a second HARQ-ACK feedback.

Example 47: An apparatus comprising at least one means for performing a method of any of examples 1 to 46.

Example 48: An apparatus for wireless communications comprising a processor; memory coupled with the processor; and instructions stored in the memory and executable by the processor to cause the apparatus to perform a method of any of examples 1 to 46.

Example 49: A non-transitory computer-readable medium storing code for wireless communications, the code comprising instructions executable by a processor to perform a method of any of examples 1 to 46.

Example 50: A method for wireless communications by a base station, comprising: transmitting a first transmission of a first service type and a second transmission of a second service type, the second service type having a lower latency specification and a higher reliability specification than the first service type; identifying a feedback codebook size for the first service type based at least in part on transmitting the first transmission of the first service type; and receiving, in a control channel or a shared data channel, a multiplexed feedback codebook generated based at least in part on a first feedback codebook having the feedback codebook size generated for the first transmission being multiplexed with a second feedback codebook generated for the second transmission.

Example 51: The method of example 50, wherein receiving the multiplexed feedback codebook comprises: receiving the multiplexed feedback codebook on the control channel based at least in part on a resource of the control channel that is configured to a user equipment for transmitting the first feedback codebook at least partially overlapping in time with a resource of the control channel that is allocated to the user equipment for transmitting the second feedback codebook.

Example 52: The method of any of examples 50 or 51, wherein receiving the multiplexed feedback codebook comprises: receiving the multiplexed feedback codebook on the control channel, wherein the control channel is configured for receiving the second feedback codebook.

Example 53: The method of any of examples 50 to 52, wherein receiving the multiplexed feedback codebook comprises: receiving the multiplexed feedback codebook on the shared data channel based at least in part on a resource of the shared data channel that is allocated to a user equipment at least partially overlapping with a resource of the control channel that is configured for transmitting the first feedback codebook.

Example 54: The method of any of examples 50 to 53, wherein receiving the multiplexed feedback codebook comprises: receiving the multiplexed feedback codebook on the shared data channel based at least in part on a time gap between a downlink control channel transmission scheduling a resource for a user equipment to transmit an uplink shared channel transmission and a beginning of a resource configured for transmitting the first feedback codebook satisfying a time threshold.

Example 55: The method of any of examples 50 to 54, wherein receiving the multiplexed feedback comprises: receiving the multiplexed feedback codebook on the shared data channel based at least in part on transmitting downlink control information indicating that a user equipment is to transmit the multiplexed feedback codebook on the shared data channel.

Example 56: The method of any of examples 50 to 55, further comprising: determining that a feedback multiplexing condition is satisfied based at least in part on identifying a potential collision between a first resource configured for transmitting the first feedback codebook and a second resource configured for transmitting the second feedback codebook; and monitoring the control channel or the shared data channel for the multiplexed feedback codebook based at least in part on the feedback multiplexing condition being satisfied.

Example 57: The method of any of examples 50 to 56, further comprising: transmitting control signaling indicating the first resource and the second resource.

Example 58: The method of any of examples 50 to 57, further comprising: determining that a feedback multiplexing condition is satisfied based at least in part on a time gap between a downlink control channel transmission that schedules a resource for transmitting the second feedback codebook and a beginning of a resource configured for transmitting the first feedback codebook satisfying a time threshold; and monitoring the control channel or the shared data channel for the multiplexed feedback codebook based at least in part on the feedback multiplexing condition being satisfied.

Example 59: The method of any of examples 50 to 58, further comprising: determining that a feedback multiplexing condition is satisfied based at least in part on transmitting downlink control information indicating that a user equipment is to multiplex the first feedback codebook with the second feedback codebook; and monitoring the control channel or the shared data channel for the multiplexed feedback codebook based at least in part on the feedback multiplexing condition being satisfied.

Example 60: The method of any of examples 50 to 59, further comprising: transmitting control signaling that indicates the feedback codebook size.

Example 61: The method of any of examples 50 to 60, wherein the control signaling comprises RRC signaling.

Example 62: The method of any of examples 50 to 61, where identifying the feedback codebook size comprises: transmitting control signaling that indicates a first size of the multiplexed feedback codebook and a second size of the second feedback codebook; and determining the feedback codebook size based at least in part on the first size and the second size.

Example 63: The method of any of examples 50 to 62, further comprising: selecting a first resource set of a plurality of control channel resources sets for the control channel based at least in part on the second size of the second feedback codebook, each set of the plurality of control channel resources sets corresponding to a respective range for the second size for the second feedback codebook, wherein the feedback codebook size is identified based at least in part on the range for the second size for the second feedback codebook corresponding to the first resource set.

Example 64: The method of any of examples 50 to 63, wherein the feedback codebook size is equal to a difference between a defined codebook size for the first resource set minus the second size of the second feedback codebook.

Example 65: The method of any of examples 50 to 64, further comprising: identifying the feedback codebook size based at least in part on a defined number of resource blocks (RBs) for a control channel resource, a defined coding rate for the control channel resource, a modulation order of the control channel resource, a number of OFDM symbols of the control channel resource, or any combination thereof.

Example 66: The method of any of examples 50 to 65, further comprising: transmitting control signaling indicating a first length for a multiplexing window that is reduced compared to a second length for the multiplexing window.

Example 67: The method of any of examples 50 to 66, wherein identifying the feedback codebook size comprises: determining a number of resources configured for a control channel format, wherein the feedback codebook size is identified based at least in part on the number of resources.

Example 68: The method of any of examples 50 to 67, further comprising: transmitting control signaling to configure a user equipment to use the control channel format for transmitting the second feedback codebook.

Example 69: The method of any of examples 50 to 68, wherein identifying the feedback codebook size comprises: determining a defined number of information bits available to be conveyed over the number of resources configured for the control channel format, wherein the feedback codebook size is identified based at least in part on the defined number of information bits.

Example 70: The method of any of examples 50 to 69, wherein identifying the feedback codebook size comprises: selecting the feedback codebook size based at least in part on identifying a number of resources available in the shared data channel for transmitting the multiplexed feedback codebook that satisfies a ratio.

Example 71: The method of any of examples 50 to 70, wherein the ratio is an alpha ratio.

Example 72: The method of any of examples 50 to 71, further comprising: transmitting a third transmission of the first service type and a fourth transmission of the second service type; identifying that a feedback multiplexing condition is not satisfied; and receiving a feedback codebook generated for the third transmission in a first resource of the control channel and a feedback codebook generated for the fourth transmission in a second resource of the control channel that differs from the first resource.

Example 73: The method of any of examples 50 to 72, wherein the feedback codebook size is a number of feedback bits available for providing feedback on the first transmission of the first service type.

Example 74: The method of any of examples 50 to 73, further comprising receiving RRC signaling that indicates the feedback codebook size.

Example 75: An apparatus comprising at least one means for performing a method of any of examples 50 to 74.

Example 76: An apparatus for wireless communications comprising a processor; memory coupled with the processor; and instructions stored in the memory and executable by the processor to cause the apparatus to perform a method of any of examples 50 to 74.

Example 77: A non-transitory computer-readable medium storing code for wireless communications, the code comprising instructions executable by a processor to perform a method of any of examples 50 to 74.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
    monitoring for a first transmission of a first service type and a second transmission of a second service type, the second service type having a lower latency specification and a higher reliability specification than the first service type;
    receiving control signaling indicating a feedback codebook size comprising a fixed number of feedback bits for the first service type;
    multiplexing, based at least in part on a feedback multiplexing condition being satisfied and the control signaling indicating the feedback codebook size, a first feedback codebook having the feedback codebook size generated for the first transmission with a second feedback codebook generated for the second transmission to generate a multiplexed feedback codebook; and
    transmitting the multiplexed feedback codebook in a control channel or a shared data channel.

2. The method of claim 1, further comprising:
    transmitting the multiplexed feedback codebook on the control channel based at least in part on a resource of the control channel that is configured to the UE for transmitting the first feedback codebook at least partially overlapping in time with a resource of the control channel that is allocated to the UE for transmitting the second feedback codebook.

3. The method of claim 1, wherein transmitting the multiplexed feedback codebook comprises:
    transmitting the multiplexed feedback codebook on the control channel, wherein the control channel is configured for transmitting the second feedback codebook.

4. The method of claim 1, further comprising:
    transmitting the multiplexed feedback codebook on the shared data channel based at least in part on a resource of the shared data channel that is allocated to the UE at least partially overlapping with a resource of the control channel that is configured for transmitting the first feedback codebook.

5. The method of claim 1, wherein transmitting the multiplexed feedback codebook comprises:
    transmitting the multiplexed feedback codebook on the shared data channel based at least in part on receiving downlink control information indicating that the UE is to transmit the multiplexed feedback codebook on the shared data channel.

6. The method of claim 1, further comprising:
    determining that the feedback multiplexing condition is satisfied based at least in part on identifying a potential collision between a first resource configured for transmitting the first feedback codebook and a second resource configured for transmitting the second feedback codebook.

7. The method of claim 1, further comprising:
    determining that the feedback multiplexing condition is satisfied based at least in part on a time gap between a downlink control channel transmission that schedules a resource for transmitting the second feedback codebook and a beginning of a resource configured for transmitting the first feedback codebook satisfying a time threshold.

8. The method of claim 1, further comprising:
    determining that the feedback multiplexing condition is satisfied based at least in part on receiving downlink control information indicating that the UE is to multiplex the first feedback codebook with the second feedback codebook.

9. The method of claim 1, wherein identifying the feedback codebook size comprises:
    receiving additional control signaling that indicates a first size of the multiplexed feedback codebook and a second size of the second feedback codebook; and
    determining the feedback codebook size based at least in part on the first size and the second size.

10. The method of claim 9, further comprising:
    identifying that a size of a feedback codebook generated for the first transmission is less than the feedback codebook size; and
    inserting a defined number of bits in the feedback codebook to generate the first feedback codebook having the feedback codebook size.

11. The method of claim 1, further comprising:
    identifying a number of feedback bits for the first feedback codebook corresponding to the feedback codebook size;
    determining, based at least in part on the number of feedback bits, a first length for a multiplexing window that is reduced compared to a second length for the multiplexing window; and
    generating the first feedback codebook using the multiplexing window having the first length based at least in part on the feedback multiplexing condition being satisfied.

12. The method of claim 1, wherein identifying the feedback codebook size comprises:
    determining a number of resources configured for a control channel format, wherein the feedback codebook size is identified based at least in part on the number of resources.

13. The method of claim 1, wherein identifying the feedback codebook size comprises:
    selecting the feedback codebook size based at least in part on identifying a number of resources available in the shared data channel for transmitting the multiplexed feedback codebook that satisfies a ratio.

14. The method of claim 1, further comprising:
    receiving a third transmission of the first service type and a fourth transmission of the second service type;
    identifying that the feedback multiplexing condition is not satisfied; and
    transmitting a feedback codebook generated for the third transmission in a first resource of the control channel and a feedback codebook generated for the fourth transmission in a second resource of the control channel that differs from the first resource.

15. The method of claim 1, wherein the feedback codebook size is a number of feedback bits available for providing feedback for the first transmission of the first service type.

16. The method of claim 1, wherein the first service type is an enhanced mobile broadband service and the second service type is an ultra-reliable low latency service.

17. The method of claim 1, wherein the first transmission is a first physical downlink shared channel transmission and the second transmission is a second physical downlink shared channel transmission.

18. The method of claim 1, wherein the first feedback codebook comprises first hybrid automatic repeat request acknowledgment (HARQ-ACK) feedback and the second feedback codebook comprises a second HARQ-ACK feedback.

19. An apparatus for wireless communications by a user equipment (UE), comprising:
    one or more processors;
    memory coupled with the one or more processors; and
    instructions stored in the memory and executable by the one or more processors to cause the apparatus to:
        monitor for a first transmission of a first service type and a second transmission of a second service type, the second service type having a lower latency specification and a higher reliability specification than the first service type;
        receive control signaling indicating a feedback codebook size comprising a fixed number of feedback bits for the first service type;
        multiplex, based at least in part on a feedback multiplexing condition being satisfied and the control signaling indicating the feedback codebook size, a first feedback codebook having the feedback codebook size generated for the first transmission with a second feedback codebook generated for the second transmission to generate a multiplexed feedback codebook; and
        transmit the multiplexed feedback codebook in a control channel or a shared data channel.

20. An apparatus for wireless communications by a base station, comprising:
    one or more processors;
    memory coupled with the one or more processors; and
    instructions stored in the memory and executable by the one or more processors to cause the apparatus to:
        transmit a first transmission of a first service type and a second transmission of a second service type, the second service type having a lower latency specification and a higher reliability specification than the first service type;
        transmit control signaling indicating a feedback codebook size comprising a fixed number of feedback bits for the first service type; and
        receive, in a control channel or a shared data channel, a multiplexed feedback codebook generated based at least in part on a first feedback codebook having the feedback codebook size generated for the first transmission being multiplexed with a second feedback codebook generated for the second transmission.

* * * * *